US012099700B2

(12) United States Patent
Tao et al.

(10) Patent No.: US 12,099,700 B2
(45) Date of Patent: *Sep. 24, 2024

(54) METHOD FOR BROWSING APPLICATION FOLDER AND ELECTRONIC DEVICE

(71) Applicant: Huawei Technologies Co., Ltd., Shenzhen (CN)

(72) Inventors: Qiang Tao, Beijing (CN); Jing Han, Beijing (CN); Guangyuan Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,113

(22) Filed: Dec. 22, 2022

(65) Prior Publication Data
US 2023/0129384 A1 Apr. 27, 2023

Related U.S. Application Data

(63) Continuation of application No. 17/256,510, filed as application No. PCT/CN2018/093852 on Jun. 29, 2018, now Pat. No. 11,609,683.

(51) Int. Cl.
*G06F 3/0482* (2013.01)
*G06F 3/04886* (2022.01)
*G06F 16/16* (2019.01)
(52) U.S. Cl.
CPC ........ *G06F 3/0482* (2013.01); *G06F 3/04886* (2013.01); *G06F 16/168* (2019.01)

(58) Field of Classification Search
CPC .. G06F 3/0482; G06F 16/168; G06F 3/04886; G06F 16/1787; G06F 16/178;
(Continued)

(56) References Cited

U.S. PATENT DOCUMENTS

2004/0177123 A1 9/2004 Meek
2006/0279780 A1 12/2006 Anno et al.
(Continued)

FOREIGN PATENT DOCUMENTS

CN 102682020 A 9/2012
CN 103064934 A 4/2013
(Continued)

OTHER PUBLICATIONS

Yajun Wu, "Research and Design of File Management Utility of Smart Mobile Device Based on Android," Electronic Quality Issue 02 (No. 359) in 2017, 5 pages.
(Continued)

*Primary Examiner* — Daniel W Parcher
(74) *Attorney, Agent, or Firm* — Conley Rose, P.C.

(57) ABSTRACT

A method for browsing an application folder includes detecting a first touch operation on a touchscreen of an electronic device, in response to the first touch operation, displaying a first user interface, where the first user interface is a setting screen of a first application program, where the first user interface includes a folder control, detecting a second touch operation on the folder control, and in response to the second touch operation, displaying a second user interface on the touchscreen, where the second user interface is a content details screen of the folder corresponding to the first application program.

20 Claims, 38 Drawing Sheets

(58) Field of Classification Search
CPC ......... G06F 16/119; G06F 2203/04808; G06F 3/0485; G06F 3/0488; H04M 2250/22; H04M 1/72409; H04M 2250/64
See application file for complete search history.

(56) References Cited

U.S. PATENT DOCUMENTS

| | | | |
|---|---|---|---|
| 2011/0288962 A1* | 11/2011 | Rankin, Jr. | G06Q 30/02 |
| | | | 726/28 |
| 2012/0017175 A1* | 1/2012 | Duquene | G06F 16/168 |
| | | | 715/823 |
| 2013/0002796 A1 | 1/2013 | Hiller et al. | |
| 2013/0111400 A1 | 5/2013 | Miwa | |
| 2013/0157722 A1 | 6/2013 | Kim et al. | |
| 2014/0298172 A1 | 10/2014 | Choi | |
| 2014/0380232 A1 | 12/2014 | Sarnoff et al. | |
| 2015/0026616 A1 | 1/2015 | Litan Sever et al. | |
| 2015/0036065 A1 | 2/2015 | Yousefpor et al. | |
| 2015/0082251 A1 | 3/2015 | Lam | |
| 2015/0089402 A1 | 3/2015 | Rong et al. | |
| 2015/0146259 A1 | 5/2015 | Enomoto | |
| 2016/0042004 A1 | 2/2016 | Kawamoto | |
| 2018/0246933 A1 | 8/2018 | Darrow et al. | |
| 2018/0322136 A1 | 11/2018 | Carpentier et al. | |
| 2019/0102369 A1 | 4/2019 | Valloppillil et al. | |
| 2021/0141481 A1 | 5/2021 | Jeon et al. | |

FOREIGN PATENT DOCUMENTS

| | | |
|---|---|---|
| CN | 103617209 A | 3/2014 |
| CN | 103793128 A | 5/2014 |
| CN | 104850325 A | 8/2015 |
| CN | 104881211 A | 9/2015 |
| CN | 105892825 A | 8/2016 |
| CN | 105930062 A | 9/2016 |
| CN | 105955613 A | 9/2016 |
| CN | 106020602 A | 10/2016 |
| CN | 106055581 A | 10/2016 |
| CN | 106445319 A | 2/2017 |
| CN | 106502499 A | 3/2017 |
| CN | 106951492 A | 7/2017 |
| CN | 107015992 A | 8/2017 |
| CN | 107122429 A | 9/2017 |
| CN | 107273401 A | 10/2017 |
| CN | 107423400 A | 12/2017 |
| CN | 107766523 A | 3/2018 |
| CN | 108810268 A | 11/2018 |

OTHER PUBLICATIONS

Summerson Cameron, et al., "How to Manage Files and Use the File System on Android," Jul. 3, 2017, XP055797803, 14 pages.
Martin Brinkmann, "How to switch Google Chrome's download toolbar to notifications," Jul. 31, 2015, 2015, 3 pages.
Pacific Computer Network, "Conscientious product? Tencent produced QQ WeChat file cleaning magic device," May 2018, URL:https://baijiahao.baidu.com/s?id=1599346843422637346andwfrspiderandfor=pc, 18 pages.
Akemi Iwaya, "How Do You Get the 'All Recent Files' List Back in Windows 10?" www.howtogeek.com/274573/how-do-you-get-the-all-recent-files-list-back-in-windows-10, Oct. 4, 2016, 5 pages.
Martin Brinkmann, "How to switch Google Chrome's download toolbar to notifications," ghacks.net, Jul. 31, 2015, 3 pages.

* cited by examiner

METHOD FOR BROWSING APPLICATION FOLDER AND ELECTRONIC DEVICE

CROSS-REFERENCE TO RELATED APPLICATIONS

This is a continuation of U.S. patent application Ser. No. 17/256,510 filed on Dec. 28, 2020, which is a U.S. National Stage of International Patent Application No. PCT/CN2018/093852 filed on Jun. 29, 2018. Both of the aforementioned applications are hereby incorporated by reference in their entireties.

TECHNICAL FIELD

This application relates to the field of terminal technologies, and in particular, to a method for browsing an application folder and an electronic device.

BACKGROUND

An Android (android) operating system is a Linux-based open-source operating system, and is mainly applied to an electronic device (for example, a smartphone or a tablet computer). Currently, for an electronic device with the Android operating system, a user may install various applications on the electronic device, for example, WeChat, a browser, and a camera application. When using an application, the user may save a created, transferred, or downloaded file as required. For example, the file may be audio, a video, a document, a picture, or the like. However, when a large quantity of applications are installed on the electronic device, because folders of the applications are arranged in disorder, and names of the folders are irregular, it is difficult to find a file to be viewed from a plurality of folders when a folder in which the file is stored is unknown. This is greatly inconvenient for the user.

SUMMARY

This application provides a method for browsing an application folder and an electronic device, to help improve efficiency of searching for a file by a user.

According to a first aspect, an embodiment of this application provides a method for browsing an application folder, where the method is implemented on an electronic device having a touchscreen, and specifically includes: detecting, by the electronic device, a first operation on the touchscreen; in response to the first operation, displaying, by the electronic device, a first user interface on the touchscreen, where the first user interface is a setting screen of a first application program, the first user interface includes a folder control, and the folder control is used to indicate a folder of the first application program; detecting, by the electronic device, a second operation on the folder control; and in response to the second operation, displaying, by the electronic device, a second user interface on the touchscreen, where the second user interface is a content details screen of the folder corresponding to the first application program.

In this embodiment of this application, because the folder control can be displayed on the touchscreen, in response to the second operation on the folder control, the electronic device can display the second user interface on the touchscreen. In this way, the user can view, by using the second user interface, content details of the folder corresponding to the first application program. Therefore, compared with the prior art, a scope of searching for the folder corresponding to the first application program is narrowed, to help improve efficiency of searching for a file or a folder.

In a possible design, the first operation may be an operation on the first control. The first control is located on a third user interface. Specifically, the electronic device may display the third user interface on the touchscreen in the following manners.

The electronic device displays a home screen on the touchscreen, and the home screen includes a setting icon.

The electronic device detects a touch operation on the setting icon.

In response to the touch operation, the electronic device displays a system setting screen on the touchscreen.

The electronic device detects an operation on the system setting screen.

In response to the operation on the system setting screen, the electronic device displays the third user interface on the touchscreen, and the third user interface includes the first control.

The foregoing technical solution simplifies implementations.

In a possible design, the first operation is an operation on a second control, and the second control is located on a shortcut menu. The electronic device may display the shortcut menu on the touchscreen in the following manners.

The electronic device displays the home screen on the touchscreen, and the home screen includes an icon of the first application program.

The electronic device detects a heavy press operation on the icon of the first application program.

In response to the heavy press operation, the electronic device displays, on the touchscreen, a shortcut menu corresponding to the first application program, and the shortcut menu includes the second control. This technical solution helps simplify an operation of the user.

In a possible design, the folder control includes N subfolder controls corresponding to the first application program, and N is a natural number greater than 1; and each of the N subfolder controls is used to indicate one subfolder corresponding to the first application program, and each subfolder control indicates a different subfolder. Therefore, the folder corresponding to the first application program is displayed more intuitively to the user.

In a possible design, the N subfolder controls are arranged in the first user interface in descending order of storage frequencies of subfolders respectively indicated by the N subfolder controls. By using the foregoing technical solution, the storage frequencies of subfolders are more intuitively displayed to the user, to provide a reference for the user to search for a file.

In a possible design, the first user interface further includes a file control, and the file control is used to indicate a latest saved file for the first application program. This helps more intuitively display the latest saved file to the user.

In a possible design, the electronic device may further display the first user interface in the following manners.

The electronic device displays a user interface of the first application program on the touchscreen, and the user interface of the first application program includes a file. The electronic device detects a fourth operation on the file, and in response to the fourth operation, the electronic device saves the file. After the file is successfully saved, the electronic device displays a dialog box on the touchscreen, and the dialog box is used to prompt the user whether to view the saved file. The electronic device detects a fifth operation performed by the user on the dialog box, in response to the fifth operation, the electronic device displays the first user interface on the touchscreen. In this way, the user can learn a position of the latest saved file.

In a possible design, the first operation may be a touch and hold operation or a heavy press operation; or the first operation may be tapping a control in a menu displayed on the touchscreen, and in response to a detected touch and hold or heavy press operation, the menu is popped up and displayed on the touchscreen by the electronic device; or the first user interface may be a setting screen built in the first application program; or the first user interface may be a user interface that is in a system setting and that is used to manage the first application program; the folder control may be a folder icon, a path link, or a virtual button; or the content details screen may be a user interface of a file manager; or the content details screen may include content included in a root folder corresponding to the first application program; or a value of N may be a total quantity of subfolders included in the root folder corresponding to the first application; or a value of N may be a total quantity of subfolders that are included in the root folder corresponding to the first application and that are used to store a user file; or the first user interface may further include a common folder control, where the common folder control is used to indicate a first folder, and the first folder is a folder that stores files at a highest frequency and that is in the subfolders respectively indicated by the N subfolder controls; or the file may include a picture, a document, a video, and audio.

According to a second aspect, an embodiment of this application provides a method for browsing an application folder, where the method is implemented on an electronic device having a touchscreen, and specifically includes: displaying, by the electronic device, a home screen on the touchscreen, where the home screen includes an icon of a first application program; detecting, by the electronic device, a touch and hold operation on the icon of the first application program; in response to a heavy press operation on the icon of the first application program, displaying, by the electronic device, a shortcut menu on the touchscreen, where the shortcut menu includes a first control; detecting, by the electronic device, a touch operation on the first control; in response to the touch operation on the first control, displaying, by the electronic device, a first user interface on the touchscreen, where the first user interface is a setting screen of the first application program, the first user interface includes a first folder control, a second folder control, and a first file control, the first folder control is used to indicate a first folder, the second folder control is used to indicate a second folder, the first file control is used to indicate a first file, the first file is a latest file saved by the electronic device for the first application program, the first folder includes the first file, the first folder and the second folder are folders included in a root folder corresponding to the first application program, and the second folder control is located after the first folder control in the first user interface; detecting, by the electronic device, a first operation; in response to the first operation, displaying, by the electronic device, a second user interface on the touchscreen, where the second user interface is a user interface of the first application program, and the second user interface includes a second file; detecting, by the electronic device, a second operation on the second file; in response to the second operation, saving, by the electronic device, the second file to the second folder; detecting, by the electronic device, a third operation on the touchscreen; and in response to the third operation, refreshing, by the electronic device, the first user interface based on a name of the first application program and a save path of the second file, and displaying the refreshed first user interface, where the refreshed first user interface includes the first folder control, the second folder control, and a second file control, the second file control indicates the second file, and the second folder control is located before the first folder control in the first user interface.

The foregoing technical solution helps display, to the user, the folder corresponding to the first application program, to help improve efficiency of searching for a file or a folder by the user.

According to a third aspect, an embodiment of this application provides still another method for browsing an application folder, where the method is implemented on an electronic device having a touchscreen, and specifically includes: displaying, by the electronic device, a home screen on the touchscreen, where the home screen includes an icon of a first application program; detecting, by the electronic device, a heavy press operation on the icon of the first application program; in response to the heavy press operation, displaying, by the electronic device, a shortcut menu on the touchscreen, where the shortcut menu includes a first control; detecting, by the electronic device, a touch operation on the first control; and in response to the touch operation, displaying, by the electronic device on the touchscreen, a content details screen of a folder corresponding to the first application program.

The foregoing technical solution helps simplify an operation manner of the user, and further improves efficiency of searching for a file or a folder by the user.

In a possible design, the content details screen is a user interface that is in file management and that is for content details of the folder corresponding to the first application program. This helps simplify an implementation.

According to a fourth aspect, an embodiment of this application provides an electronic device, including a touchscreen, where the touchscreen includes a touch-sensitive surface and a display; one or more processors; a memory; a plurality of application programs; and one or more computer programs, where the one or more computer programs are stored in the memory, the one or more computer programs include an instruction, and when the instruction is executed by the electronic device, the electronic device may be enabled to perform the method provided in the foregoing aspects.

According to a fifth aspect, an embodiment of this application provides an apparatus, where the apparatus is included in an electronic device, and the apparatus has a function of implementing behavior of the electronic device in the methods in any one of the foregoing aspects. The function may be implemented by hardware, or may be implemented by hardware executing corresponding software. The hardware or software includes one or more modules or units that correspond to the foregoing function.

According to a sixth aspect, an embodiment of this application provides a chip, where the chip is coupled to a memory in an electronic device, to perform the method according to any one of the foregoing aspects.

According to a seventh aspect, an embodiment of this application provides a computer storage medium, where the computer storage medium stores a program instruction, and when the program instruction is run on an electronic device, the electronic device is enabled to perform the method according to any one of the foregoing aspects.

According to an eighth aspect, an embodiment of this application provides a computer program product, where when the computer program product runs on an electronic device, the electronic device is enabled to perform the method according to any one of the foregoing aspects.

In addition, for technical effects brought by the fourth aspect to the eighth aspect, refer to the descriptions in the first aspect to the third aspect. Details are not described herein again.

It should be noted that "couple" in the embodiments of this application indicates direct combinations or indirect combinations of two parts.

DESCRIPTION OF EMBODIMENTS

This application may be applied to an electronic device. In some embodiments of this application, the electronic device may be an electronic device that includes a function such as a personal digital assistant and/or a music player, for example, a smartphone, a tablet computer, or a wearable device (such as a smartwatch) having a wireless communication function. Example embodiments of the electronic device include but are not limited to carrying Android®, Microsoft®, or another operating system.

Usually, the electronic device supports a plurality of applications, for example, one or more of a drawing application, a presentation application, a word processing application, a game application, a telephony application, a video player application, a music player application, an email application, an instant message receiving and sending application, a photo management application, a camera application, a browser application, a calendar application, a clock application, a payment application, and a health management application.

The following uses an example in which the electronic device is a smartphone for specific description.

Figure 1:
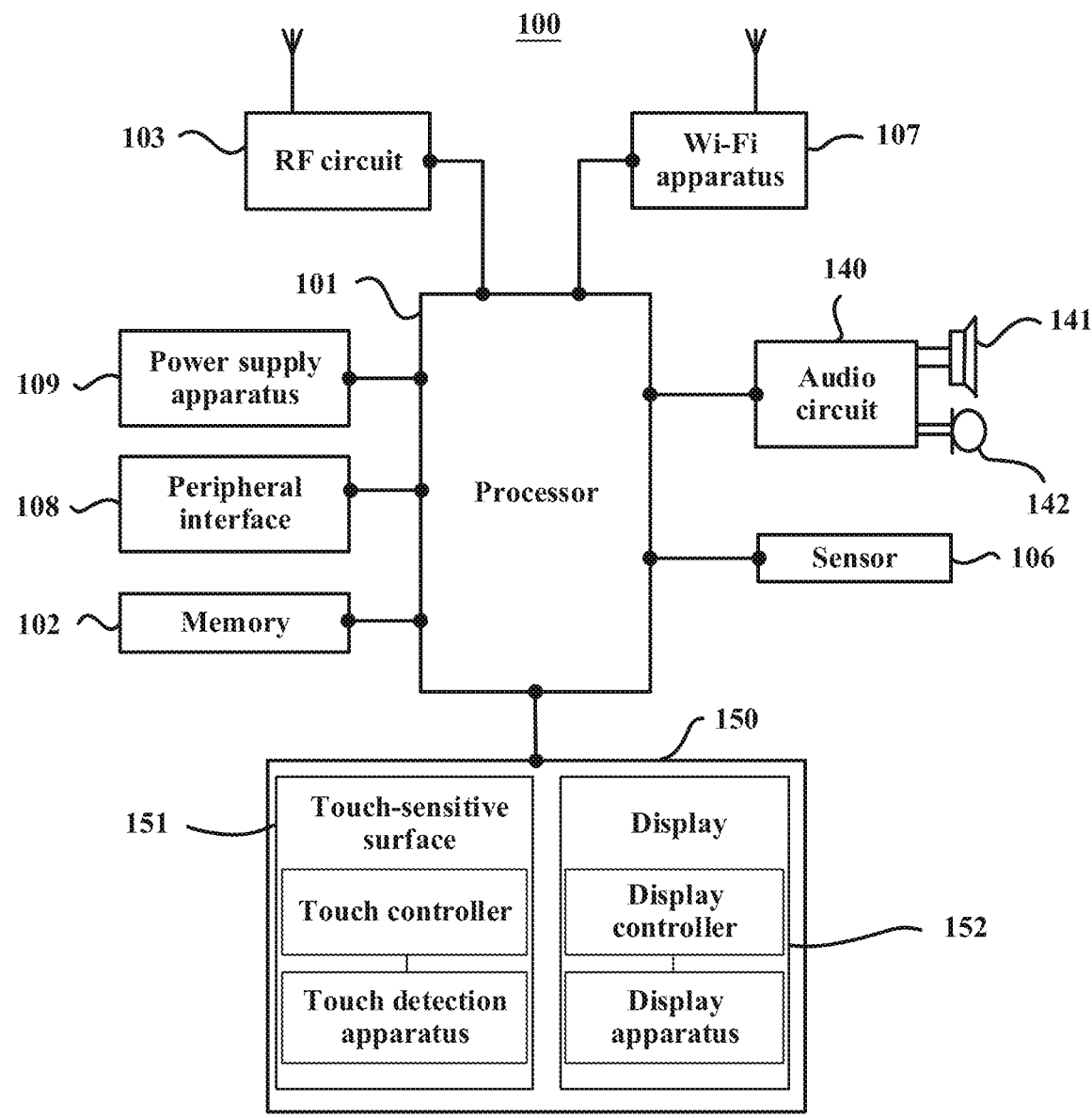
FIG. 1 is a schematic diagram of a hardware structure of a smartphone.

For example, FIG. 1 is a possible schematic diagram of a hardware structure of a smartphone. It should be understood that a mobile phone 100 shown in the figure is merely an example of the electronic device, and the mobile phone 100 may have more or fewer components than those shown in the figure, may combine two or more components, or may have different component configurations. Various components shown in the figure may be implemented on hardware, software, or a combination of hardware and software that includes one or more signal processing and/or application-specific integrated circuits.

The mobile phone 100 may include one or more processors 101, a memory 102, a radio frequency (radio frequency, RF) circuit 103, an audio circuit 140, a loudspeaker 141, a microphone 142, a touchscreen 150, one or more sensors 106, and a wireless fidelity (wireless fidelity, Wi-Fi) apparatus 107, a peripheral interface 108, and a power supply apparatus 109. These components may perform communication through one or more communications buses or signal cables (not shown in FIG. 1). A person skilled in the art may understand that the hardware structure shown in FIG. 1 does not constitute a limitation on the mobile phone 100. The mobile phone 100 may include more or fewer components than those shown in the figure, or combine some components, or have different component arrangements.

The following describes in detail the components of the mobile phone 100.

The processor 101 is a control center of the mobile phone 100. The processor 101 is connected to parts of the mobile phone 100 by using various interfaces and cables, runs or executes an application program (application, APP) stored in the memory 102, and invokes data and an instruction stored in the memory 102, to perform various functions of the mobile phone 100 and process data. For example, the processor 101 may establish a correspondence between a folder and an application, collect statistics on a most common folder path, and record a latest saved file, a folder path corresponding to the file, and the like.

In some embodiments, the processor 101 may include one or more processing units. An application processor and a modem processor may be integrated into the processor 101. The application processor mainly processes an operating system, a user interface, an application program, and the like, and the modem processor mainly processes wireless communication. It may be understood that, alternatively, the modem processor may not be integrated in the processor 101. For example, the processor 101 may be a Kirin 970 chip manufactured by Huawei Technologies Co., Ltd. In some other embodiments of this application, the processor 101 may further include a fingerprint verification chip, configured to verify a collected fingerprint.

The memory 102 is used to store an application program, data, and various operating systems such as an iOS® operating system developed by Apple and an Android® operating system developed by Google. The memory 102 mainly includes a program storage area and a data storage area. The program storage area may store an operating system and an application program required by at least one function (for example, a sound playing function and an image playing function). The data storage area may store data (for example, a phone book) created based on use of the mobile phone 100. For example, the data storage area may store a photo or a video shot by the user by using the mobile phone 100, or audio recorded by the user by using the mobile phone 100. The data storage area may further store a file such as a picture downloaded by the user, or a document created by the user, or the like. In addition, the memory 102 may include a high-speed random access memory, and may further include a non-volatile memory, for example, a magnetic disk storage device, a flash storage device, or another non-volatile solid-state storage device.

The RF circuit 103 may be configured to send and receive a radio signal in an information sending and receiving process or in a call process. Specifically, the RF circuit 103 may receive downlink data from a base station and then send the downlink data to the processor 101 for processing. In addition, the RF circuit 103 may further send uplink data to the base station. Usually, the RF circuit 103 usually includes but is not limited to an antenna, at least one amplifier, a transceiver, a coupler, a low noise amplifier, a duplexer, and the like. In addition, the RF circuit 103 may further communicate with another device through wireless communication. The wireless communication may use any communications standard or protocol, including but not limited to global system for mobile communications, a general packet radio service, code division multiple access, wideband code division multiple access, long term evolution, an email, a short message service, and the like.

The audio circuit 140, a speaker 141, and a microphone 142 may provide an audio interface between the user and the mobile phone 100. The audio circuit 140 may convert received audio data into an electrical signal and transmit the electrical signal to the speaker 141, and the speaker 141 converts the electrical signal into a sound signal for output. In addition, the microphone 142 converts a collected sound signal into an electrical signal, and the audio circuit 140 receives the electrical signal, converts the electrical signal into audio data, and then outputs the audio data to the RF circuit 103, to send the audio data to, for example, a mobile phone, or outputs the audio data to the memory 102 for further processing.

The touchscreen 150 may include a touch-sensitive surface 151 and a display 152. The touch-sensitive surface 151 (for example, a touch panel) may collect a touch event performed by the user of the mobile phone 100 on or near the touch-sensitive surface 151 (for example, an operation performed by the user on the touch-sensitive surface 151 or near the touch-sensitive surface 151 by using any suitable object such as a finger or a stylus), and send collected touch information to another component such as the processor 101. The touch event performed by the user near the touch-sensitive surface 151 may be referred to as a floating touch. The floating touch may mean that the user does not need to directly touch the touchpad for selecting, moving, or dragging an object (for example, an App icon), and the user only needs to be near the electronic device to execute a desired function. In an application scenario of the floating touch, terms such as "touch" and "contact" do not imply a direct contact with the touchscreen 150, but a contact near or close to the touchscreen 150. The touch-sensitive surface 151 on which the floating touch can be performed may be implemented in a capacitive type, an infrared light sensing type, an ultrasonic wave type, or the like.

The touch-sensitive surface 151 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touchpoint coordinates, and sends the touchpoint coordinates to the processor 101. The touch controller may further receive an instruction sent by the processor 101, and execute the instruction. In addition, the touch-sensitive surface 151 may be implemented in a plurality of types such as a resistive type, a capacitive type, an infrared type, and a surface acoustic wave type.

The display (also referred to as a display screen) 152 may be configured to display information entered by the user or information provided for the user, and various menus of the mobile phone 100. The display 152 may include two parts: a display controller and a display apparatus. The display controller is configured to receive a signal or data sent by the processor 101, to drive to display a corresponding screen on the display apparatus. For example, in this embodiment of this application, the display apparatus may be configured by using an LCD (liquid crystal display, a liquid crystal display), an organic light-emitting diode (organic light-emitting diode, OLED), or the like. For example, the display apparatus is configured by using an active matrix organic light-emitting diode (active matrix organic light emitting diode, AMOLED).

It should be understood that the touch-sensitive surface 151 may cover the display 152. After detecting a touch event on or near the touch-sensitive surface 151, the touch-sensitive surface 151 transmits the touch event to the processor 101 to determine a type of the touch event, and then the processor 101 may provide corresponding visual output on the display 152 based on the type of the touch event.

Although in FIG. 1, the touch-sensitive surface 151 and the display 152 are used as two independent components to implement input and output functions of the mobile phone 100, in some embodiments, the touch-sensitive surface 151 and the display 152 may be integrated to implement the input and output functions of the mobile phone 100. It may be understood that the touchscreen 150 is formed by stacking a plurality of layers of materials. In this embodiment of this application, only the touch-sensitive surface (layer) and the display (layer) are shown, and another layer is not described in this embodiment of this application. In addition, in some other embodiments of this application, the touch-sensitive surface 151 may cover the display 152, and a size of the touch-sensitive surface 151 is greater than a size of the display 152, so that the display 152 is completely covered by the touch-sensitive surface 151. Alternatively, the touch-sensitive surface 151 may be disposed on a front of the mobile phone 100 in a form of a full panel, in other words, touch of the user on the front of the mobile phone 100 can be sensed by the mobile phone. Therefore, full touch experience on the front of the mobile phone can be implemented. In some other embodiments, the touch-sensitive surface 151 is disposed on a front of the mobile phone 100 in a full panel form, and the display 152 may also be disposed on the front of the mobile phone 100 in a full panel form. Therefore, a bezel-less structure can be implemented on the front of the mobile phone. In some other embodiments of this application, the touchscreen 150 may further include a series of pressure sensor arrays, so that the mobile phone can sense pressure exerted on the touchscreen 150 by the touch event.

The one or more sensors 106 may be a light sensor, a motion sensor, another sensor, and the like. Specifically, the light sensor may include an ambient light sensor and a proximity sensor. The ambient light sensor may adjust luminance of the display 152 based on brightness of ambient light, and the proximity sensor may turn off a power supply of the display 152 when the mobile phone 100 moves to an ear. As a motion sensor, an accelerometer sensor may detect acceleration values in all directions (usually on three axes), may detect a value and a direction of gravity when the accelerometer sensor is stationary, and may be applied to an application to recognize a mobile phone posture (for example, screen switching between landscape and portrait modes, a related game, and magnetometer posture calibration), a function related to vibration recognition (such as a pedometer and a knock), and the like.

In some embodiments of this application, the sensor 106 may further include a fingerprint sensor. For example, the fingerprint sensor may be disposed on a rear side of the mobile phone 100 (for example, below the rear-facing camera), or the fingerprint sensor is disposed on the front side of the mobile phone 100 (for example, below the touchscreen 150). In addition, a fingerprint recognition function may be implemented by configuring the fingerprint sensor on the touchscreen 150. To be specific, the fingerprint sensor may be integrated with the touchscreen 150 to implement the fingerprint recognition function of the mobile phone 100. In this case, the fingerprint sensor may be disposed on the touchscreen 150, or may be a part of the touchscreen 150, or may be disposed on the touchscreen 150 in another manner. In addition, the fingerprint sensor may be further implemented as a full-panel fingerprint sensor. Therefore, the touchscreen 150 may be considered as a panel on which a fingerprint may be collected at any position. In some embodiments, the fingerprint sensor may process a collected fingerprint (for example, verify the collected fingerprint), and send a fingerprint processing result (for example, whether the fingerprint passes verification) to the processor 101, and the processor 101 performs corresponding processing based on the fingerprint processing result. In some other embodiments, the fingerprint sensor may further send the collected fingerprint to the processor 101, so that the processor 101 processes the fingerprint (for example, verifies the fingerprint). The fingerprint sensor in this embodiment of this application may use any type of sensing technology, including but not limited to an optical sensing technology, a capacitive sensing technology, a piezoelectric sensing technology, an ultrasonic sensing technology, or the like. In addition, for a specific technical solution of integrating the fingerprint sensor into the touchscreen 150 in this embodiment of this application, refer to patent application No. US 2015/0036065 A1, filed with the United States Patent and Trademark Office and entitled "FINGERPRINT SENSOR IN ELECTRONIC DEVICE", which is incorporated in the embodiments of this application by reference in its entirety. In addition, other sensors such as a gyroscope, a barometer, a hygrometer, a thermometer, and an infrared sensor may be configured in the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband internet access for the user. In some other embodiments, the Wi-Fi apparatus 107 may also be used as a Wi-Fi wireless access point, to provide Wi-Fi network access for another device.

The peripheral interface 108 is configured to provide various interfaces for an external input/output device (for example, a keyboard, a mouse, an external display, an external memory, or a subscriber identification module card). For example, the peripheral interface 108 is connected to the mouse by using a universal serial bus interface, and is connected to a SIM card provided by an operator by using a metal contact on a card slot of the subscriber identification module card. The peripheral interface 108 may be configured to couple the external input/output peripheral device to the processor 101 and the memory 102.

The mobile phone 100 may further include the power supply apparatus 109 (for example, a battery and a power management chip) that supplies power to the components. The battery may be logically connected to the processor 101 by using the power management chip, so that functions such as charging, discharging, and power consumption management are managed by using the power supply apparatus 109.

Although not shown in FIG. 1, the mobile phone 100 may further include a Bluetooth apparatus, a positioning apparatus, a camera (for example, a front-facing camera or a rear-facing camera), a flashlight, a micro projection apparatus, a near field communication (near field communication, NFC) apparatus, or the like. Details are not described herein. The front-facing camera may be configured to capture facial feature information, and the processor 101 may perform facial recognition on the facial feature information, to perform subsequent processing.

The following describes the embodiments of this application in detail by using the mobile phone 100 as an example. To help the user search for a file on the mobile phone 100, a folder corresponding to each application installed on the mobile phone 100 may be prompted to the user. In this way, when searching for a file stored by using an application (for example, WeChat), the user can narrow a file search scope, to help improve efficiency of searching for a file by the user.

Figure 2:
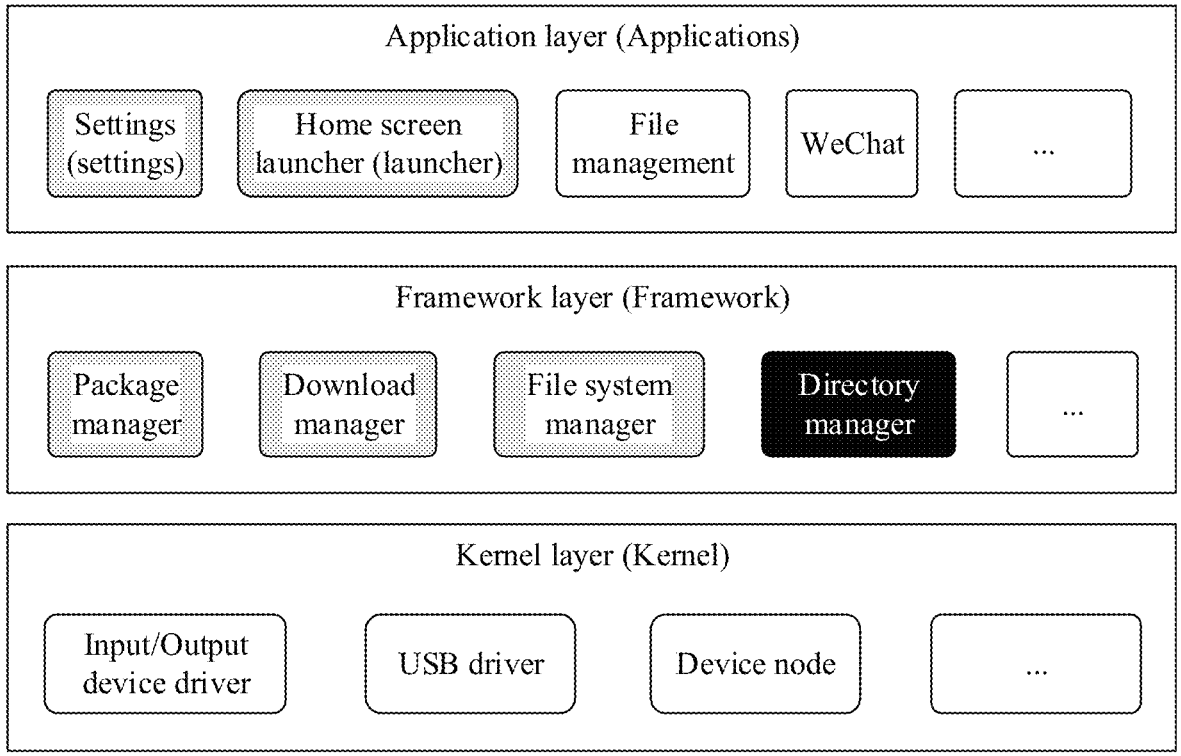
FIG. 2 is a schematic architectural diagram of an operating system according to an embodiment of this application.

An Android operating system is used as an example. For example, the Android operating system in this embodiment of this application is shown in FIG. 2. As shown in FIG. 2, the Android operating system mainly includes a kernel layer (Kernel), a framework layer (Framework), and an application layer (Applications). In some embodiments, a system runtime library (libraries) layer may further be included between the kernel layer and the framework layer. The system runtime library layer provides support for an upper layer, that is, the framework layer. When the framework layer is used, a C/C++ library included in the system runtime library layer may be invoked to implement a function to be implemented by the framework layer.

The kernel layer is a hardware abstract layer (hardware abstract layer, HAL) between hardware and software, and is an abstraction of specific implementation of a hardware device. The kernel layer may include an input/output device driver (such as a keyboard driver, a touchscreen driver, a headset driver, a speaker driver, and a microphone driver), a universal serial bus (universal serial bus, USB) driver, a device node, and the like. When the user performs an operation on the input device, the input device driver is configured to convert the operation performed by the user on the input device into an input event, and report the input event to the framework layer or the application layer.

The framework layer includes a package manager (package manager), a download manager (download manager), a file system manager (file system manager), a directory manager (directory manager), and the like. The package manager is configured to: after an installation package of an application is obtained, install a corresponding application based on the installation package, and record an installation progress of the application, and the like. After being invoked by an application at the application layer, the download manager is configured to download a corresponding file, record a download progress of the file, and store the file into a specified folder after the file is successfully downloaded. After being invoked by an application at the application layer, the package manager at the framework layer, the download manager, or the like, the file system manager is configured to create a folder in the memory 102 (for example, sdcard) of the mobile phone 100. It should be noted that the directory manager is a newly added module in this embodiment of this application, and may be configured to record a correspondence among a folder name, an application name, and a folder path. For example, if the file system manager creates a folder named "Weixin" in a local folder sdcard of WeChat, the file system manager stores a correspondence among a folder name "Weixin", an application name "WeChat", and a path "sdcard/Weixin" of the folder Weixin in the directory manager. For example, a correspondence among "Weixin", "WeChat", and "sdcard/Weixin" may be shown in Table 1.

TABLE 1

| Application name | Folder name | File path |
|---|---|---|
| WeChat | Weixin | sdcard/Weixin |

The application layer includes a native application (native application) (for example, settings, a home screen, and file management) and a third-party application (for example, WeChat) that are installed on the mobile phone 100. The application at the application layer is configured to: receive the input event reported by the input device, perform corresponding processing on the input event, and output the input event by using the output device (for example, a display screen), so that the user can view the input event.

To enable the mobile phone 100 to notify the user of a correspondence between an application and a folder, a related user interface may be displayed on the touchscreen 150 of the mobile phone 100 to notify the user of the correspondence between an application and a folder. An example in which a first user interface is used to prompt a folder corresponding to WeChat is used. If the mobile phone 100 detects a first operation on the touchscreen 150, in response to the first operation, the mobile phone 100 may display the first user interface on the touchscreen 150. The first user interface includes a folder control, and the folder control is used to indicate the folder corresponding to WeChat. If the mobile phone 100 detects an operation on the folder control, in response to the operation, the mobile phone 100 may display, on the touchscreen 150, a content details screen of the folder corresponding to WeChat. For example, the first user interface in this embodiment of this application may be a setting screen corresponding to WeChat.

In an example, as shown in FIG. 2, the directory manager is added to the framework layer. The directory manager may be configured to store a correspondence among a folder name, an application name, and a folder path. When content stored in the directory manager changes, the change is reported to settings at the application layer, and the settings generates or refreshes the first user interface based on information reported by the directory manager.

Figure 3:
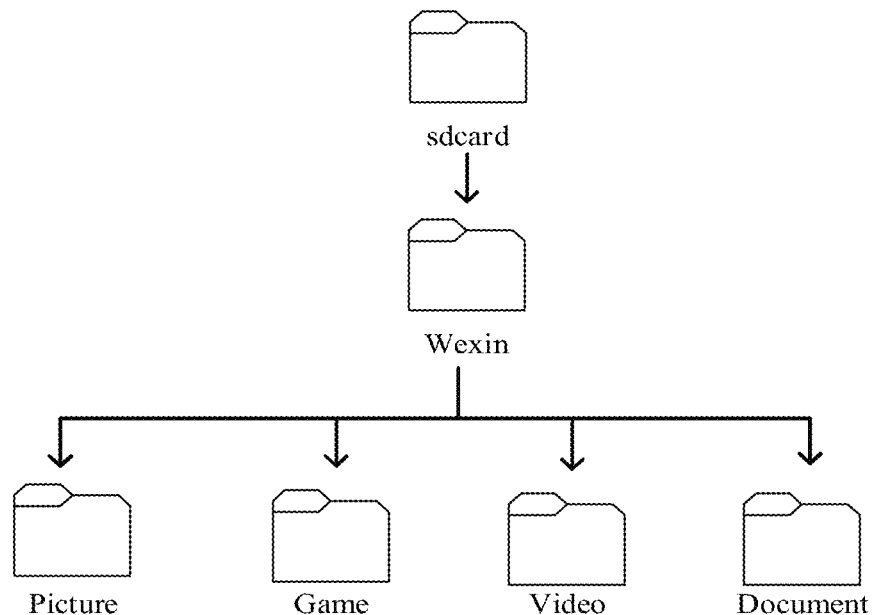
FIG. 3 is a schematic diagram of a file structure according to an embodiment of this application.

For example, as shown in FIG. 3, in a WeChat installation process, the file system manager at the framework layer creates a root folder Weixin, a subfolder Picture, a subfolder Game, a subfolder Video, and a subfolder Document in a folder sdcard. The subfolder Picture is used to store a picture transmitted by the user in a process of chatting by using WeChat. The subfolder Game is used to store data generated when the user use a WeChat game. The subfolder Video is used to store a video transmitted by the user in a process of chatting. The subfolder Document is used to store a program file related to WeChat running. The file system manager at the framework layer may store a correspondence between a name "Weixin" of the root folder, a name "Weixin" of the application, and the path "sdcard/Weixin" of the root folder in the directory manager at the framework layer.

After storing the correspondence among "Weixin", "WeChat", and "sdcard/Weixin", the directory manager may report the correspondence among "Weixin", "WeChat", and "sdcard/Weixin" to the settings (Settings) at the application layer. Then, the settings may generate a first user interface for WeChat based on the correspondence among "Weixin", "WeChat", and "sdcard/Weixin". The first user interface is a user interface that is configured to manage WeChat and that is in the settings, the first user interface includes a control of the root folder Weixin, and the control of the root folder Weixin is used to indicate the root folder. If the mobile phone 100 detects an operation (for example, an operation such as tapping, touching and holding, or heavy pressing) on the control of the root folder Weixin, in response to the operation, the mobile phone 100 displays a content details screen of the root folder Weixin on the touchscreen 150. For example, the content details screen includes a subfolder or a specific file (for example, a picture or a video). In specific implementation, the content details screen may be a user interface for file management.

Figure 4A:
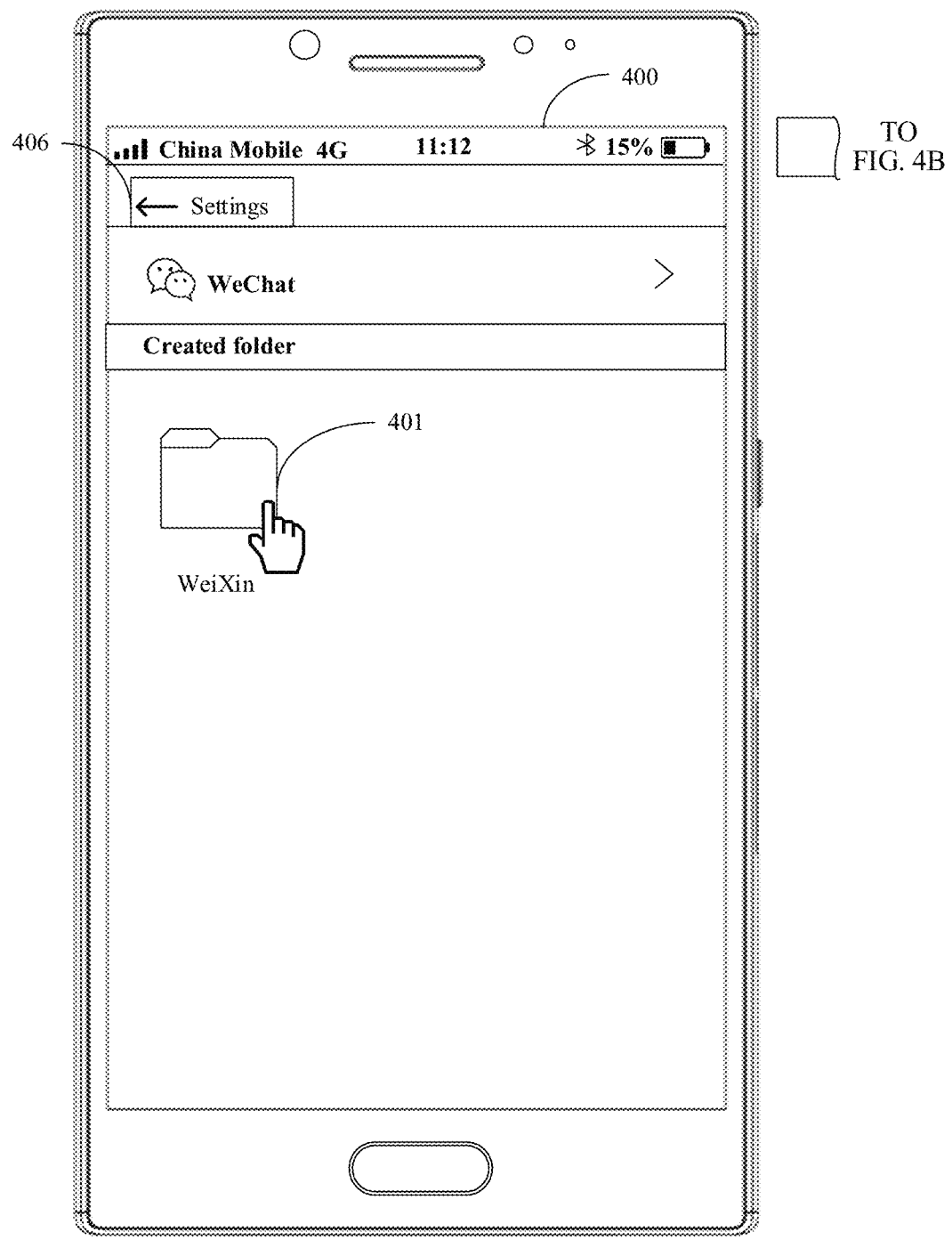
FIG. 4A and FIG. 4B are schematic diagrams of a user interface according to an embodiment of this application.
Figure 4B:
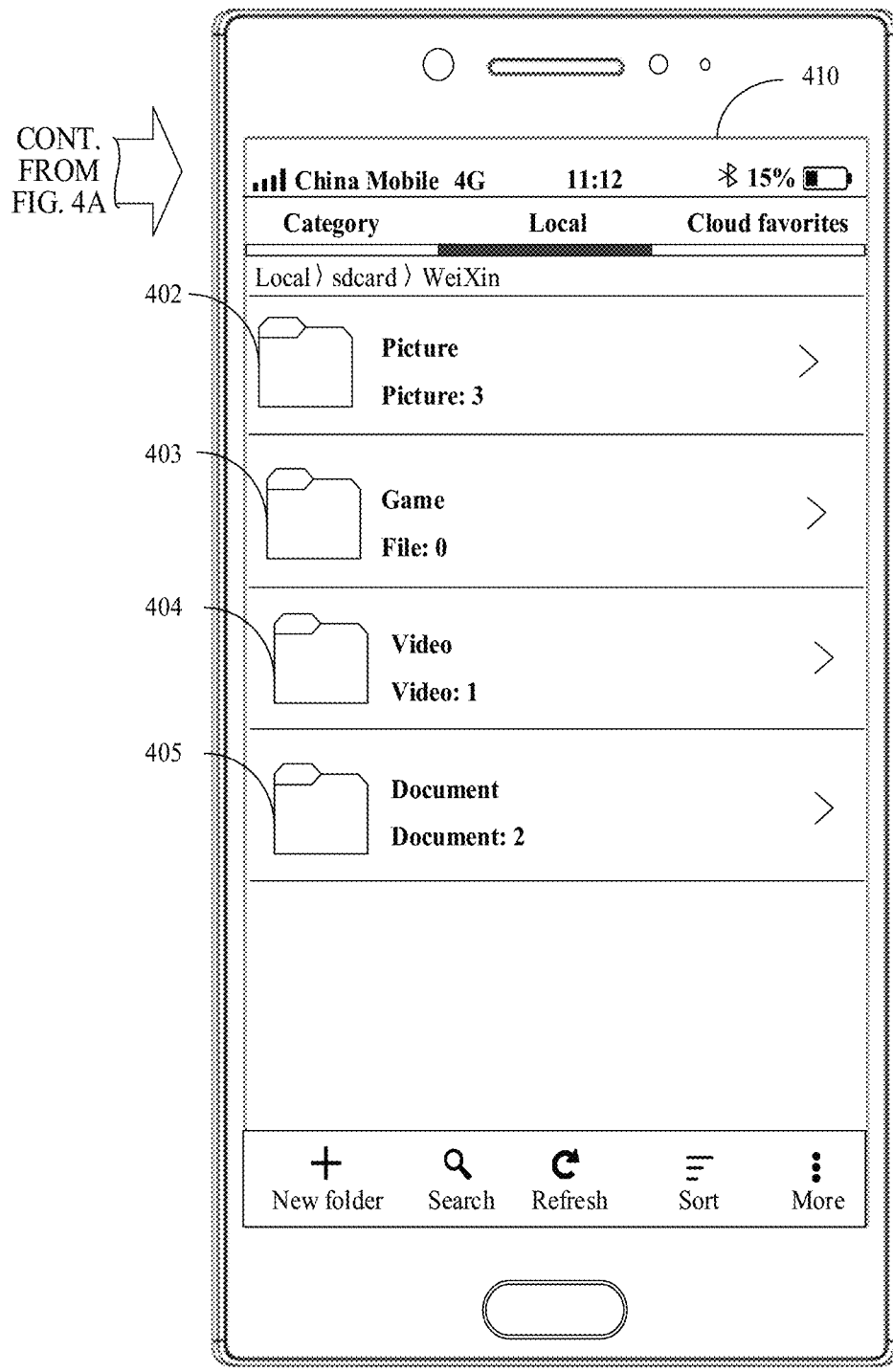

For example, the first user interface may be a user interface 400 shown in FIG. 4A, and the content details screen may be a user interface 410 shown in FIG. 4B. The user interface 400 includes a folder control 401. The folder control 401 is used to indicate a root folder Weixin. As shown in FIG. 4A, the folder control 401 is an icon of the root folder Weixin. Because the folder control may be implemented by using a folder icon, the first user interface may be simpler, and the user can conveniently view the folder control. In addition, in some other embodiments, the folder control 401 may be a path link of the root folder Weixin, or may be a virtual button, or the like. This is not limited herein.

In some embodiments, the user interface 400 further includes a control 406 configured to return to an upper-level setting menu. The user interface 410 includes a control 402 indicating a subfolder Picture, a control 403 indicating a subfolder Game, a control 404 indicating a subfolder Video, and a control 405 indicating a subfolder Document. The control 402 is configured to receive input of the user, and display, on the touchscreen 150, a user interface including content of the subfolder Picture. The control 403 is configured to receive input of the user, and display, on the touchscreen 150, a user interface including content of the subfolder Game. The control 404 is configured to receive input of the user, and display, on the touchscreen 150, a user interface including content of the subfolder Video. The control 405 is configured to receive input of the user, and display, on the touchscreen 150, a user interface including content of the subfolder Document. The control 401 is used as an example. If the mobile phone 100 detects an operation of touching the control 401 by the user, in response to the operation, the mobile phone 100 may display the user interface 410 on the touchscreen 150. Because the user may perform an operation on the folder control 401, the touchscreen 150 can display the user interface 410, and all controls displayed in the user interface 410 are used to indicate subfolders corresponding to WeChat, the user can determine folders correspond to WeChat. This helps improve, to some extent, efficiency of searching for a file stored in a process of using WeChat by the user.

In addition, in some embodiments, as shown in FIG. 4B, the user interface 410 may further include some function controls, for example, new folder, search, refresh, sort, and more. These function controls help the user easily find and operate a folder.

Figure 5:
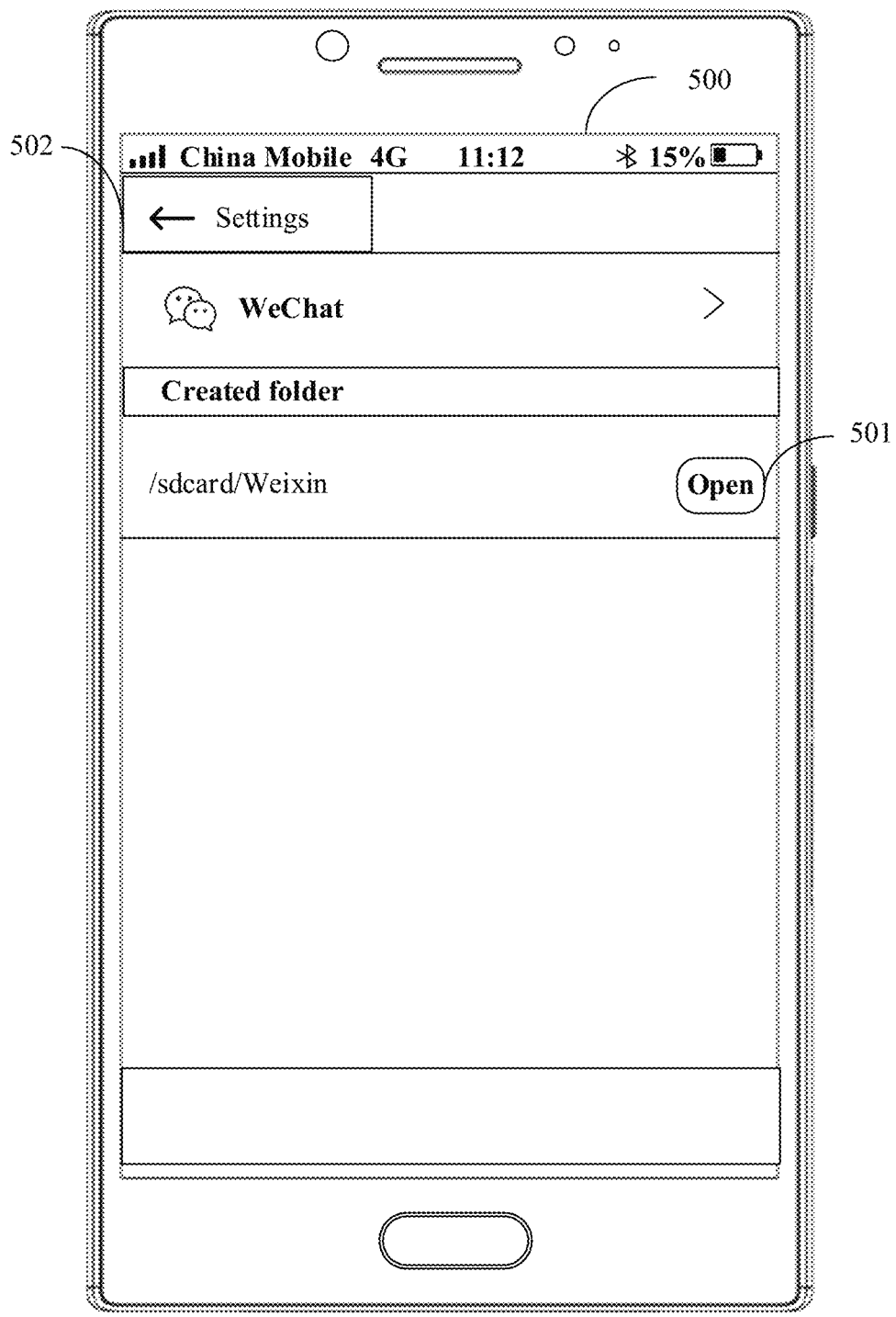
FIG. 5 is a schematic diagram of a user interface according to another embodiment of this application.

In some other embodiments of this application, the first user interface for WeChat may alternatively be a user interface 500 shown in FIG. 5. The user interface 500 includes path information "sdcard/Weixin" of the root folder Weixin and a control 501. The control 501 is configured to receive input of the user, and display a content details screen of the root folder Weixin on the touchscreen 150. For example, the content details screen may be the user interface 410 in FIG. 4B. An example in which the content details screen is the user interface 410 shown in FIG. 4B is used. If the mobile phone 100 detects an operation of touching the control 501 by the user, in response to the operation, the mobile phone 100 may display the user interface 410 on the touchscreen 150. In some other embodiments, the first user interface further includes a control 502. The control 502 is configured to return to an upper-level setting menu.

In some other embodiments, the file system manager at the framework layer may store, to the directory manager, names of subfolders included in the root folder WeiXin, an application name "WeChat", and paths corresponding to the subfolders. The directory manager reports the names of the subfolders, the name of the application, and the paths corresponding to the subfolders to the settings of the application layer. The settings generates the first user interface based on the names of subfolders, the name of the application, and the paths corresponding to the subfolders. The first user interface includes a control corresponding to each subfolder. In this scenario, a file structure of the root folder Weixin shown in FIG. 3 is used as an example. For example, the first user interface may be a user interface 600 shown in FIG. 6A. The user interface 600 includes a control 602 indicating a subfolder Picture, a control 603 indicating a subfolder Game, a control 605 indicating a subfolder Video, and a control 606 indicating a subfolder Document. The control 602 is configured to receive input of the user, and display, on the touchscreen 150, content included in the subfolder Picture. The control 603 is configured to receive input of the user, and display, on the touchscreen 150, content included in the subfolder Game. The control 604 is configured to receive input of the user, and display, on the touchscreen 150, content included in the subfolder Video. The control 605 is configured to receive input of the user, and display, on the touchscreen 150, content included in the subfolder Document. For example, if the mobile phone 100 detects an operation of touching the control 602 by the user, in response to the operation, the mobile phone 100 displays the user interface 610 on the touchscreen 150. The user interface 610 is configured to display content included in the subfolder Picture. In some other embodiments, the user interface 600 further includes a control 601. The control 601 is used to return to display an upper-level setting menu. Because the first user interface directly includes a subfolder control, a folder corresponding to WeChat can be more intuitively prompted to the user, to improve user experience.

During specific implementation, controls in the user interface 600 may be sorted based on a time sequence of latest storage of a file in each subfolder, or may be sorted based on a sequence of initial letters of names of subfolders, or may be sorted based on a sequence of creating subfolders in a WeChat installation process, or may be sorted in descending order of frequencies of storing files in the subfolders, and the like. This is not limited herein. For example, the controls are sorted based on a time sequence of latest storage of the files, if the last time when a picture is saved in the subfolder Picture is May 18, 2018, no file is saved in the subfolder Game, the last time when a file is saved in the subfolder Video is May 30, 2018, and the last time when a file is saved in the subfolder Document is Jun. 1, 2018, in this case, the mobile phone 100 displays, from top to bottom, the controls of the subfolders on the touchscreen 150 in the following order: the subfolder Document, the subfolder Video, the subfolder Picture, and the subfolder Game. In some embodiments, because the subfolder Game does not include a file, the user interface 600 shown in FIG. 6A may further not include (in other words, not display) the control 603. If the controls in the user interface 600 may be arranged based on the time sequence of latest storage of a file in each subfolder, this helps the user understand time at which the subfolders store files most recently, and helps improve convenience of searching for a file or a folder to some extent.

In some other embodiments of this application, because the subfolder Document is used to store a program file related to running WeChat, but is not used to store a user file, the file system manager may not store the subfolder Document in the directory manager. In this scenario, the user interface 600 shown in FIG. 6A may further not include the control 605. In the foregoing manner, a range in which the user searches for a file is narrowed, to further improve efficiency of searching for a file or a folder by the user.

Figure 6A:
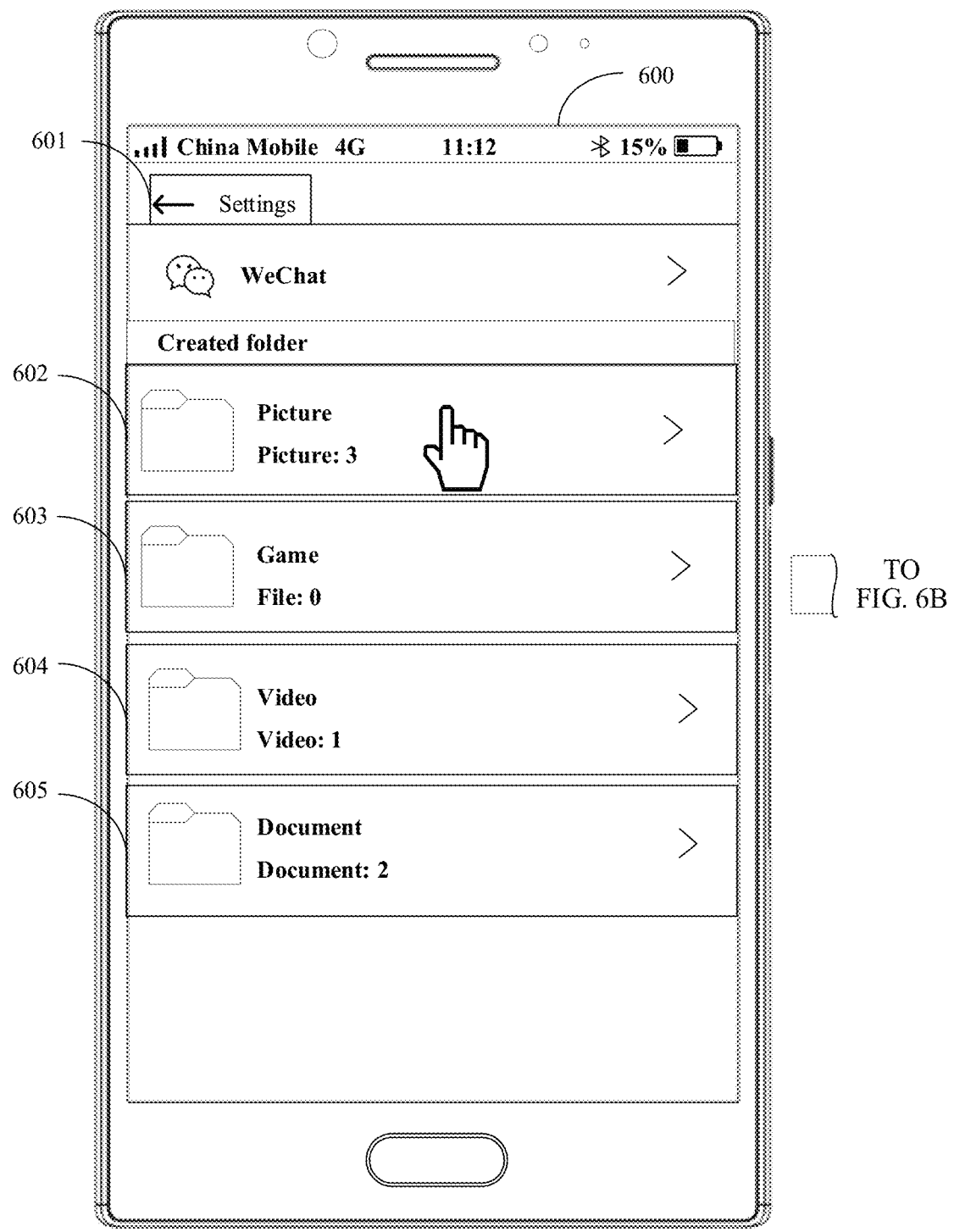
FIG. 6A and FIG. 6B are schematic diagrams of some other user interfaces according to another embodiment of this application.
Figure 6B:
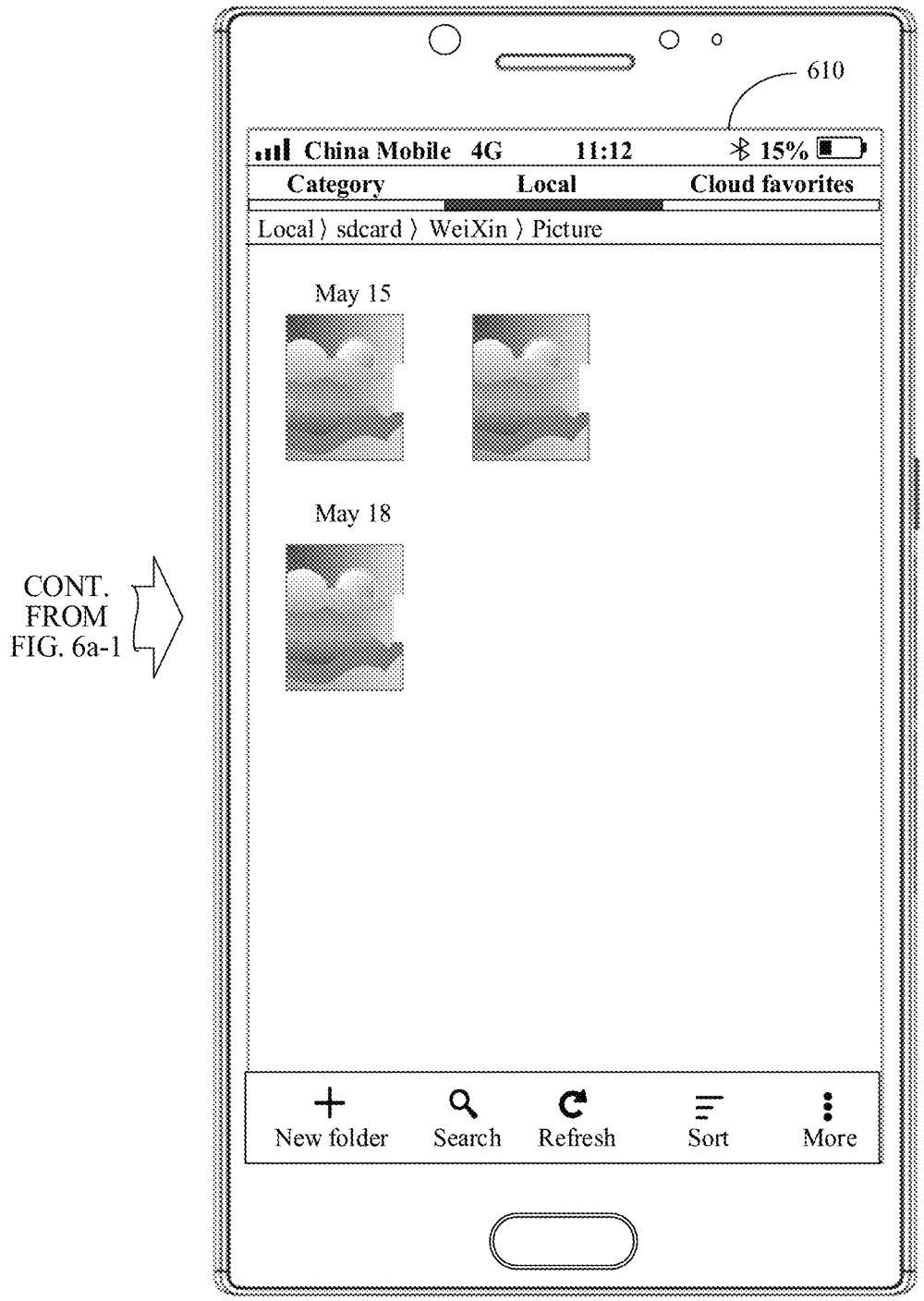
Figure 6C:
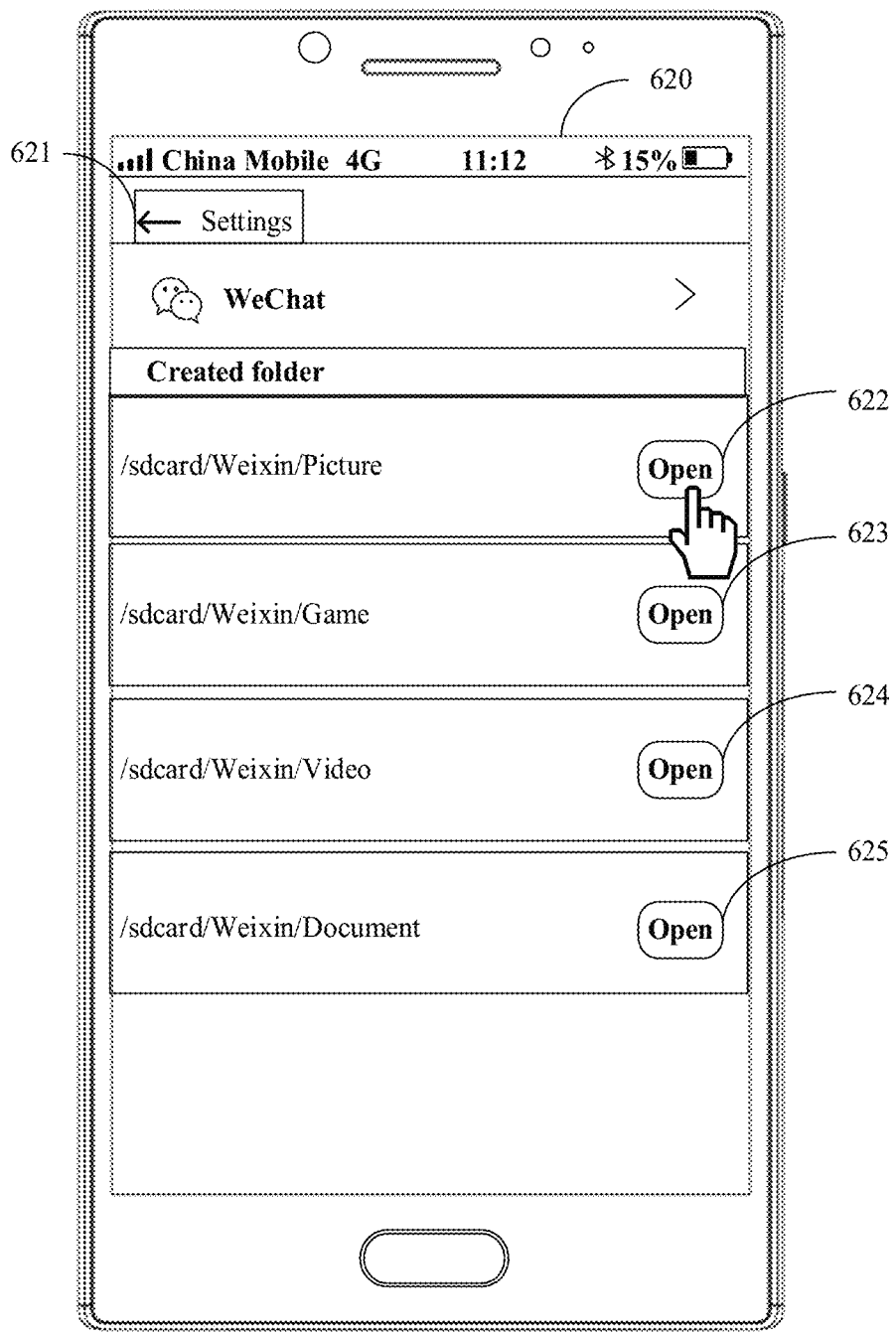
FIG. 6C is a schematic diagram of another user interface according to another embodiment of this application.

In some other examples, the first user interface may further be a user interface 620 shown in FIG. 6C. For example, the user interface 620 includes a path and a control 622 of a subfolder Picture, a path and a control 623 of a subfolder Game, a path and a control 624 of a subfolder Video, and a path and a control 625 of a subfolder Document. The control 622 is configured to receive input of the user, and display, on the touchscreen 150, content included in the subfolder Picture. The control 623 is configured to receive input of the user, and display, on the touchscreen 150, content included in the subfolder Game. The control 624 is configured to receive input of the user, and display, on the touchscreen 150, content included in the subfolder Video. The control 625 is configured to receive input of the user, and display, on the touchscreen 150, content included in the subfolder Document. For example, if the mobile phone 100 detects an operation of touching the control 622 by the user, in response to the operation, the mobile phone 100 displays the user interface 610 on the touchscreen 150. The user interface 610 is configured to display content included in the subfolder Picture. In some other embodiments, the user interface 600 further includes a control 621. The control 601 is configured to return to display an upper-level setting menu. The user interface 620 shown in FIG. 6C further includes a path of a subfolder in addition to a control, so that the user can more intuitively learn path information of the subfolder.

Figure 7A:
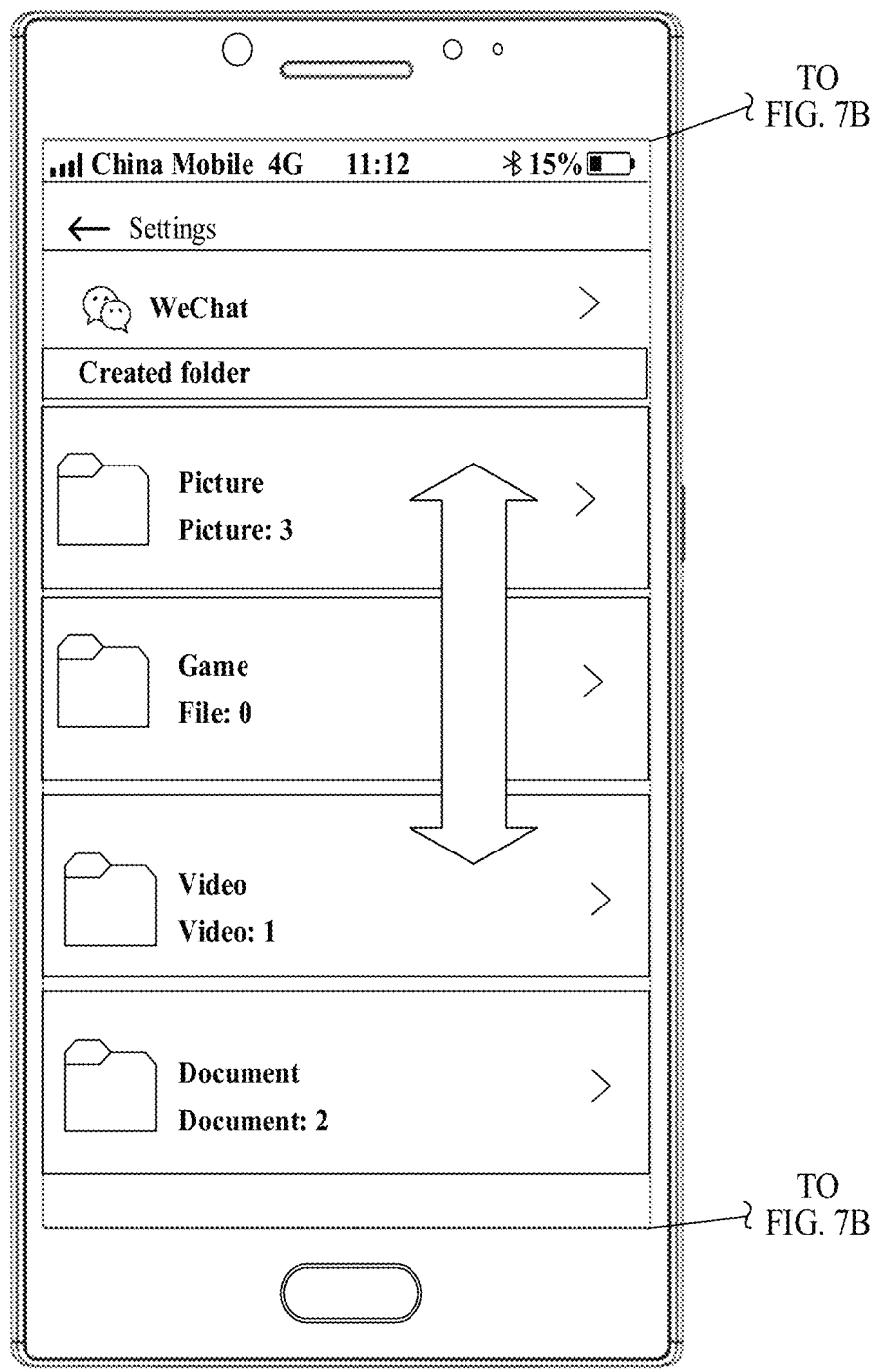
FIG. 7A and FIG. 7B are schematic diagrams of some other user interfaces according to another embodiment of this application.
Figure 7B:
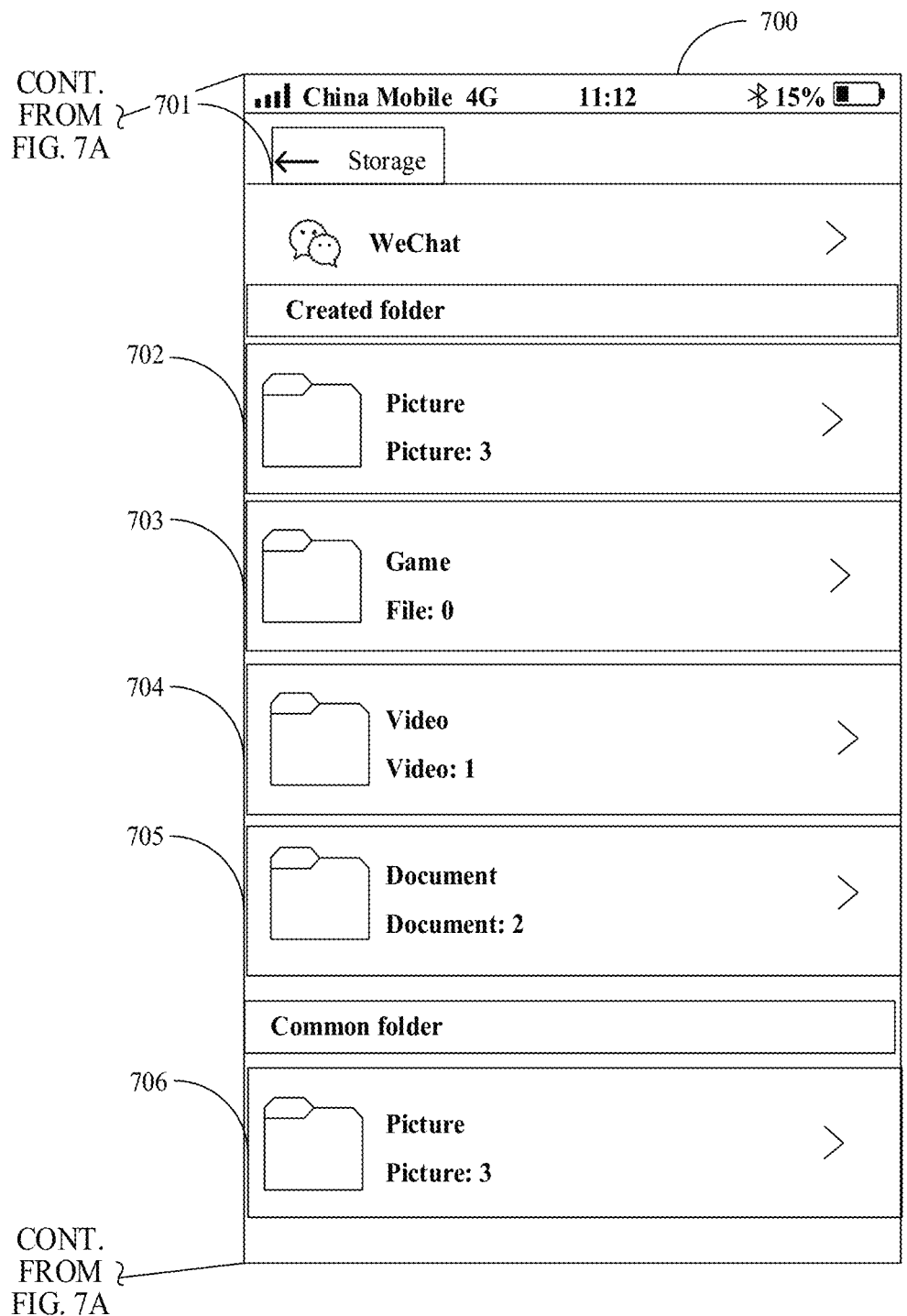

In some other embodiments of this application, the file system manager at the framework layer may further collect statistics on a frequency of storing a file in a subfolder at an interval of preset duration, and when storing a name of each subfolder, the name "WeChat" of the application, and a path corresponding to each subfolder to the directory manager, mark a name of a subfolder that is most frequently stored. For example, the subfolder Picture has the highest storage frequency, and a name of the subfolder Picture is marked as Picture-frequency No. 1. In this scenario, the settings at the application layer generates the first user interface based on information reported by the directory manager. For example, the first user interface may be a user interface 700 shown in FIG. 7B. A difference between the user interface 600 shown in FIG. 6A and the user interface 700 is that a control 707 of a common folder is added. Compared with the user interface 600, the user interface 700 more directly displays the common folder to the user. It may be understood that the user may display, on the touchscreen 150, content of a corresponding part of the user interface 700 by sliding up and down.

To ensure accuracy of the control of the common folder in the user interface 700, the file system manager saves a statistical result to the directory manager at an interval of preset duration. The directory manager compares whether the currently saved statistical result is the same as a previously saved statistical result, and if yes, deletes one statistical result, or if the currently saved statistical result is changed, saves the currently saved statistical result, and deletes the previously saved statistical result. Then, the directory manager reports the current statistical result to the settings, and the settings changes, based on the reported statistical result, the control of the common folder in the user interface 700 to a control of a folder in the statistical result. It should be noted that the preset duration may be correspondingly set based on an actual situation, for example, 2 hours or 30 minutes. This is not limited herein.

Figure 8:
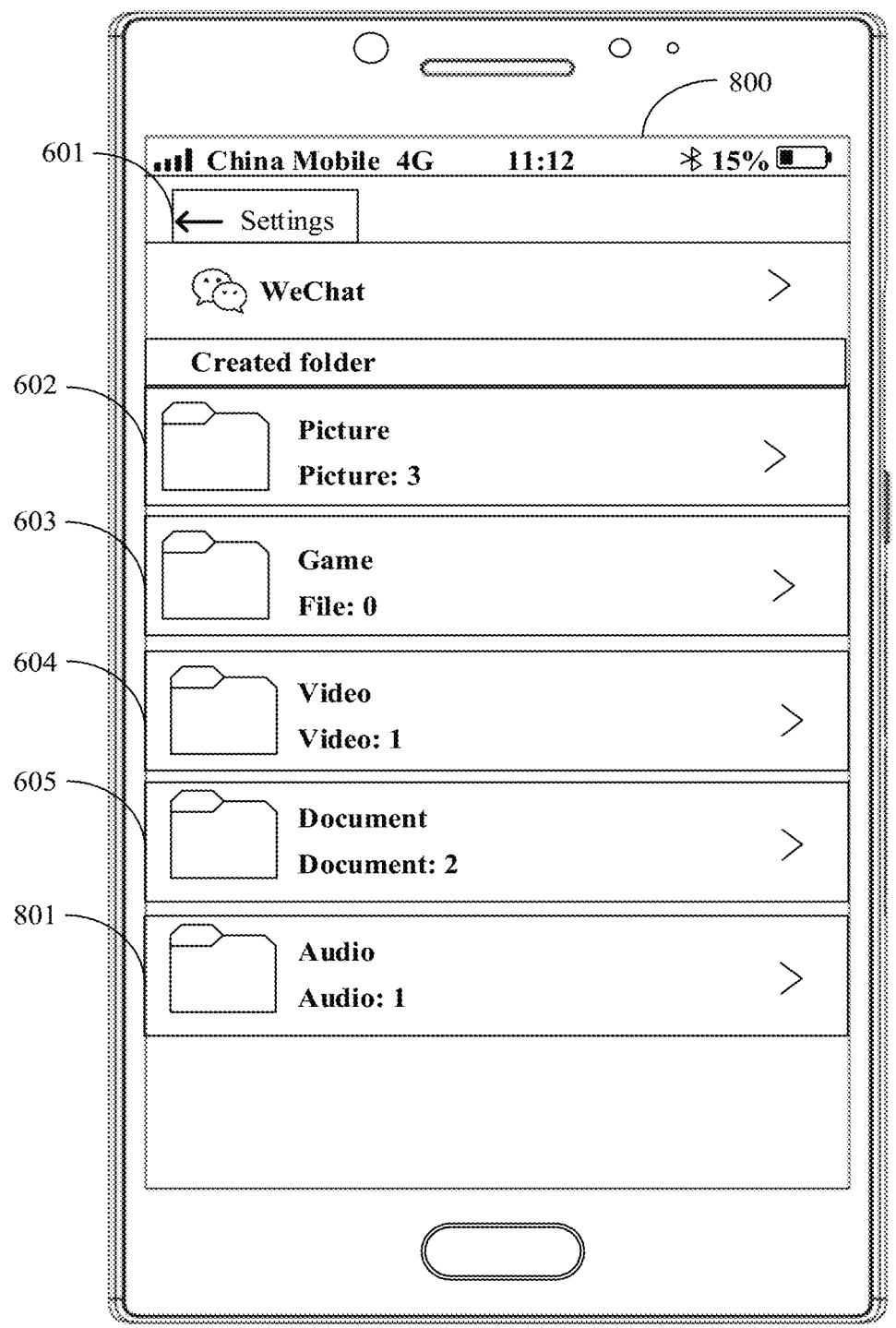
FIG. 8 is a schematic diagram of another user interface according to another embodiment of this application.

In addition, WeChat is used as an example. If the first user interface for WeChat includes controls of all subfolders, in a subsequent process in which the mobile phone 100 runs WeChat, a new subfolder may be created. To ensure reliability of the controls included in the first user interface for WeChat, when the file system manager creates a subfolder for WeChat, for example, the file system manager creates a subfolder Audio in a root folder Weixin, the file system manager stores a name "Audio" of the subfolder, a name "WeChat" of the application, and path information sdcard/Weixin/Audio of the subfolder Audio to the directory manager. The subfolder audio is used to cache an audio file. After detecting that "Audio", "WeChat", and "sdcard/Weixin/Audio" are stored, the directory manager reports "Audio", "WeChat", and "sdcard/Weixin/Audio" to the settings at the application layer. The settings refreshes the first user interface for WeChat based on "Audio", "WeChat", and "sdcard/Weixin/Audio". For example, if the first user interface before refreshing is the user interface 600 shown in FIG. 6A, the refreshed user interface can be a user interface 800 shown in FIG. 8. Different from the user interface 600, the user interface 800 includes a control 801, and the control 801 is configured to link to a user interface that displays content included in a subfolder Audio.

Figure 9A:
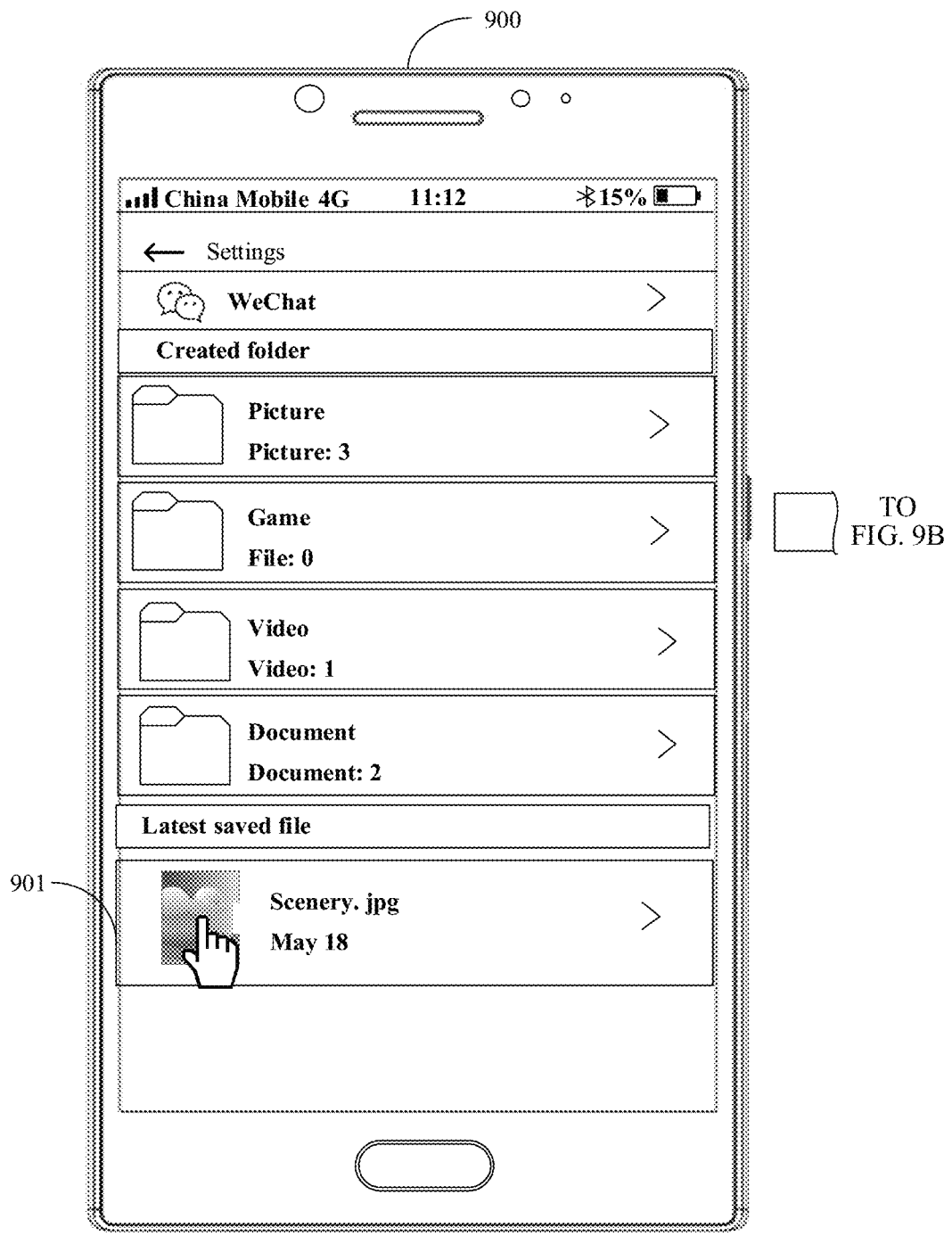
FIG. 9A and FIG. 9B are schematic diagrams of some other user interfaces according to another embodiment of this application.
Figure 9B:
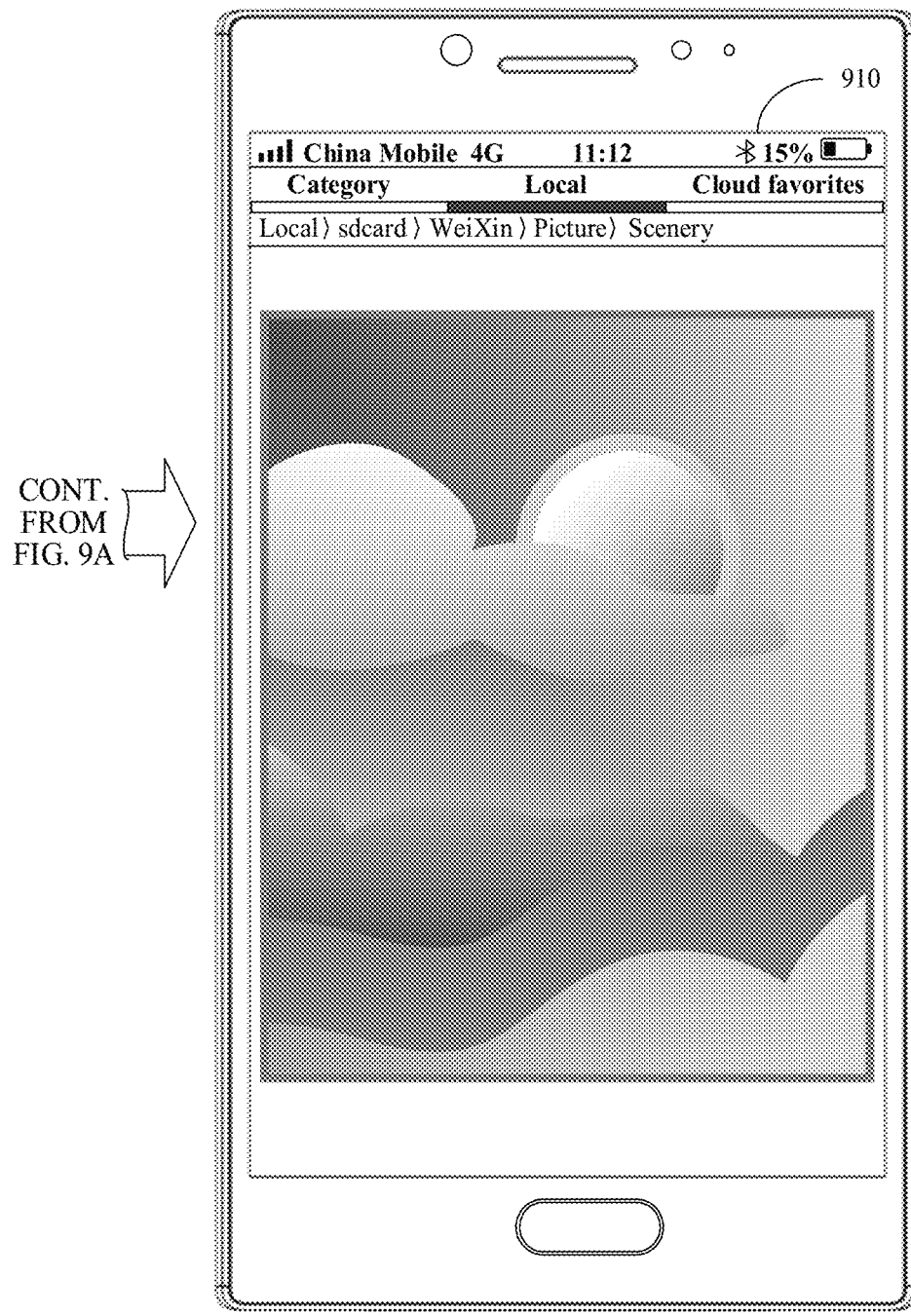

To help the user search for a latest file saved in a process of using an application, in some embodiments, after successfully executing a download task, the download manager or the file system manager saves a name of a downloaded file, a name of the application, and a path of the file to the directory manager. After detecting that the information is stored, the directory manager reports the information to the settings at the application layer. In this scenario, the first user interface generated by the settings for the application further includes a file control, and the file control is used to indicate a latest saved file. For example, the first user interface may be a user interface 900 shown in FIG. 9A. A difference between the user interface 900 and the user interface 600 shown in FIG. 6A is that the user interface 900 further includes a file control 901, and the file control 901 is used to indicate a latest saved file. For example, a latest saved file is a picture that is in the user interface 910 and that includes a name "scenery" is used. If the mobile phone 100 detects an operation of touching the file control 901 by the user, in response to the operation of touching the file control 901 by the user, the mobile phone 100 displays the user interface 910 on the touchscreen 150. It may be understood that the file control 901 may be a zoomed-out picture of the picture whose name is "scenery", or may be another identifier (such as the name of the picture, "scenery"). This is not limited herein.

When the file system manager or the download manager saves a new file, a name of the newly saved file, a name of an application, and a path of the file are saved to the directory manager. After detecting that the information is stored, the directory manager reports the information to the settings at the application layer. Then, the settings refreshes, based on the information, a control of the latest saved file included in the first user interface.

Figure 10:
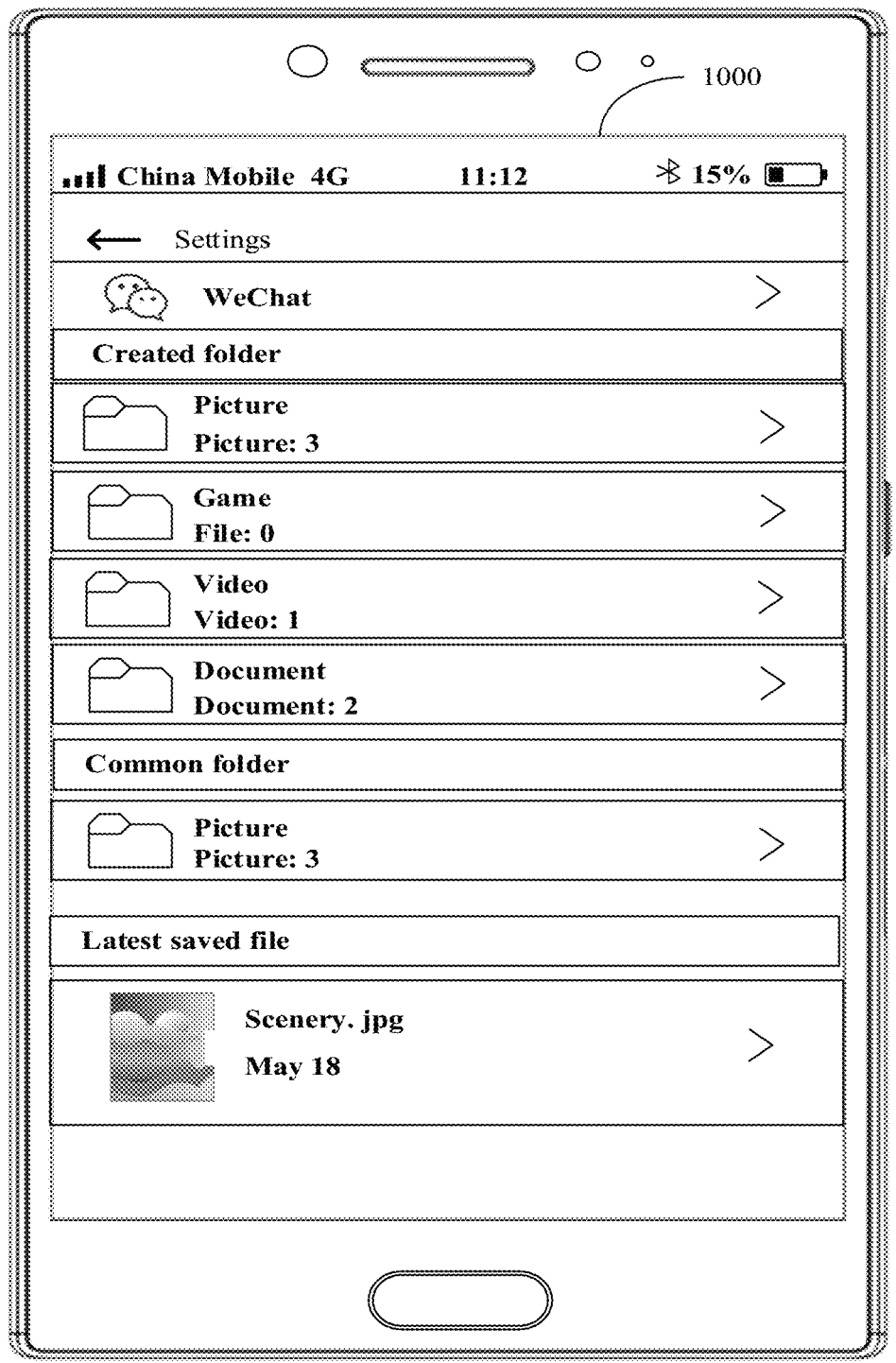
FIG. 10 is a schematic diagram of a user interface according to another embodiment of this application.

It should be noted that the first user interface in this embodiment of this application may further be a user interface 1000 shown in FIG. 10. The user interface 1000 includes controls of all subfolders included in a root folder Weixin, a control of a common folder, and a control of a latest saved file.

In some other embodiments of this application, to simplify an operation performed by the user on the mobile phone 100, so that the first user interface is displayed on the touchscreen 150, a control may be added to a system setting screen for WeChat. When the mobile phone 100 detects an operation on the control, in response to the operation, the mobile phone 100 displays the first user interface on the touchscreen 150. It should be noted that a name of the control is not limited in this embodiment of this application. For example, the name of the control may be application folder management, or may be folder management. The following uses the application folder management as an example.

Figure 11A:
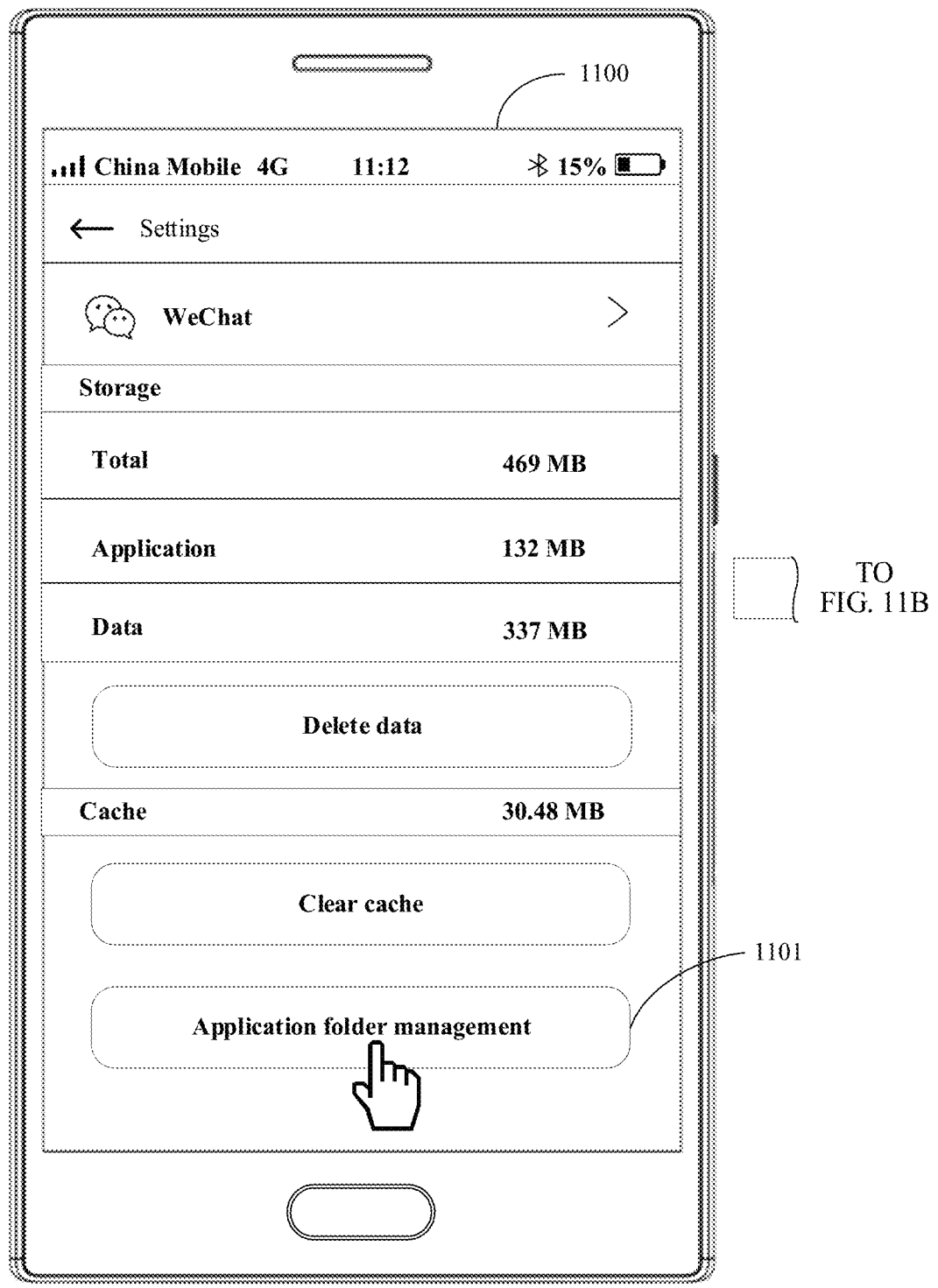
FIG. 11A and FIG. 11B are schematic diagrams of some other user interfaces according to another embodiment of this application.
Figure 11B:
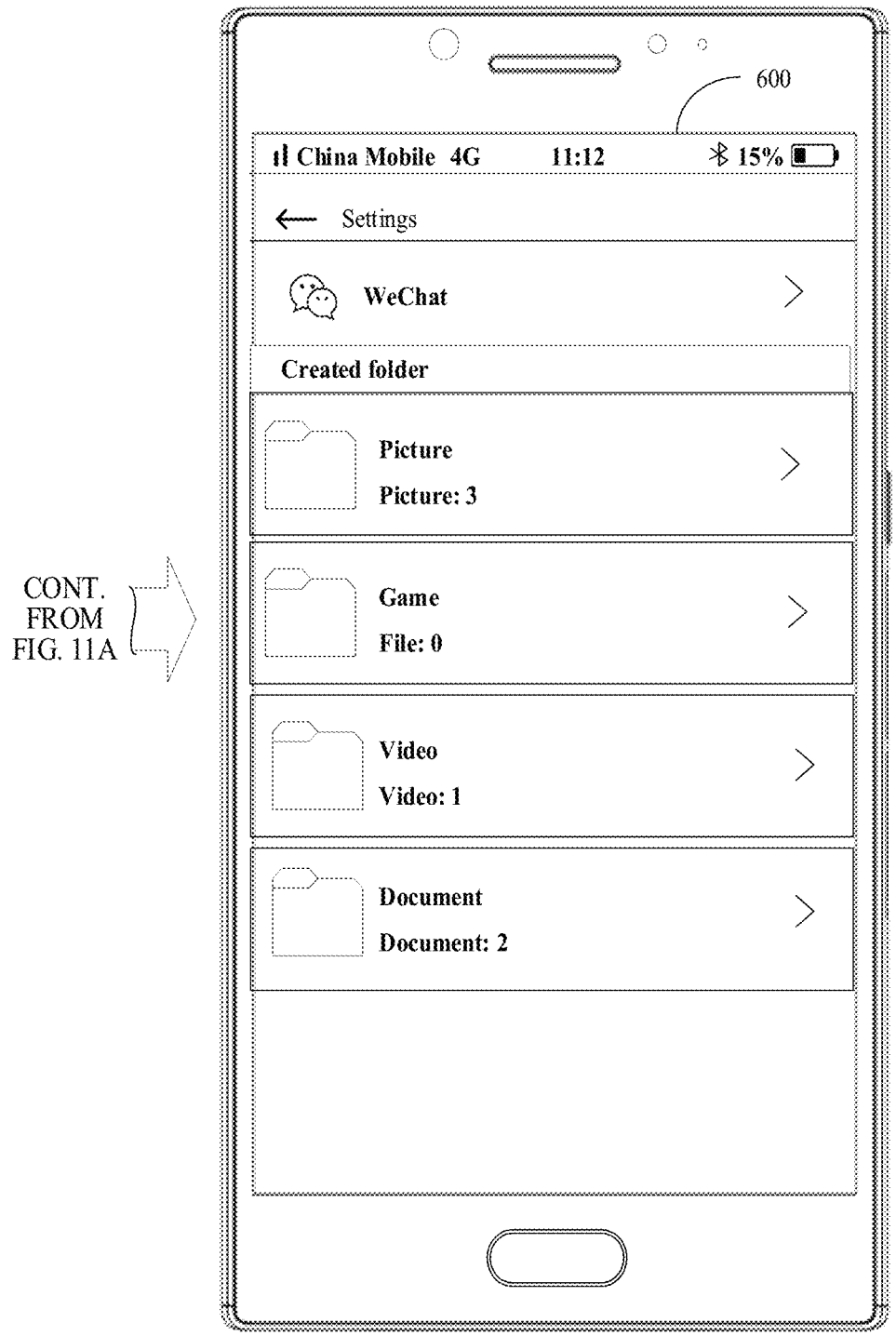
Figure 11C:
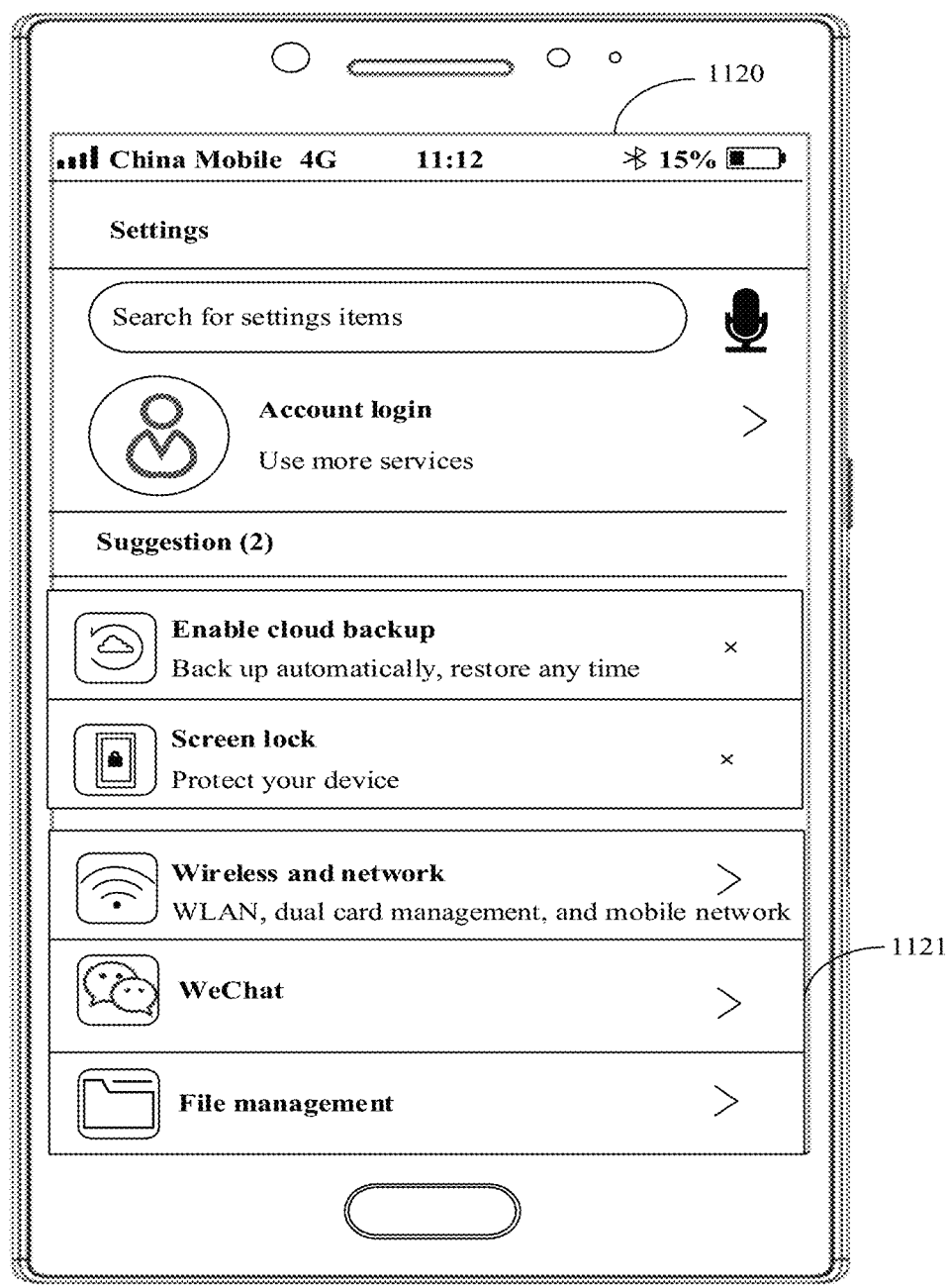
FIG. 11C is a schematic diagram of another user interface according to another embodiment of this application.

For example, the system setting screen for WeChat is a user interface 1100 shown in FIG. 11A, and application file management 1101 is added to the user interface 1100. When the mobile phone 100 detects an operation on the application folder management 1101, in response to the operation, the mobile phone 100 displays the first user interface on the touchscreen 150. The operation on the application folder management 1101 may be a touch operation, a touch and hold operation, a heavy press operation, or the like on the application folder management 1101. This is not limited herein. An example in which the first user interface is the user interface 600 shown in FIG. 6A is used. When the mobile phone 100 detects an operation on the application folder management 1101, in response to the operation, the mobile phone 100 displays the user interface 600 on the touchscreen 150. In response to an operation of touching, by the user, a setting icon included in a home screen, the mobile phone 100 displays the system setting screen on the touchscreen 150. For example, in response to the operation on the setting icon, the system setting screen displayed on the touchscreen 150 by the mobile phone 100 may be a user interface 1120 shown in FIG. 11C. The user interface 1120 includes WeChat 1121. In addition, the user interface 1120 may further include controls such as a search box, enabling cloud backup, screen locking, wireless and network, and file management. Using a system setting screen shown in FIG. 11C as an example, in response to a touch operation of the user on WeChat 1121 included in the system setting screen, the mobile phone 100 may display the user interface 1100 on the touchscreen 150.

Figure 12:
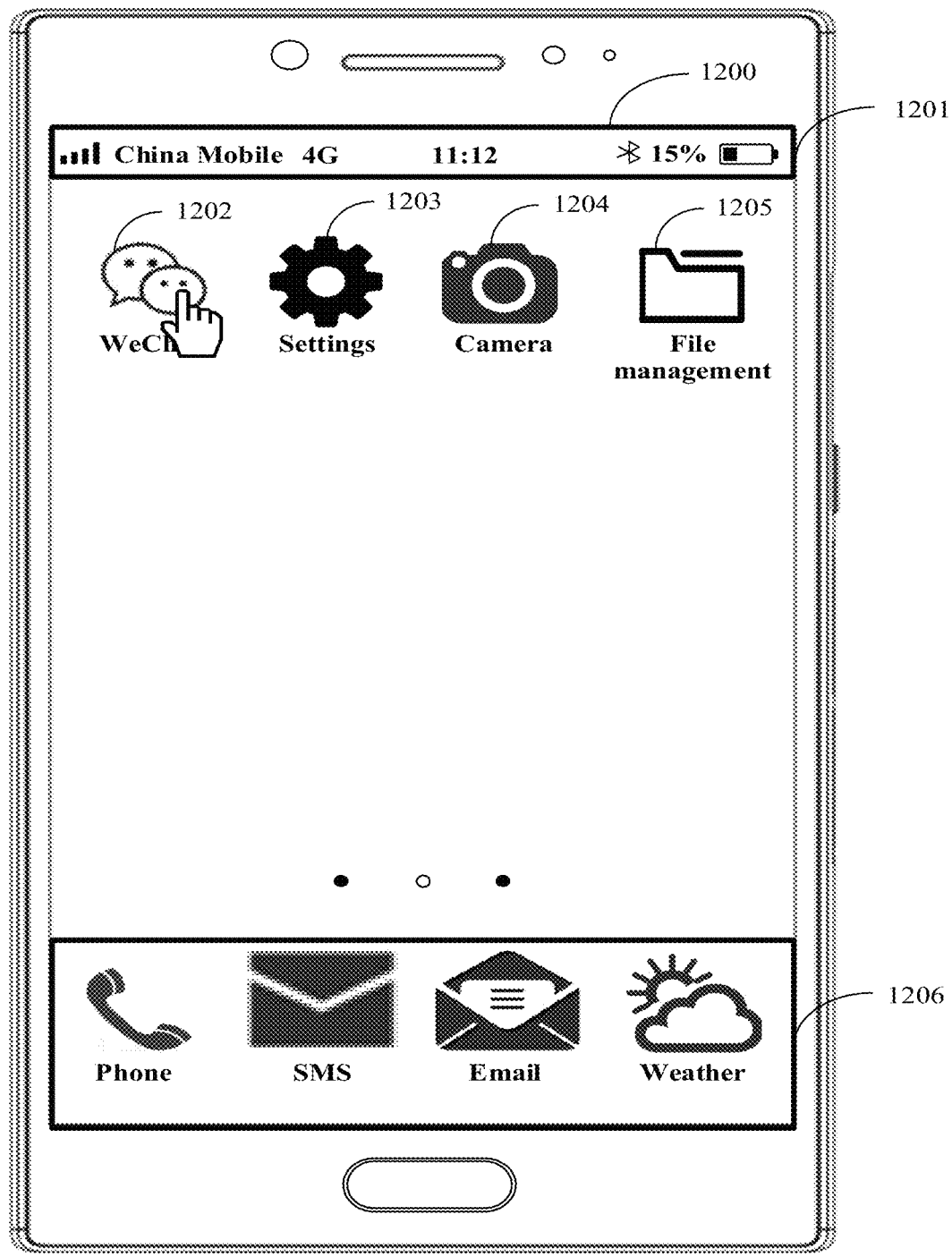
FIG. 12 is a schematic diagram of another user interface according to another embodiment of this application.

For example, the home screen may be shown in FIG. 12. Specifically, the home screen 1200 includes a WeChat icon 1202, a setting icon 1203, a camera icon 1204, a file management icon 1205, a status bar 1201, and a DOCK bar 1206. The status bar 1201 includes a telecom operator identifier (China Mobile), a network standard (4G), time, a Bluetooth icon, remaining power, and the like. In some other embodiments, the status bar 1201 may further include a Wi-Fi icon, an external device icon, and the like. The dock bar 1206 includes a phone icon, an SMS message icon, an email icon, and a weather icon. It should be understood that the user may modify, based on a requirement of the user, application icons included in the DOCK bar.

In addition, for ease of user operation, a control may be further added to a shortcut menu (for example, a POP box) of each application by using a home screen launcher. If the mobile phone 100 detects an operation on the control, in response to the operation, the mobile phone 100 displays the first user interface on the touchscreen 150.

Figure 13A:
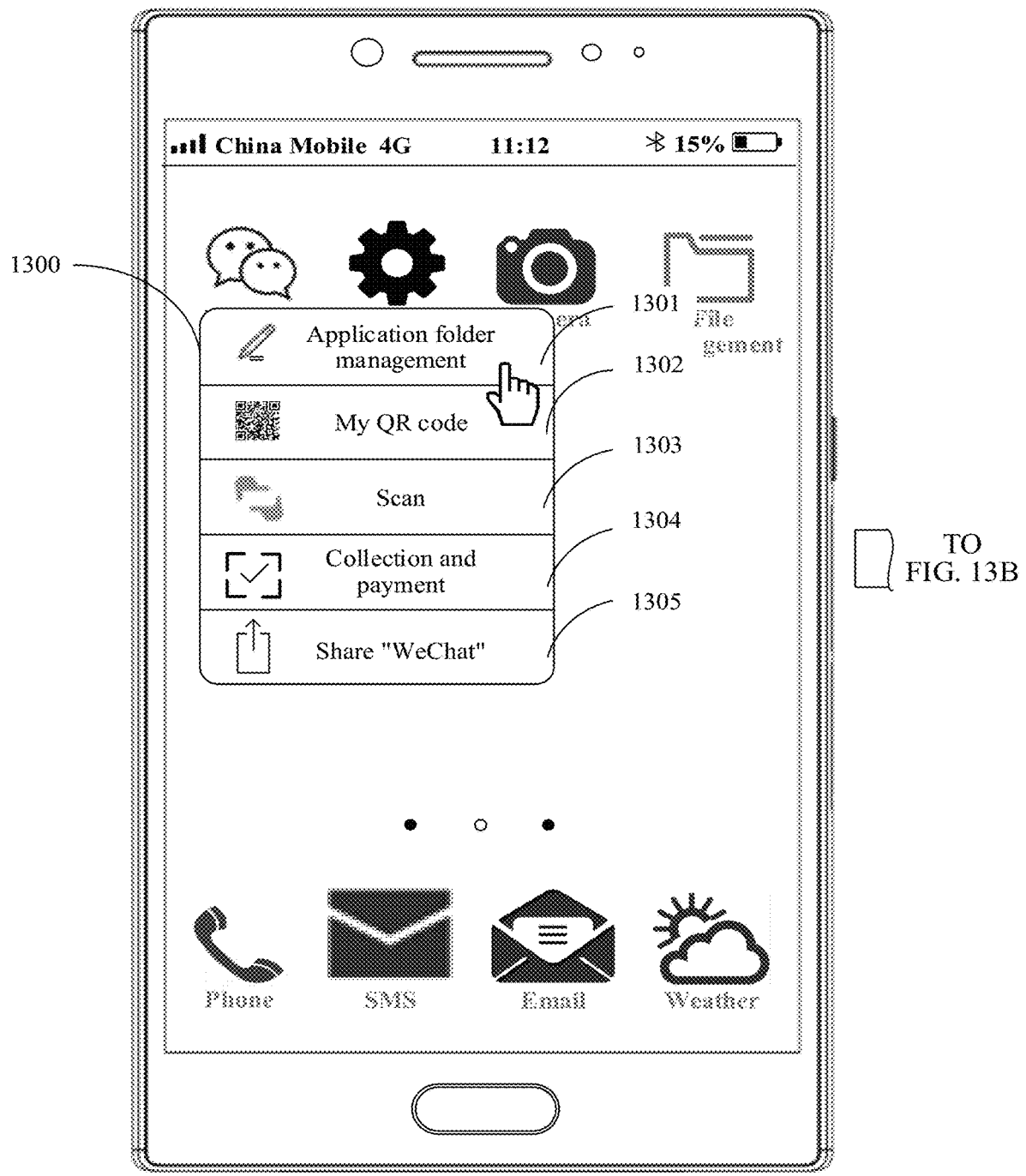
FIG. 13A and FIG. 13B are schematic diagrams of some other user interfaces according to another embodiment of this application.
Figure 13B:
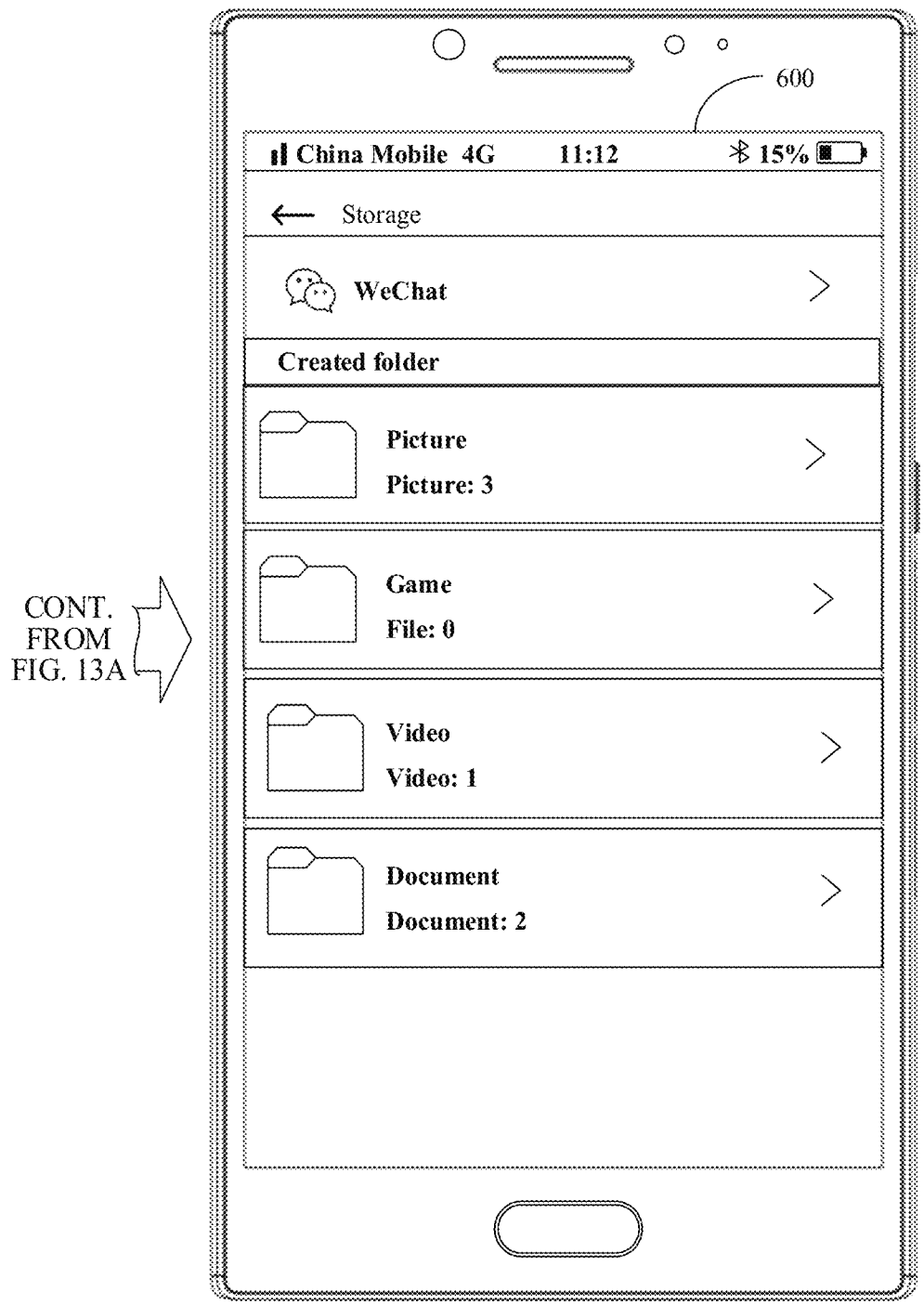

The home screen 1200 shown in FIG. 12 is used as an example. As shown in FIG. 13A, in response to an operation on the WeChat icon, the mobile phone 100 may display a WeChat shortcut menu 1300 on the touchscreen 150. The shortcut menu 1300 includes application folder management 1301, my QR code 1302, scan 1303, collection and payment 1304, and share "WeChat" 1305. It should be noted that the operation on the WeChat icon may be an operation of touching and holding or heavy pressing the WeChat icon, an operation of tapping or double-tapping the WeChat icon, or the like. This is not limited herein. An example in which the first user interface is the user interface 600 shown in FIG. 6A is used. In response to an operation on the application folder management 1301, the mobile phone 100 may display the user interface 600 on the touchscreen 150.

Figure 14A:
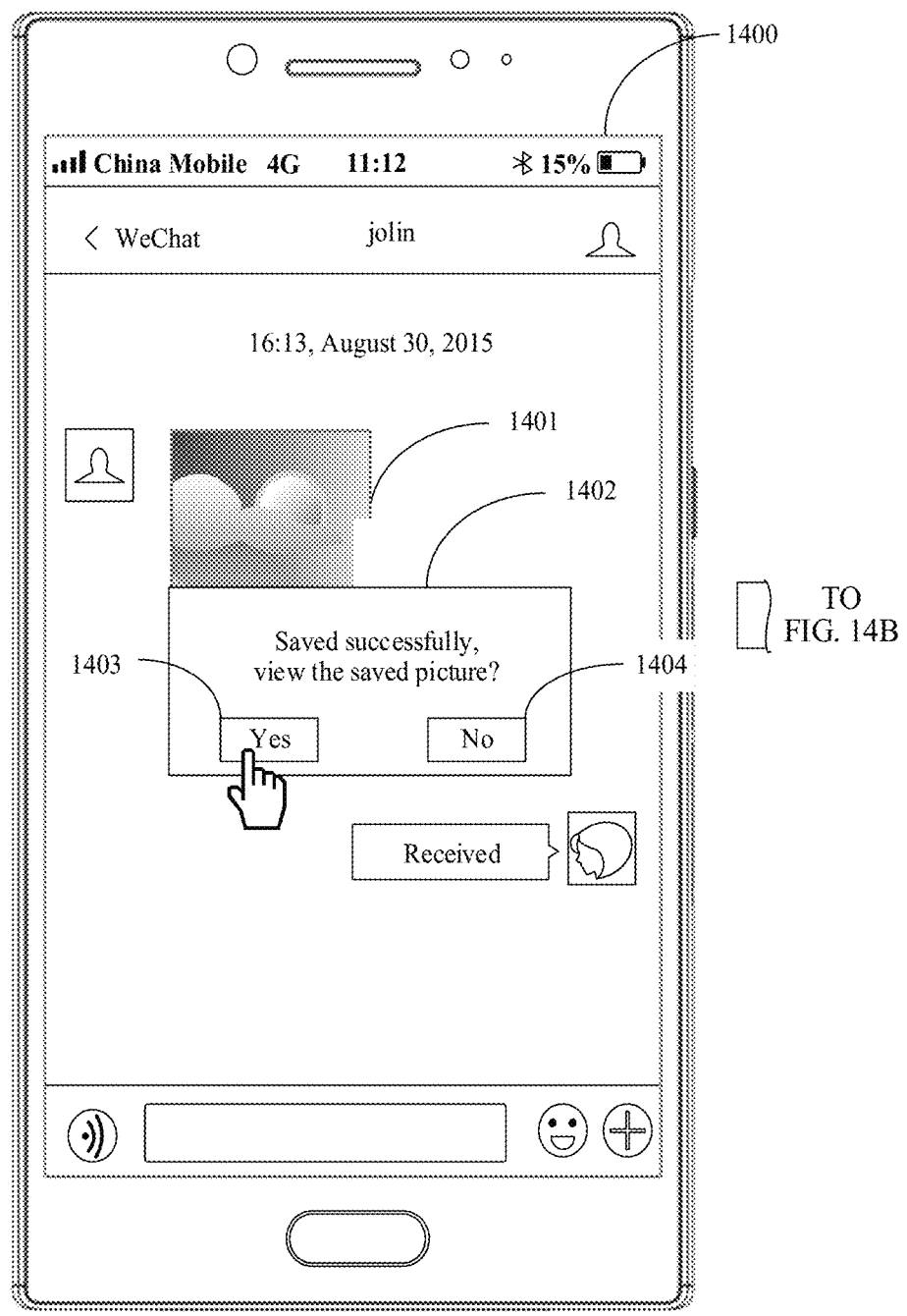
FIG. 14A and FIG. 14B are schematic diagrams of some other user interfaces according to another embodiment of this application.
Figure 14B:
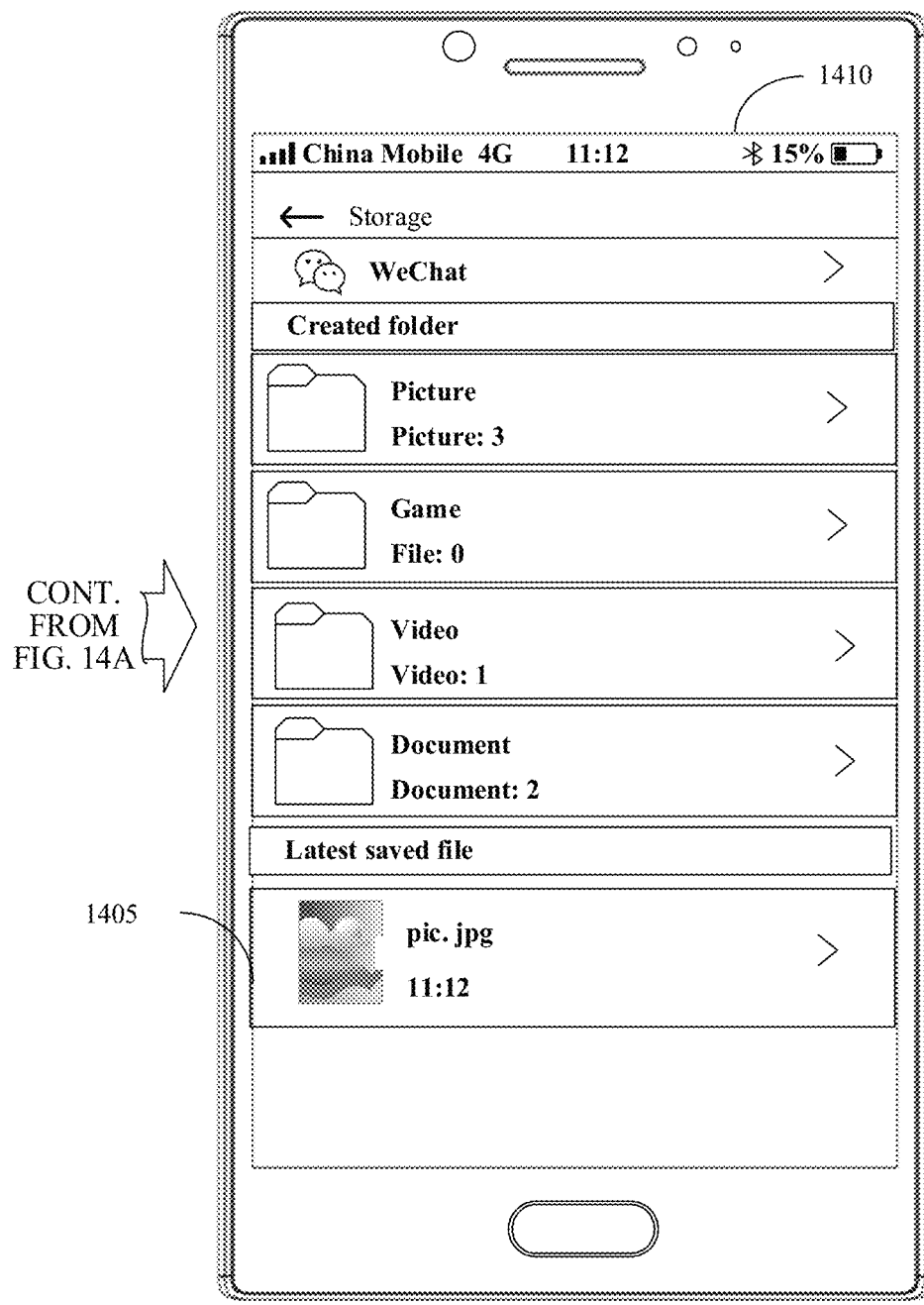

In some other embodiments, in response to an operation of saving a file (for example, a picture, a video, a document, or audio) by the user, the mobile phone 100 may further display a dialog box on the touchscreen 150. The dialog box is used to prompt the user that the file is saved successfully and whether to view the saved file. For example, a user interface 1400 shown in FIG. 14A is a user interface for chatting with a user Jolin in WeChat. After detecting that the user successfully saves a picture 1401, the mobile phone 100 displays a dialog box 1402. The dialog box 1402 includes an option "Yes" 1403 and an option "No" 1404, and the dialog box 1402 is used to prompt the user that the picture 1401 is successfully saved and whether to view the saved picture 1401. If the mobile phone 100 detects a touch operation on the option "yes" 1403, in response to the operation, the mobile phone 100 displays the first user interface on the touchscreen 150. For example, a file structure corresponding to WeChat is the file structure shown in FIG. 3. For example, the first user interface is a user interface 1410 shown in FIG. 14B. In response to the touch operation on the option "yes" 1403, the mobile phone 100 displays the user interface 1410 on the touchscreen 150. The user interface 1410 includes a subfolder Picture control, a subfolder Game control, a subfolder Video control, a subfolder Document control, and a file control 1405. Because the file 1401 saved by the user is a latest saved file, the file control 1405 is used to indicate the file 1401 saved by the user. If the subfolder Picture control, the subfolder Game control, the subfolder Video control, and the subfolder Document control are arranged based on a time sequence of latest storage of a file in each subfolder, a position of the subfolder Picture control in the user interface 1410 is before that of another subfolder control. If the mobile phone 100 detects a touch operation on the option "no" 1404, in response to the operation, the mobile phone 100 closes the dialog box. The foregoing technical solution helps the user view a latest saved file.

The foregoing embodiments of this application may be applied to applications installed in the mobile phone 100, and are not limited to WeChat. The foregoing uses WeChat as an example for description. According to the foregoing embodiments, the user searches for a related file in a folder corresponding to an application, and a range in which the user searches for a file is greatly narrowed, to help improve efficiency of searching for a file by the user.

In addition, functions of the directory manager in the foregoing embodiments of this application may be further integrated into the file system manager, and the file system manager reports corresponding information to the settings at the application layer, so that the settings generates and refreshes the first user interface.

It should be noted that WeChat is used as an example. In some other embodiments of this application, a control 1501 may be further added to a setting screen of WeChat. If the mobile phone 100 detects a touch operation on the control 1501, in response to the touch operation, the mobile phone 100 displays the first user interface on the touchscreen 150. For example, the first user interface is the user interface 1410 shown in FIG. 14B. In this case, in response to the touch operation on the control 1501, the mobile phone 100 displays the user interface 1410 on the touchscreen 1501.

It should be understood that the first user interface may be a user interface for managing WeChat in a native application (for example, the settings) installed on the mobile phone 100, or may be a setting screen for managing WeChat in WeChat. This is not limited in this application.

It should be noted that, in this embodiment of this application, a shortcut gesture operation (for example, three fingers swipe up or draw a circle) may be further set, to display the first user interface on the touchscreen 150.

Figure 16A:
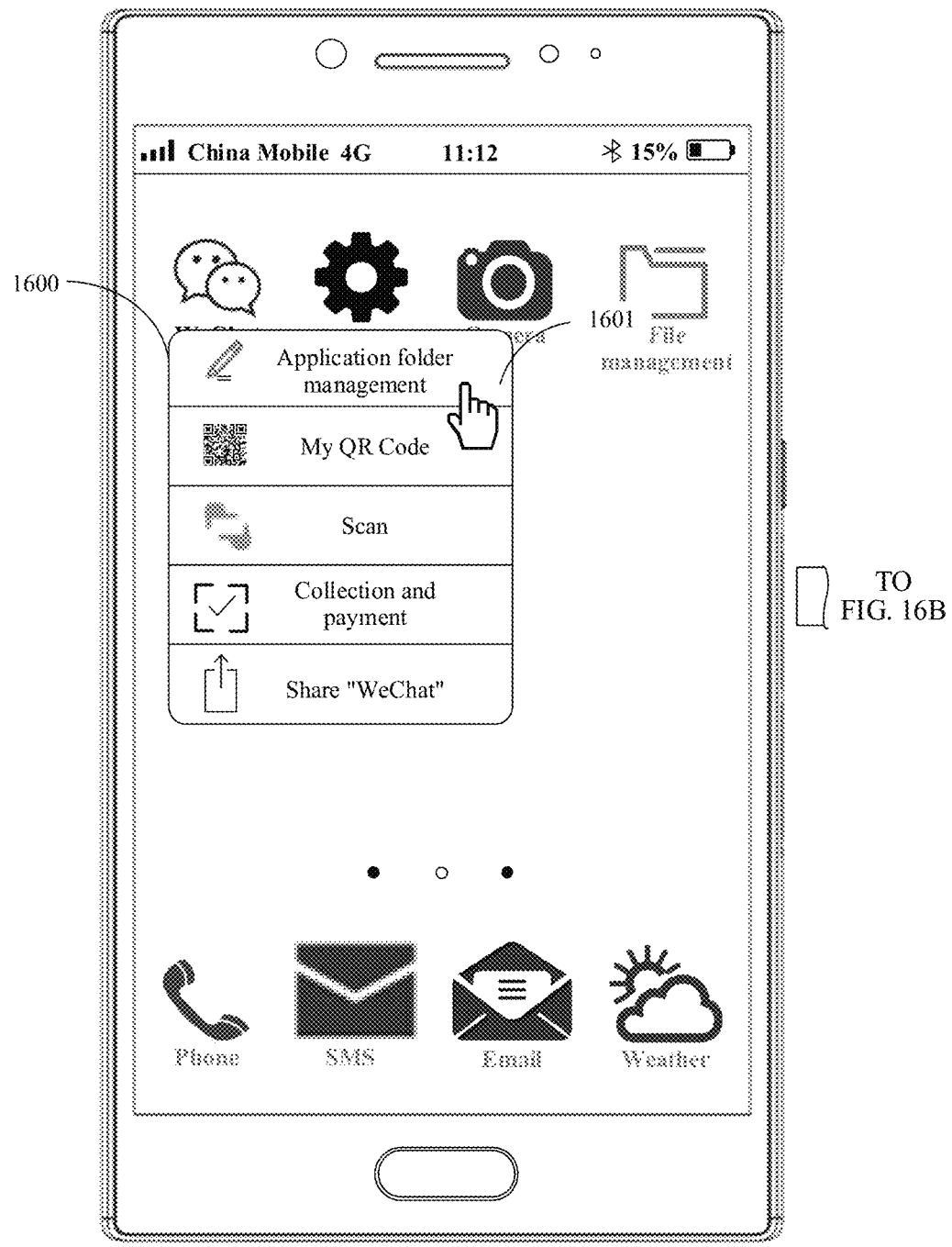
FIG. 16A and FIG. 16B are schematic diagrams of some other user interfaces according to another embodiment of this application.
Figure 16B:
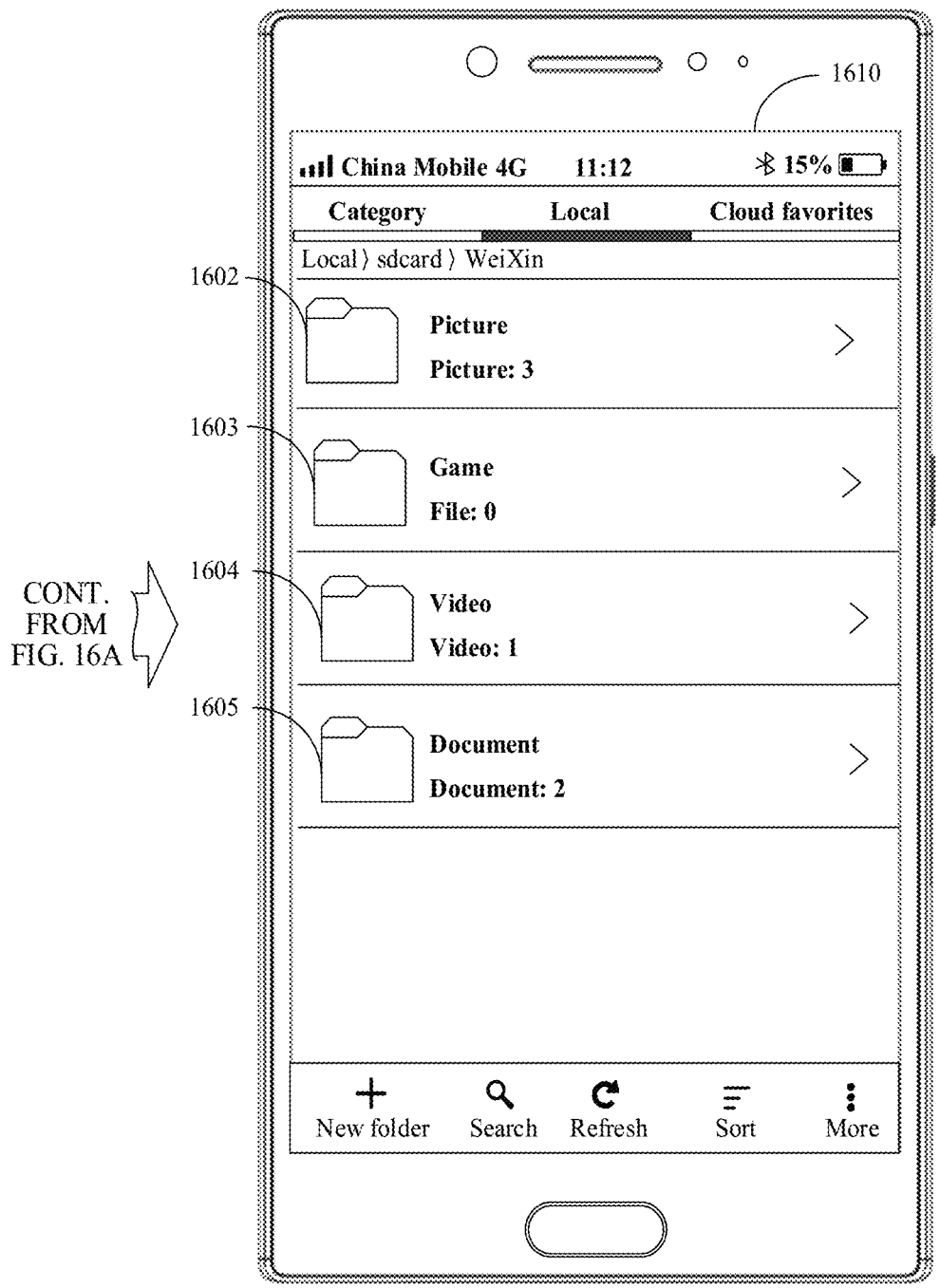
Figure 17:
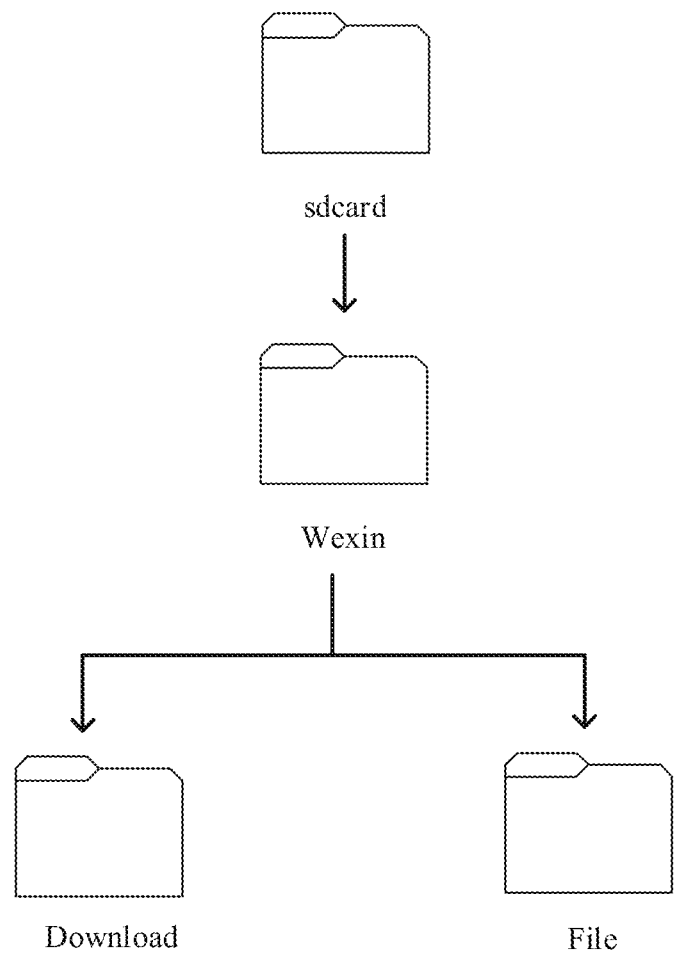
FIG. 17 is a schematic diagram of another file structure according to another embodiment of this application.

In addition, WeChat is used as an example. As shown in FIG. 16A, if the mobile phone 100 in this embodiment of this application detects a touch and hold or heavy press operation on an icon of a first application program, in response to the operation, the mobile phone 100 displays a shortcut menu 1600 on the touchscreen 150, and the shortcut menu 1600 includes application folder management 1601. In some other embodiments, the shortcut menu 1600 may further include controls such as my QR code, scan, collection and payment, and share "WeChat". The user may also correspondingly modify the controls included in the shortcut menu 1600 based on a requirement of the user. When the mobile phone 100 detects a touch operation on the application folder management 1601, in response to the touch operation, the mobile phone 100 displays the user interface 1610 on the touchscreen 150. The user interface 1610 is a user interface of content details of a root folder corresponding to WeChat. In specific implementation, the user interface 1610 may be a user interface in native application file management. For example, the root folder corresponding to WeChat includes a subfolder Picture, a subfolder Game, a subfolder Video, and a subfolder Document. The user interface 1610 includes a control 1602 used to indicate the subfolder Picture, a control 1603 used to indicate the subfolder Game, a control 1604 used to indicate the subfolder Video, and a control 1605 used to indicate the subfolder Document.

Figure 18:
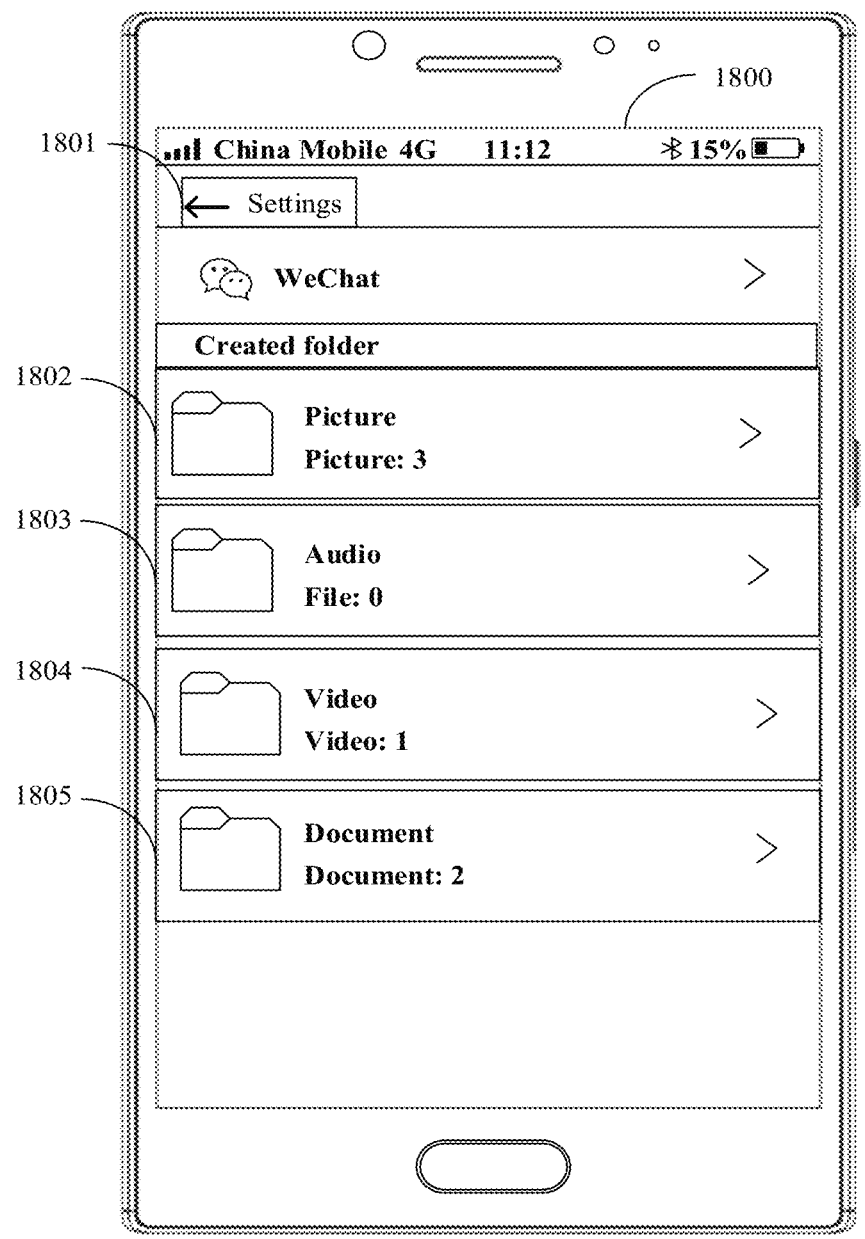
FIG. 18 is a schematic diagram of another user interface according to another embodiment of this application.

WeChat is used as an example. In another embodiment, for WeChat, the mobile phone 100 creates a root folder Weixin in a folder sdcard, and the root folder Weixin includes a subfolder Download and a subfolder File. Specifically, the subfolder Download is used to store a picture, audio, a video, and a document downloaded by the user during the use of WeChat. The subfolder File is used to store a program file related to WeChat running. The mobile phone 100 may reclassify files based on types of the files included in the subfolder Download and the subfolder File, to generate the first user interface. The first user interface may be a user interface 1800 shown in FIG. 18, and includes a control 1802, a control 1803, a control 1804, and a control 1805. In response to a touch operation on the control 1802, the mobile phone 100 may display, on the touchscreen 150, a user interface of a picture corresponding to WeChat. In response to a touch operation on the control 1803, the mobile phone 100 may display, on the touchscreen 150, a user interface of audio corresponding to WeChat. In response to a touch operation on the control 1804, the mobile phone 100 may display, on the touchscreen 150, a user interface of a video corresponding to WeChat. In response to a touch operation on the control 1805, the mobile phone 100 may display, on the touchscreen 150, a user interface of a file corresponding to WeChat. In addition, the user interface 1800 may further include a control 1801, and the control 1801 is configured to return to an upper-level setting menu. The files are reclassified based on types of the files, to facilitate the user to search for a file, and improve efficiency of searching for a file by the user.

The foregoing embodiments in this application may be used in combination, or may be used as an independent embodiment. In addition, the foregoing embodiments are described only by using WeChat as an example. The embodiments of this application may also be applied to another application.

An embodiment of this application further provides a method for copying a file stored in the mobile phone 100 to another device (for example, a personal computer). The following uses a scenario shown in FIG. 19 as an example for detailed description.

Figure 19:
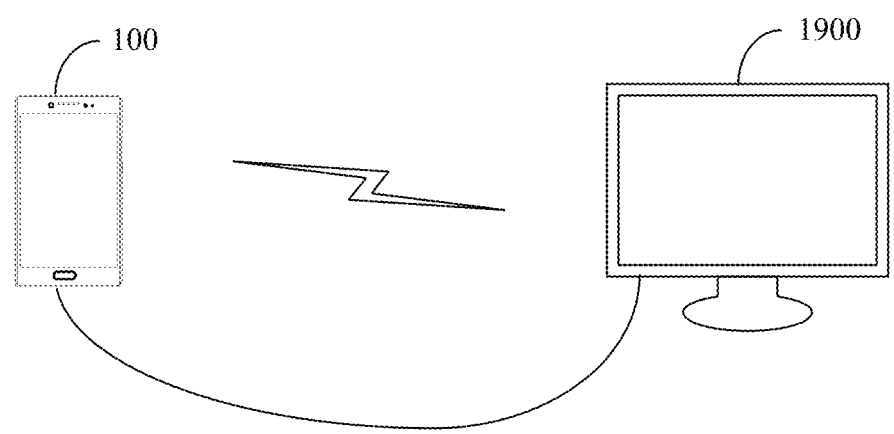
FIG. 19 is a schematic diagram of another application scenario according to another embodiment of this application.

As shown in FIG. 19, after a mobile phone 100 is connected to a computer 1900, a file stored in the mobile phone 100 is copied to the computer 1900. The mobile phone 100 and the computer 1900 may be connected in a wired manner, for example, connected by using a USB data cable. The mobile phone 100 and the computer 1900 may also be connected in a wireless manner, for example, through Wi-Fi or Bluetooth. A direct connection manner between the mobile phone 100 and the computer 1900 is not limited in this embodiment of this application.

To facilitate copying the file stored in the mobile phone 100 to the computer 1900, in this embodiment of this application, after the mobile phone 100 is connected to the computer 1900, the mobile phone 100 may display a file structure of the computer 1900 by using a touchscreen 150.

Figure 20:
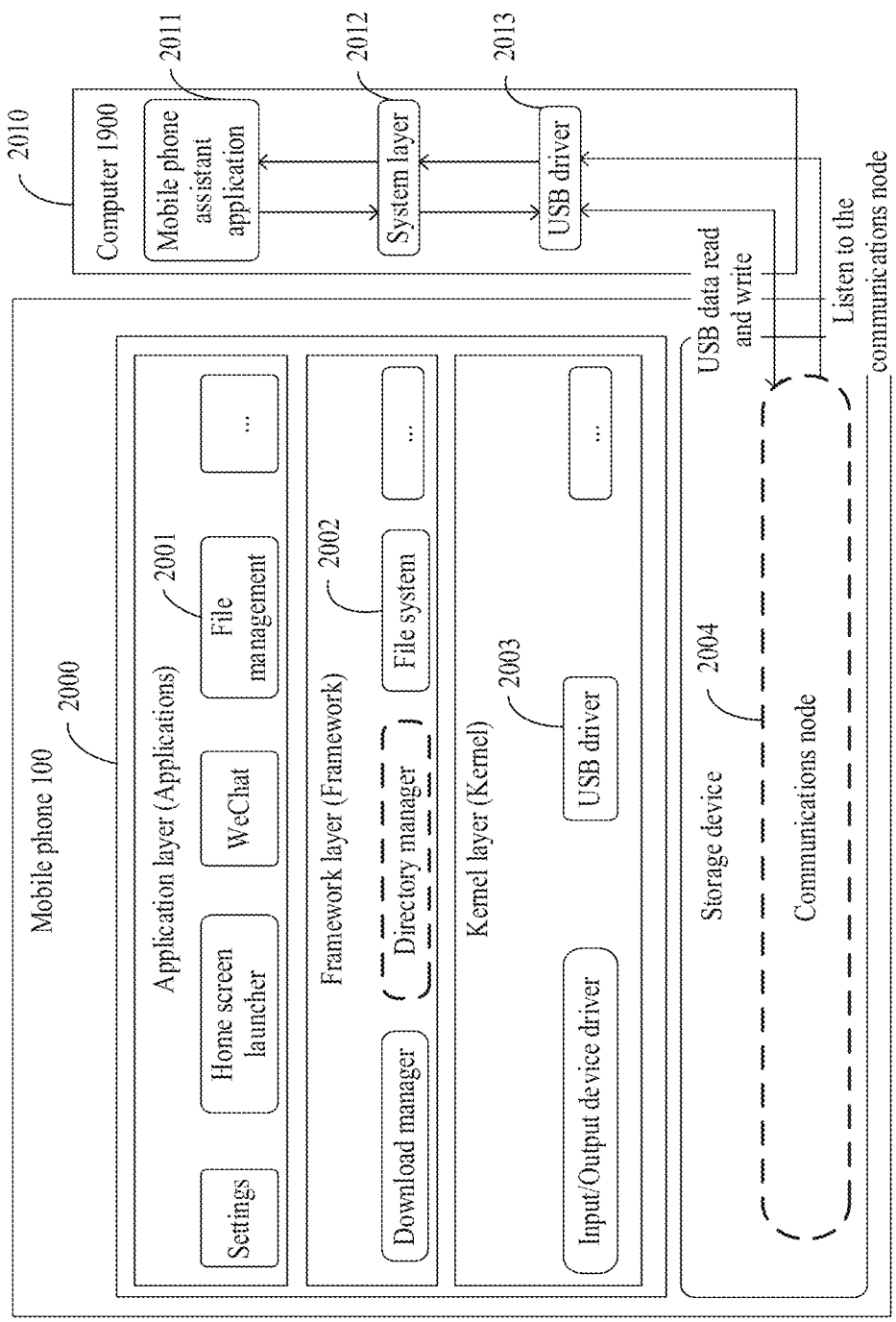
FIG. 20 is a schematic diagram of software architectures of a mobile phone and a computer according to another embodiment of this application.

An example in which the mobile phone 100 is an Android operating system and the computer 1900 is a Windows operating system is used. For example, as shown in FIG. 20, the mobile phone 100 includes an Android operating system 2000 and a storage device. For a related description of the Android operating system 2000, refer to the related description of the Android operating system shown in FIG. 2 in the embodiments of this application. Details are not described herein again. It should be noted that the Android operating system 2000 shown in FIG. 20 may not include a directory manager. The storage device may be a memory 102 on the mobile phone 100. To simplify an implementation, in some embodiments, a communications node 2004 is preset in the storage device 102. The communications node 2004 is configured to store related information of an external device connected to the mobile phone 100 by using a USB (for example, the external device is the computer 1900, and the communications node 2004 may be configured to store data converted based on a file structure of the computer 1900).

A Windows operating system 2010 includes a mobile phone assistant application, a system layer, and a USB driver. The mobile phone assistant application is used to process information about a mobile phone connected to the computer 1900. For example, the mobile phone assistant application converts the file structure of the computer 1900 into data in a preset format (such as a string). It should be understood that the mobile phone assistant application may be a system application or a preset application (for example, an application installed on the computer 1900 by the user based on a requirement of the user). The system layer is configured to provide support for the mobile phone assistant application, to implement functions that can be implemented by the mobile phone assistant application. The USB driver is configured to identify the external device connected to the computer 1900 by using the USB, for example, the mobile phone 100.

In this embodiment of this application, after the mobile phone 100 is connected to the computer 1900 by using the USB, the mobile phone 100 is in a USB slave mode, and the computer 1900 is in a USB sever mode. According to an existing USB protocol, the computer 1900 may read a file structure of the mobile phone 100, and display the file structure of the mobile phone 100 on the computer 1900. To enable the mobile phone 100 to obtain the file structure of the computer 1900 when the mobile phone 100 is connected to the computer 1900 by using the USB, an embodiment of this application provides a data writing and data reading method.

Figure 21:
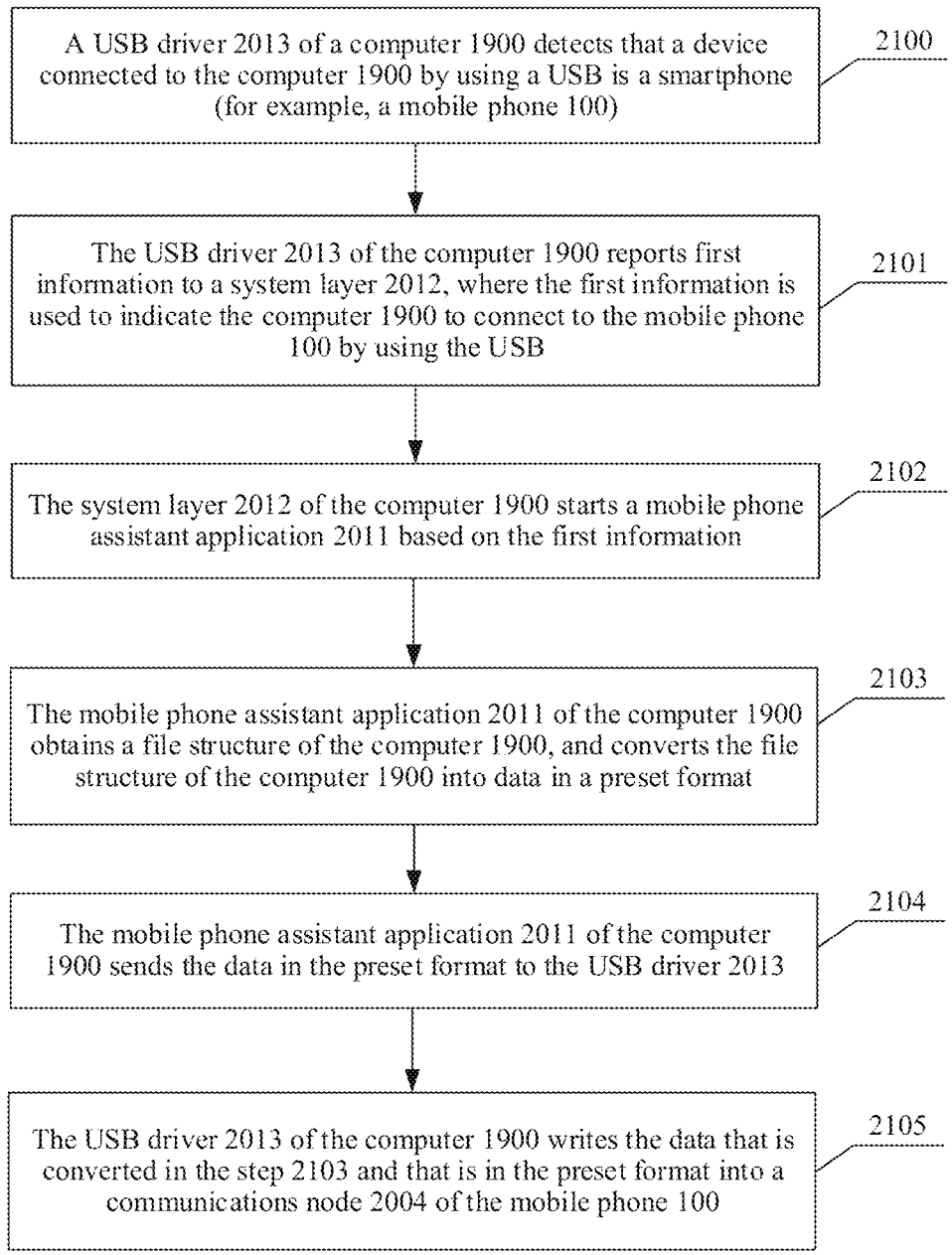
FIG. 21 is a schematic flowchart of a data writing method according to an embodiment of this application.

Specifically, as shown in FIG. 21, the data writing method in this embodiment of this application includes the following steps.

Step 2100: A USB driver 2013 of a computer 1900 detects that a device connected to the computer 1900 by using a USB is a smartphone (for example, a mobile phone 100).

Step 2101: The USB driver 2013 of the computer 1900 reports first information to a system layer 2012, where the first information is used to indicate the computer 1900 to connect to the mobile phone 100 by using the USB.

Step 2102: The system layer 2012 of the computer 1900 starts a mobile phone assistant application 2011 based on the first information.

Step 2103: The mobile phone assistant application 2011 of the computer 1900 obtains a file structure of the computer 1900, and converts the file structure of the computer 1900 into data in a preset format (such as a string). It should be noted that the preset format may be correspondingly set based on a requirement of an actual situation. This is not limited herein.

Step 2104: The mobile phone assistant application 2011 of the computer 1900 sends the data in the preset format to the USB driver 2013. For example, the mobile phone assistant application 2011 may send the data in the preset format to the USB driver 2013 by using the system layer 2012, or may directly send the data to the USB driver 2013. This is not limited herein.

Step 2105: The USB driver 2013 of the computer 1900 writes the data that is converted in the step 2103 and that is in the preset format into a communications node 2004 of the mobile phone 100.

Figure 22:
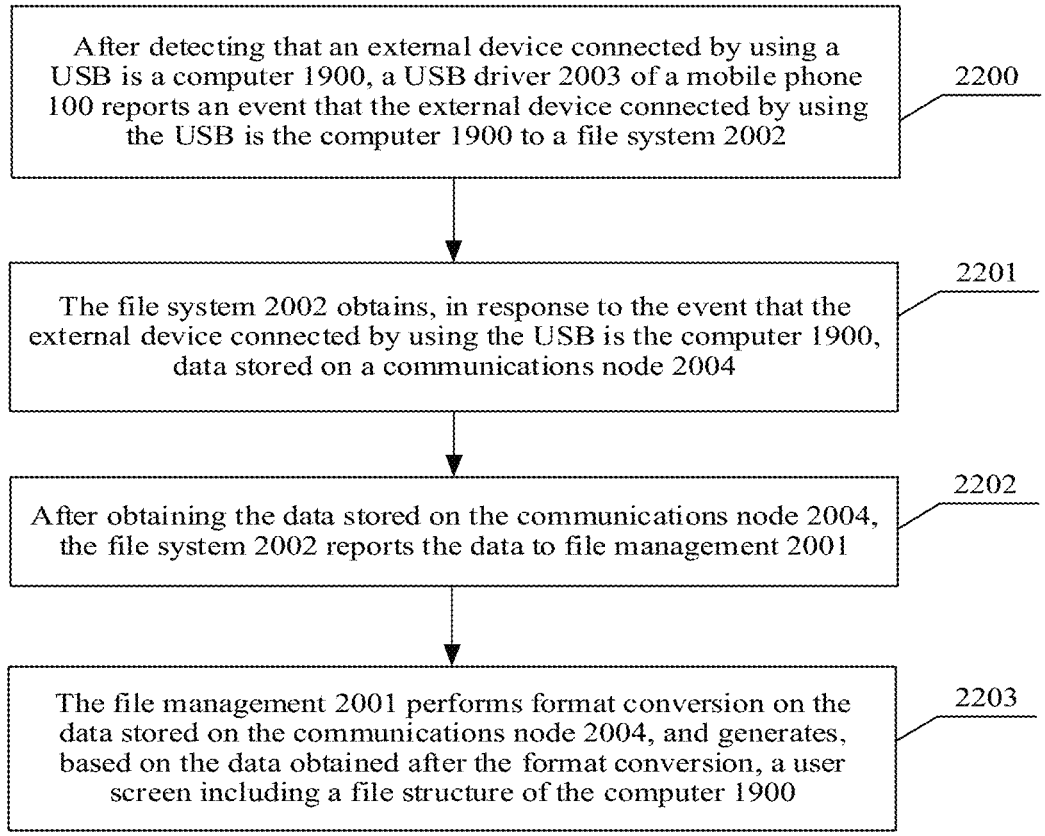
FIG. 22 is a schematic flowchart of a data reading method according to an embodiment of this application.

Specifically, after the computer 1900 writes the converted data in the preset format into the communications node 2004, the mobile phone 100 may perform the data reading method in this embodiment of this application, as shown in FIG. 22. The method includes the following steps.

Step 2200: After detecting that an external device connected by using a USB is a computer 1900, a USB driver 2003 of a mobile phone 100 reports an event that the external device connected by using the USB is the computer 1900 to a file system 2002. In some embodiments, a personal computer (personal computer, PC) mapping service may be further added to the file system 2002. The USB driver 2003 reports, to the PC mapping service, the event that the external device connected by using the USB is the computer 1900.

Step 2201: The file system 2002 obtains, in response to the event that the external device connected by using the USB is the computer 1900, data stored on a communications node 2004.

It should be noted that if the communications node 2004 does not store data, the file system 2002 continues to obtain, after waiting for preset duration, the data stored on the communications node 2004. The preset duration may be correspondingly set based on a requirement. For example, the preset duration may be 5 s, 3 s, or the like. This is not limited herein.

Step 2202: After obtaining the data stored on the communications node 2004, the file system 2002 reports the data to file management 2001. In addition, to simplify an implementation, after obtaining the data stored on the communications node 2004, the file system 2002 deletes the data stored on the communications node 2004.

Step 2203: The file management 2001 performs format conversion on the data stored on the communications node 2004, and generates, based on the data obtained after the format conversion, a user interface including a file structure of the computer 1900.

Figure 23:
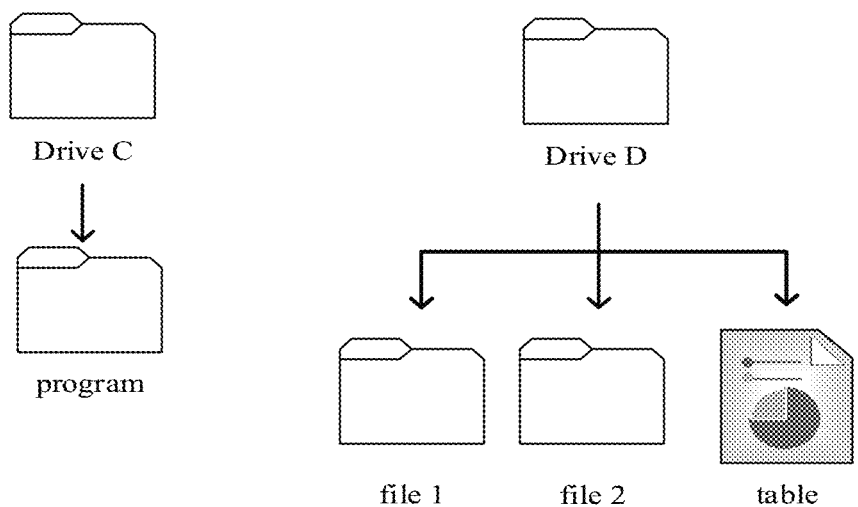
FIG. 23 is a schematic diagram of another file structure according to another embodiment of this application.
Figure 24A:
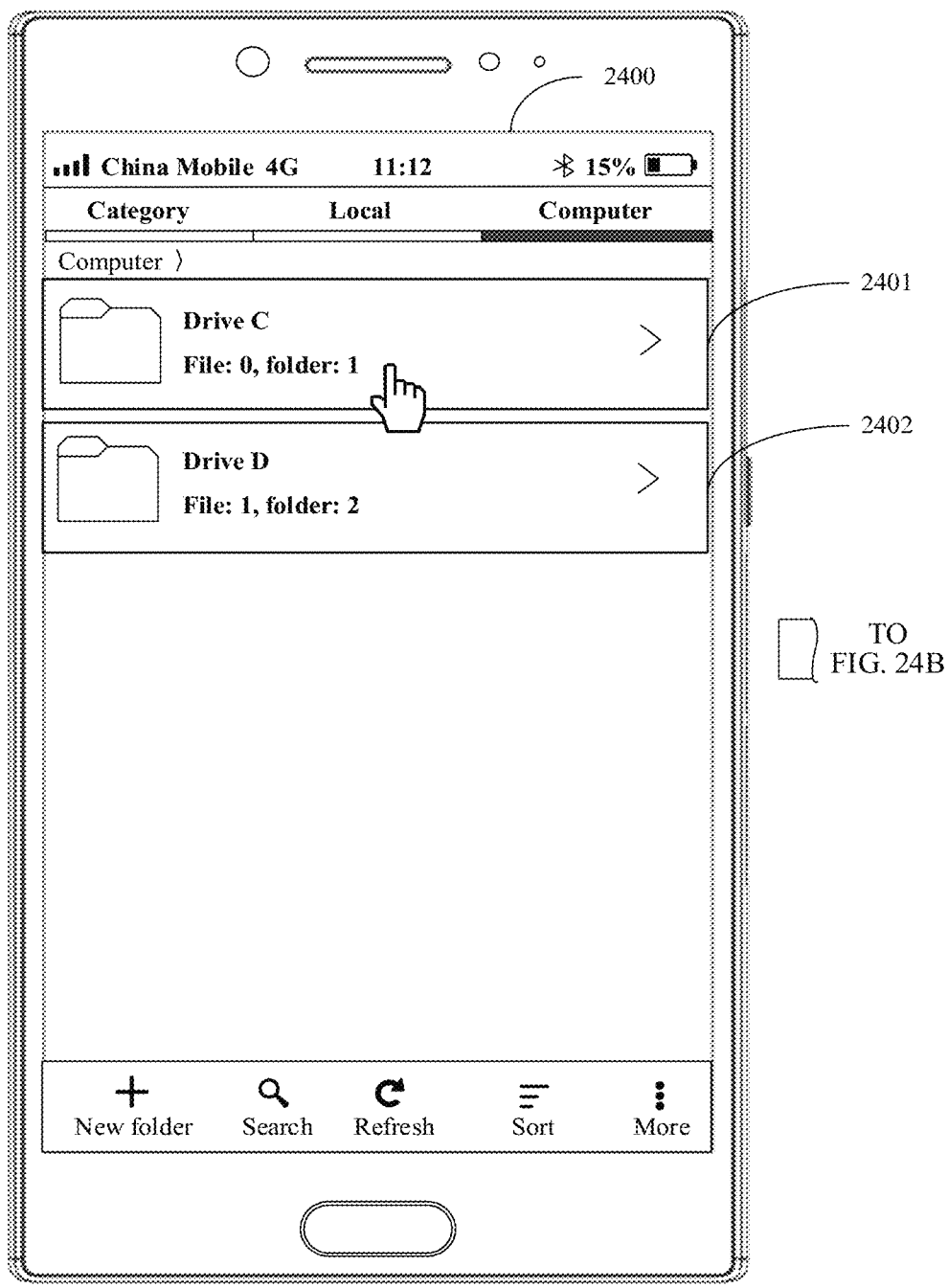
FIG. 24A and FIG. 24B are schematic diagrams of some other user interfaces according to another embodiment of this application.
Figure 24B:
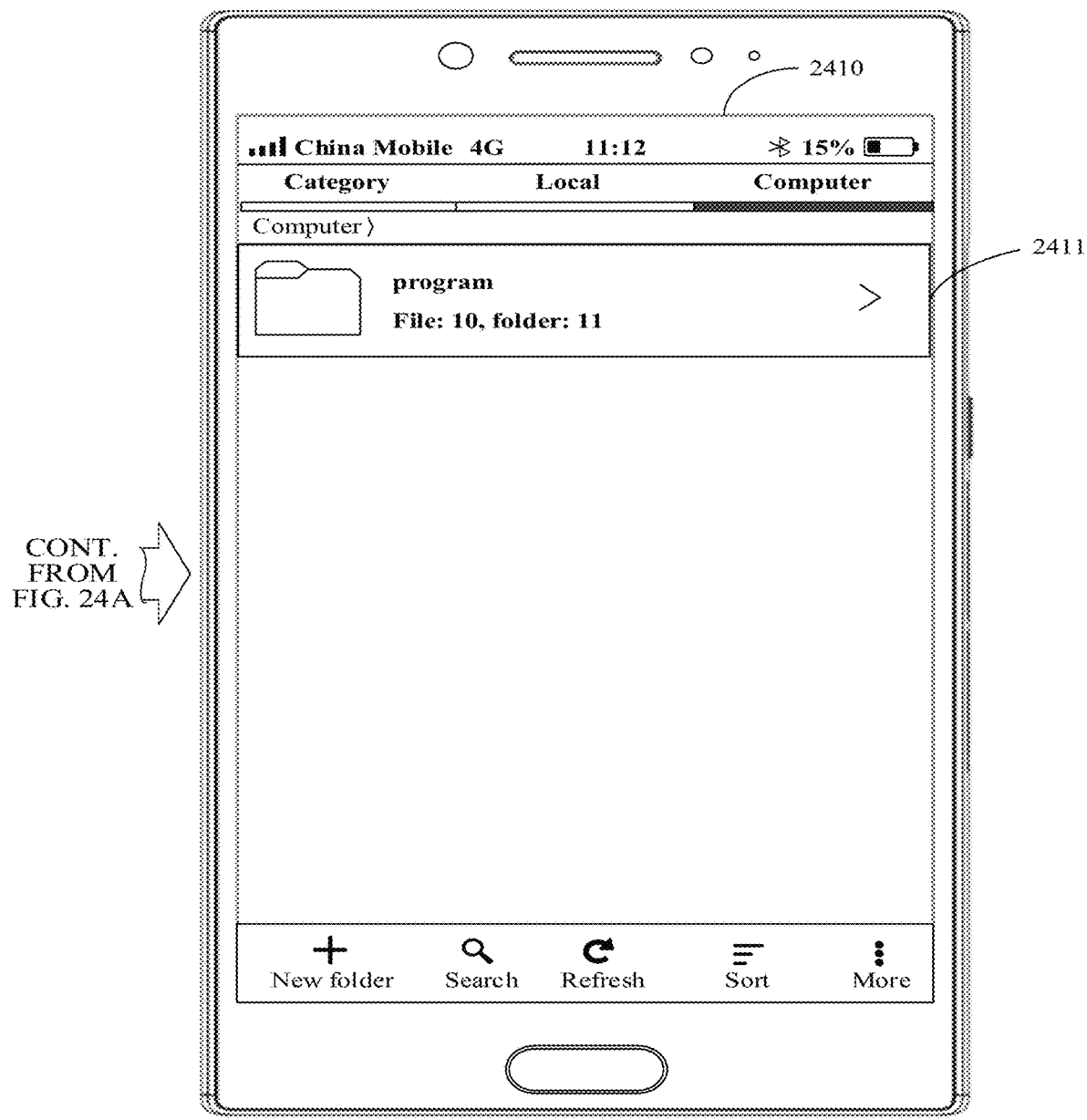

For example, the file structure of the computer 1900 is shown in FIG. 23. The computer 1900 includes a drive C and a drive D, the drive C includes a folder program, and the drive D includes a folder file 1, a folder file 2, and a file table. The user interface including the file structure of the computer 1900 shown in FIG. 23 may be a user interface 2400 shown in FIG. 24A. The user interface 2400 includes a control 2401 and a control 2402, and the control 2401 indicates the folder program. For example, the mobile phone 100 displays the user interface 2400 on the touchscreen 150. If detecting a touch operation on the control 2401, in response to the touch operation, the mobile phone 100 displays a user interface 2410 on the touchscreen 150. The user interface 2410 includes a control 2411. The control 2411 indicates a content details screen included in the folder program.

Figure 25A:
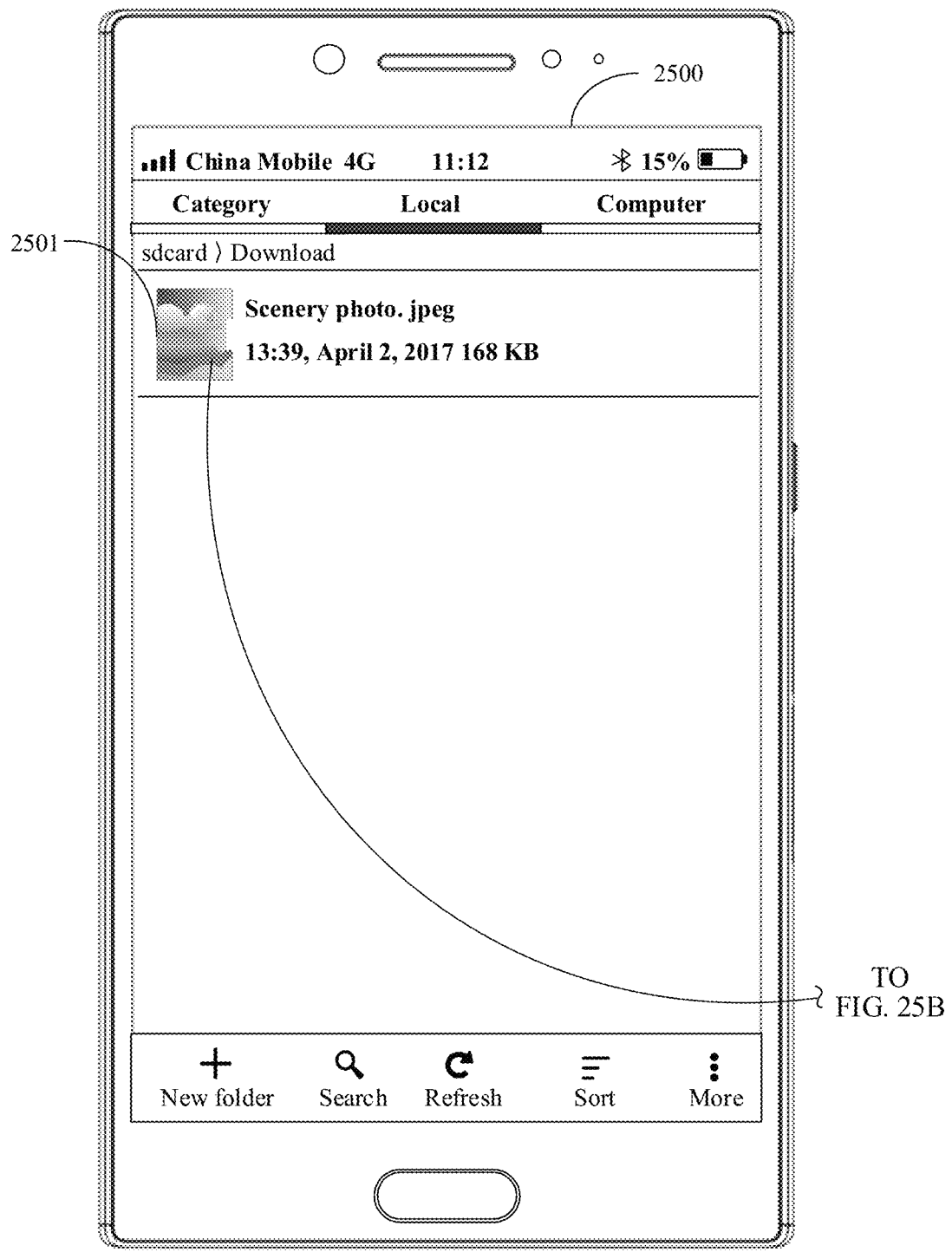
FIG. 25A and FIG. 25B are schematic diagrams of another application scenario according to another embodiment of this application.
Figure 25B:
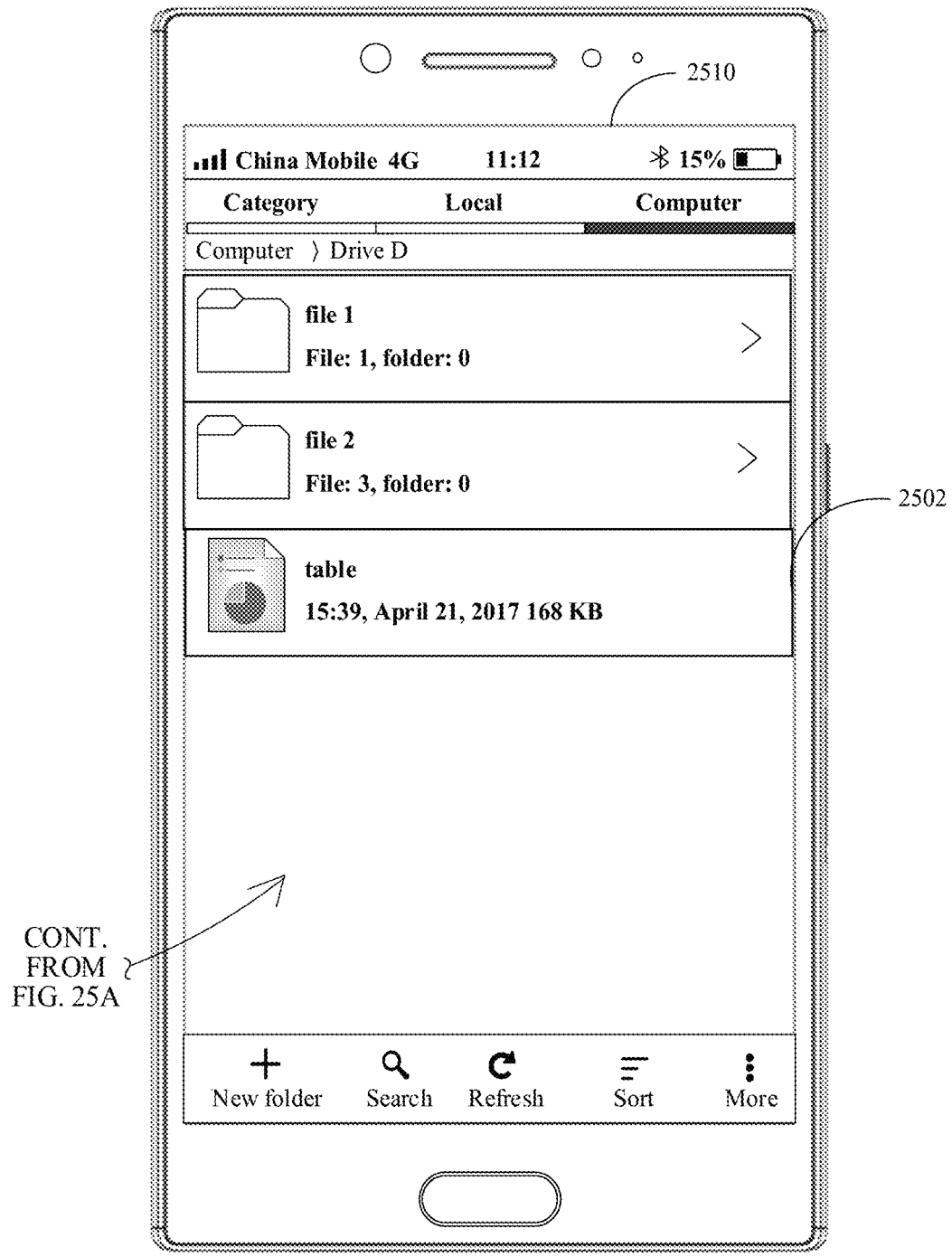

The following uses a scenario shown in FIG. 25A and FIG. 25B as an example to describe a process of copying a file from a mobile phone 100 to a computer 1900 in this embodiment of this application. Specifically, the following steps are included.

Step 1: In response to a first operation of a user, the mobile phone 100 displays a user interface 2500 on a touchscreen 150, where the user interface 2500 includes a picture 2501 named "scenery photo".

Step 2: In response to a copy operation performed by the user on the picture 2501, the mobile phone 100 obtains path information "sdcard/Download" of the picture 2501.

Step 3: In response to the second operation of the user, the mobile phone 100 displays a user interface 2510 on the touchscreen 150. The user interface 2510 is configured to display content included in the drive D.

Step 4: In response to a pasting operation performed by the user in the user interface 2510, the mobile phone 100 converts the path information of the picture 2501 into data in a preset format and stores the data on the communications node 2004.

In some embodiments, specifically, the step 4 may be implemented in the following manner.

An input device of the mobile phone 100 receives the pasting operation performed by the user in the user interface 2510, converts the operation into an input event, and reports the input event to the file management 2001 at the application layer. After receiving the input event, the file management 2001 obtains the path information "sdcard/Download" of the picture 2501, converts the path information "sdcard/Download" into data in the preset format, and stores the data on the communications node 2004.

Step 5: When detecting that the data stored in the mobile phone 100 is stored on the communications node 2004, the computer 1900 obtains the data on the communications node 2004.

Step 6: The computer 1900 parses the obtained data on the communications node 2004, to obtain the path information of the picture 2501, obtains the picture 2501 from the mobile phone 100 based on the path information of the picture 2501, and stores the picture 2501 in the drive D.

In some embodiments, specifically, the step 5 and the step 6 may be implemented in the following manner.

When detecting that the data stored in the mobile phone 100 is stored on the communications node 2004, a USB driver 2013 of the computer 1900 reads the data on the communications node 2004, and reports the read data to a mobile phone assistant application 2011. The mobile phone assistant application 2011 parses the obtained data on the communications node 2004, to obtain the path information of the picture 2501. Then, the mobile phone assistant application 2011 obtains the picture 2501 from the mobile phone 100 based on the path information of the picture 2501, and then saves the picture 2501 to the drive D.

It should be noted that, after obtaining the path information of the picture 2501, the computer 1900 may indicate the mobile phone 100 to delete the data stored on the communications node 2004.

In addition, alternatively, when the mobile phone 100 is connected to the computer 1900 by using the USB, data is copied from the computer 1900 to the mobile phone 100.

The following uses the scenario shown in FIG. 25A and FIG. 25B as an example for description. The user needs to copy a file 2502 named "table" to a folder Download of the mobile phone 100.

Specifically, the following steps are included.

Step 1: In response to a third operation of the user, the mobile phone 100 displays a user interface 2510 on a touchscreen 150, where the user interface 2510 includes the file 2502 named "table".

Step 2: In response to a copying operation performed by the user on the file 2502, the mobile phone 100 obtains path information "computer/drive D" of the file 2502.

Step 3: In response to a fourth operation of the user, the mobile phone 100 displays a user interface 2500 on the touchscreen 150.

Step 4: In response to a pasting operation performed by the user in the user interface 2500, the mobile phone 100 converts the path information of the file 2502 into data in a preset format and stores the data on the communications node 2004.

In some embodiments, specifically, the step 4 may be implemented in the following manner.

An input device of the mobile phone 100 receives the pasting operation performed by the user in the user interface 2500, converts the operation into an input event, and reports the input event to the file management 2001 at the application layer. After receiving the input event, the file management 2001 obtains the path information "computer/drive D" of the picture 2502, converts the path information "computer/drive D" into data in the preset format, and stores the data on the communications node 2004.

Step 5: When detecting that the data stored in the mobile phone 100 is stored on the communications node 2004, the computer 1900 obtains the data on the communications node 2004.

Step 6: The computer 1900 parses the obtained data on the communications node 2004, to obtain the path information of the file 2502, and sends the file 2502 to the folder Download of the mobile phone 100 based on the path information of the file 2502.

In some embodiments, specifically, the step 5 and the step 6 may be implemented in the following manner.

When detecting that the data stored in the mobile phone 100 is stored on the communications node 2004, a USB driver 2013 of the computer 1900 reads the data on the communications node 2004, and reports the read data to a mobile phone assistant application 2011. The mobile phone assistant application 2011 parses the obtained data on the communications node 2004, to obtain the path information of the file 2502. Then, the mobile phone assistant application 2011 sends the file 2502 to the folder Download of the mobile phone 100 based on the path information of the file 2502.

In addition, for a process of copying data between the mobile phone 100 and the computer 1900 by the user performing a cutting and pasting operation on the mobile phone 100, refer to a process of copying data between the mobile phone 100 and the computer 1900 by performing a copying and pasting operation. Details are not described herein again.

The foregoing description is merely based on a manner in which the mobile phone 100 is connected to the computer 1900 by using the USB. When the mobile phone 100 is connected to the computer 1900 by using Bluetooth, Wi-Fi, or another manner, the file structure on the computer 1900 may also be displayed on the mobile phone 100. An implementation is similar to that of displaying the file structure on the computer 1900 by the mobile phone 100 when the mobile phone 100 is connected to the computer 1900 by using the USB. Details are not described herein again.

It should be understood that the foregoing embodiments of this application may be used in combination.

With reference to the foregoing embodiments and the accompanying drawings, an embodiment of this application provides a method for browsing an application folder. The method may be implemented in an electronic device having a hardware structure shown in FIG. 1. The electronic device has a touchscreen.

Figure 26:
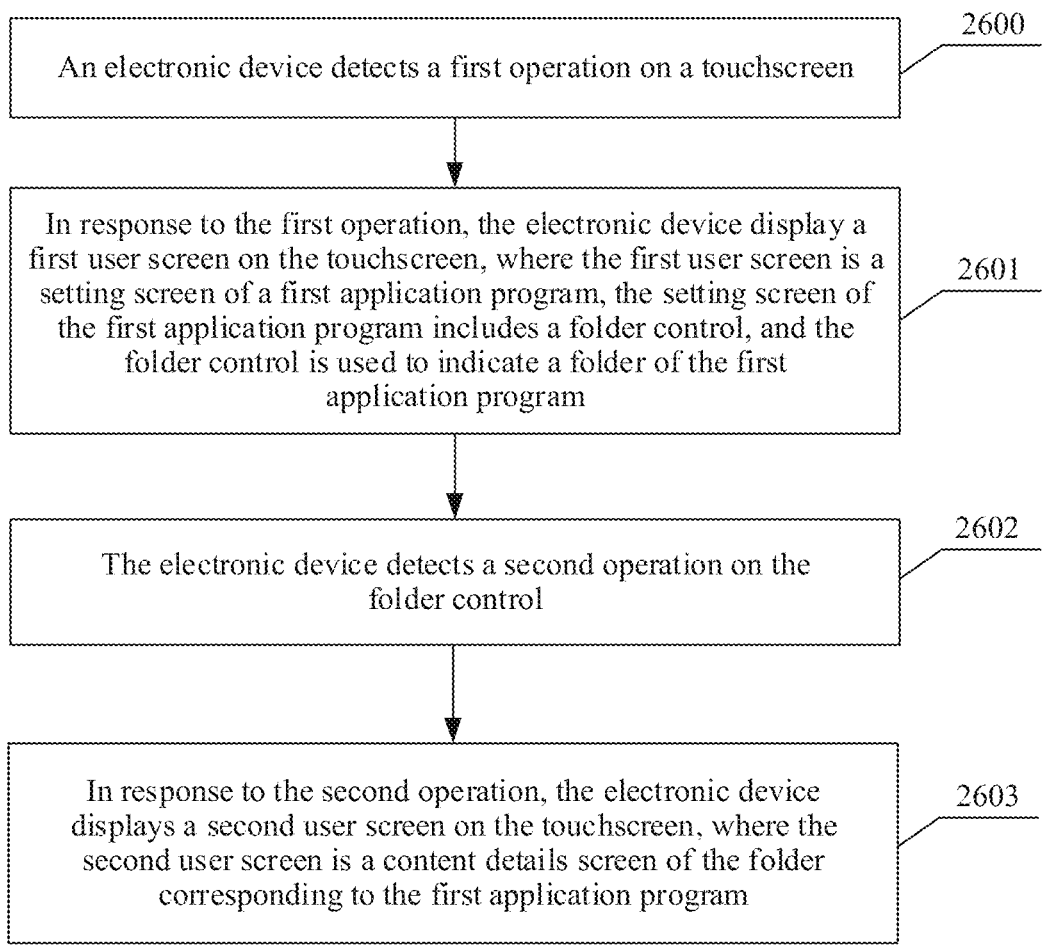
FIG. 26 is a schematic flowchart of a method for browsing an application folder according to an embodiment of this application.

Specifically, as shown in FIG. 26, an embodiment of this application provides a method for browsing an application folder, including the following steps.

Step 2600: An electronic device detects a first operation on a touchscreen.

Figure 15A:
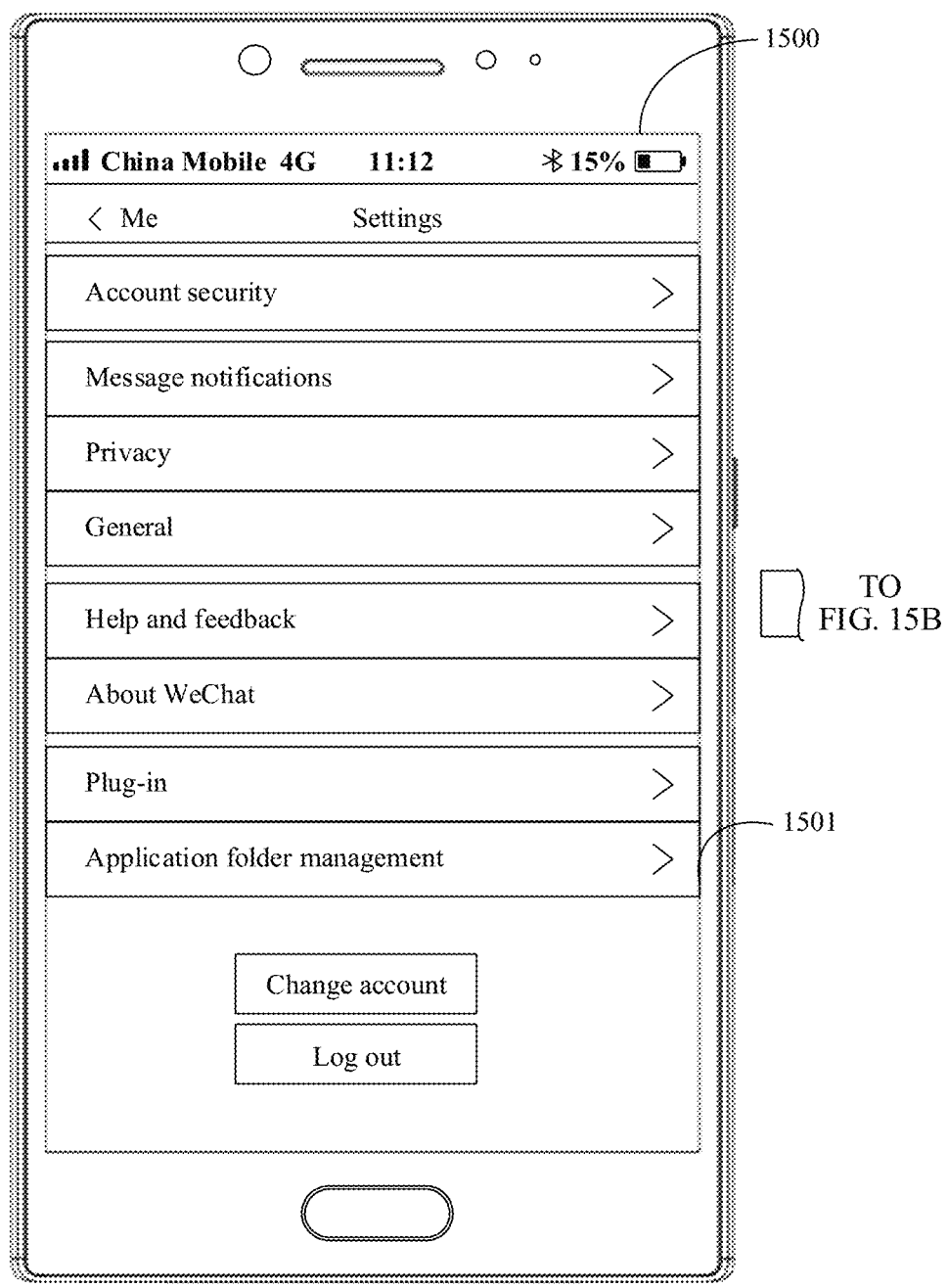
FIG. 15A and FIG. 15B are schematic diagrams of some other user interfaces according to another embodiment of this application.
Figure 15B:
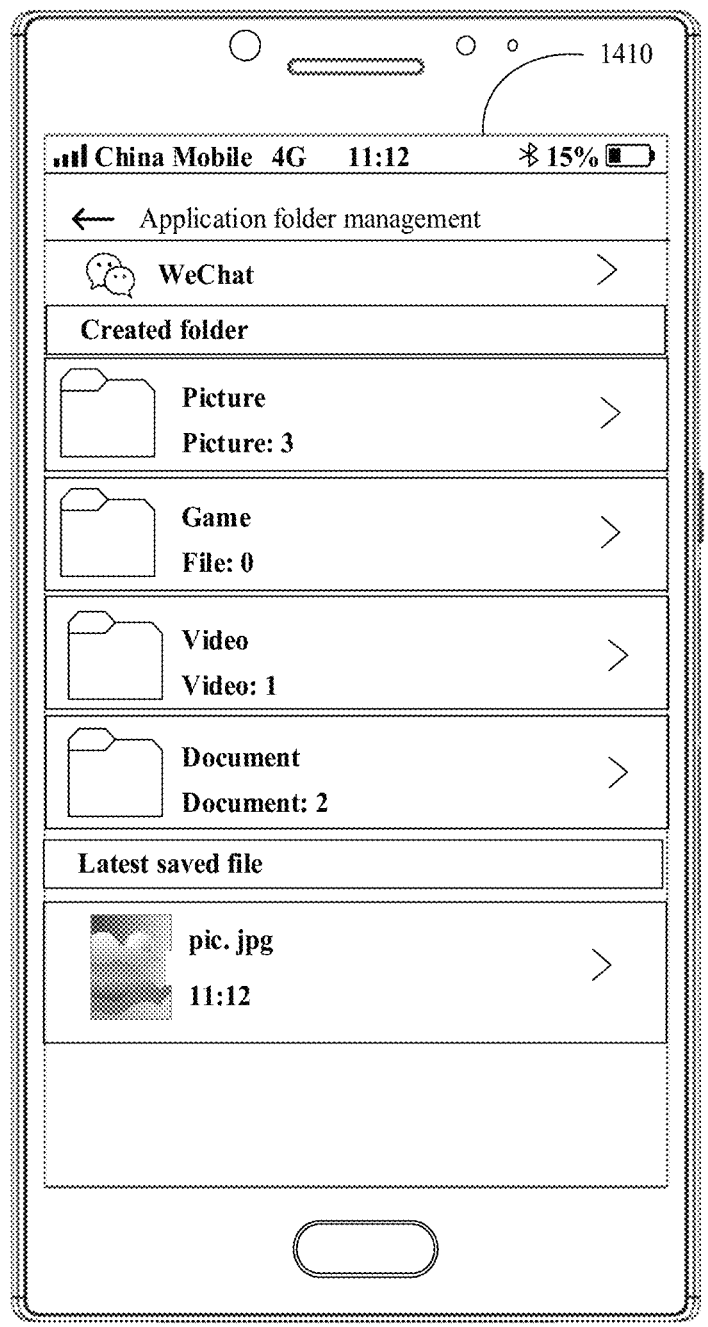

For example, the first operation may be a touch operation on a first control, and the first control may be located in a user interface that is in settings and that is used to manage a first application program, or may be located in a setting screen of the first application program. In addition, in some embodiments, the first control may be further located on a shortcut menu of the first application program. In response to a touch and hold or heavy press operation on an icon of the first application program, the electronic device may display the shortcut menu on the touchscreen. During specific implementation, the first control may be referred to as application folder management, folder management, or the like. This is not limited herein. For example, the first application program is WeChat. The application folder management may be located in the user interface 1100 shown in FIG. 11A, or may be located on the shortcut menu 1300 shown in FIG. 13A, or may be located in the user interface 1500 shown in FIG. 15A. This is not limited in this embodiment of this application.

Step 2601: In response to the first operation, the electronic device displays a first user interface on the touchscreen, where the first user interface is the setting screen of the first application program. The setting screen of the first application program includes a folder control. The folder control is used to indicate a folder of the first application program.

In some embodiments, the folder control may be a control of a root folder corresponding to the first application program, or may be a control of a subfolder, or may be a control of a reclassified folder based on a type of a file included in the folder corresponding to the first application program.

An example in which the first application program is WeChat is used. For example, WeChat is corresponding to a root folder Weixin, and the setting screen of the first application program may be the user interface 400 shown in FIG. 4A. For another example, WeChat corresponds to a subfolder Picture, a subfolder Game, a subfolder Video, and a subfolder Document, and the setting screen of the first application program may also be the user interface 600 shown in FIG. 6A. For another example, reclassified folders corresponding to WeChat is a folder Picture, a folder Audio, a folder Video, and a folder Document. The setting screen of the first application program may be the user interface 1800 shown in FIG. 18.

In addition, in this embodiment of this application, the folder control may be an icon of a folder, or may be a folder path, or may be a virtual button, or the like. This is not limited herein. WeChat is used as an example. If the folder control is the virtual button, the setting screen of the first application program may be the user interface 500 shown in FIG. 5, or may be the user interface 620 shown in FIG. 6C.

It should be noted that, in some embodiments, if the folder control includes N subfolder controls corresponding to the first application program, N is a natural number greater than 1, each of the N subfolder controls is used to indicate one subfolder corresponding to the first application program, and each subfolder control indicates a different subfolder. For example, the N subfolder controls may be arranged in the first user interface in descending order of storage frequencies of subfolders respectively indicated by the N subfolder controls. For another example, the N subfolder controls may be arranged in the first user interface based on a time sequence of latest storage of a file in the subfolders respectively indicated by the N subfolder controls.

In addition, the first user interface may further include a common folder control, and the common folder control is used to indicate a subfolder that is most frequently stored in the subfolders corresponding to the first application program. The electronic device may collect, by using a file system manager at an interval of preset duration, statistics on a storage frequency of the subfolders corresponding to the first application program.

In some other embodiments, the first user interface may further include a file control. The file control is used to indicate a latest saved file. The file may be a picture, a document, audio, a video, or the like. This is not limited herein.

Step 2602: The electronic device detects a second operation on the folder control The second operation may be a touch operation on the folder control, or may be a touch and hold operation on the folder control, or may be a heavy press operation on the folder control, or the like. This is not limited herein.

Step 2603: In response to the second operation the electronic device displays a second user interface on the touchscreen. The second user interface is a content details screen of the folder corresponding to the first application program.

For ease of implementation, in some embodiments, the second user interface may be a user interface in file management.

Figure 27:
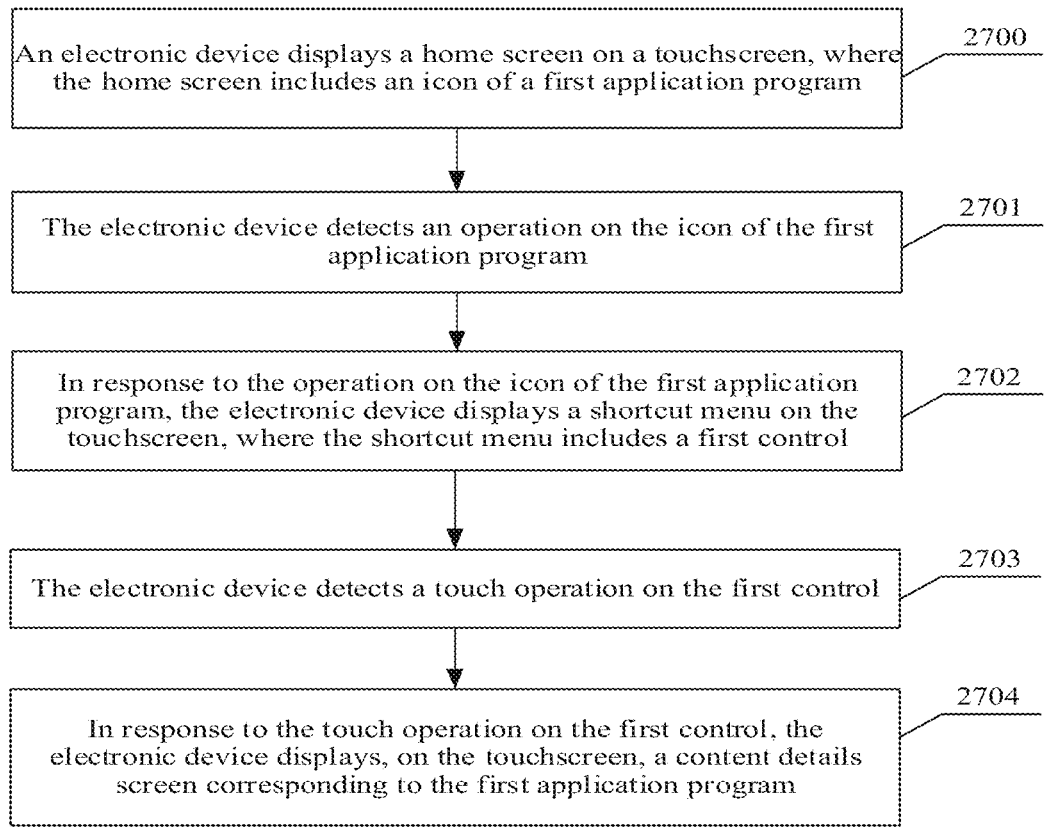
FIG. 27 is a schematic flowchart of another method for browsing an application folder according to another embodiment of this application.

In addition, as shown in FIG. 27, another folder browsing method according to an embodiment of this application includes the following steps.

Step 2700: An electronic device displays a home screen on a touchscreen, where the home screen includes an icon of a first application program.

Step 2701: The electronic device detects an operation on the icon of the first application program.

For example, the operation on the icon of the first application program may be a double-tap operation, a touch and hold operation, a heavy press operation, or the like on the icon of the first application program. This is not limited herein.

Step 2702: In response to the operation on the icon of the first application program, the electronic device displays a shortcut menu on the touchscreen, where the shortcut menu includes a first control.

For example, the first application program is WeChat, and the shortcut menu may be the shortcut menu 1300 shown in FIG. 13A. The first control may be referred to as application folder management, or may be referred to as folder management, or the like. This is not limited herein.

Step 2703: The electronic device detects a touch operation on the first control.

Step 2704: In response to the touch operation on the first control, the electronic device displays, on the touchscreen, a content details screen corresponding to the first application program.

It should be noted that, in some embodiments, the content details screen is a user interface that is in file management and that is for content details of a folder corresponding to the first application program.

In the embodiments provided in this application, the methods provided in the embodiments of this application are described from a perspective in which the electronic device is used as an execution body. To implement functions in the methods provided in the embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Figure 28:
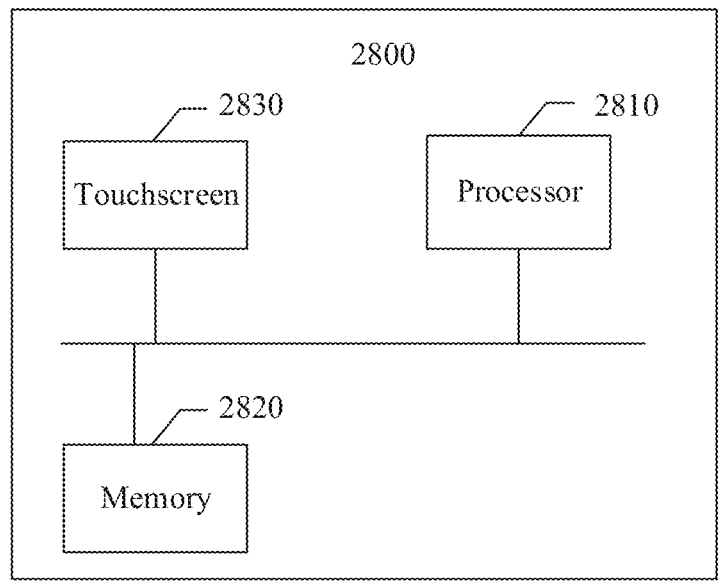
FIG. 28 is a schematic structural diagram of an electronic device according to another embodiment of this application.

Based on a same concept, FIG. 28 shows an electronic device 2800 according to this application. For example, the electronic device 2800 includes at least one processor 2810, a memory 2820, and a touchscreen 2830. The processor 2810 is coupled to the memory 2820 and the touchscreen 2830. The coupling in this embodiment of this application is an indirect coupling or communication connection between apparatuses, units, or modules, and may be in an electrical, mechanical, or another form, and is used for information exchange between the apparatuses, units, or modules.

Specifically, the memory 2820 is configured to store a program instruction.

The touchscreen 2830 is configured to display a user interface.

The processor 2810 is configured to invoke the program instruction stored in the memory 2820, so that the electronic device 2800 performs the steps performed by the electronic device in the method for browsing a folder shown in FIG. 26 and/or FIG. 27, to improve efficiency of searching for a file by a user.

It should be understood that the electronic device 2800 may be configured to implement the method for browsing a folder shown in FIG. 26 and/or FIG. 27 in this embodiment of this application. For related features, refer to the foregoing descriptions. Details are not described herein again.

A person skilled in the art may clearly understand that the embodiments of this application may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. This is used as an example but is not limited to: The computer-readable medium may include a RAM, a ROM, an electrically erasable programmable read-only memory (electrically erasable programmable read only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk and a Blu-ray disc, where the disk generally copies data by a magnetic means, and the disc copies data optically by a laser means. The foregoing combination should also be included in the protection scope of the computer-readable medium.

In summary, the foregoing descriptions are merely embodiments of this application, but is not intended to limit the protection scope of this application. Any modification, equivalent replacement, or improvement made according to the disclosure of this application shall fall within the protection scope of this application.

What is claimed is:

1. A method comprising:
   displaying a home screen on a touchscreen of an electronic device, wherein the home screen comprises an icon of a first application program;
   detecting a touch and hold operation on the icon;
   displaying, on the touchscreen in response to the touch and hold operation, a shortcut menu corresponding to the first application program, wherein the shortcut menu comprises a first control;
   detecting a first operation on the first control;
   displaying, in response to the first operation, a first user interface on the touchscreen, wherein the first user interface is an interface of the first application program and comprises a folder control indicating a folder of the first application program, and a file control indicating a latest file saved by a user, wherein the folder control comprises a plurality of subfolder controls corresponding to the first application program, and wherein the subfolder controls are arranged in descending order of frequencies of storing files in subfolders respectively indicated by the subfolder controls;
   detecting a second operation on the folder control;
   displaying, in response to the second operation, a second user interface on the touchscreen, wherein the second user interface is a content details interface of the folder corresponding to the first application program and comprises the latest file;
   detecting a third operation on the latest file;
   saving, in response to the third operation, the latest file;
   displaying a dialog box on the touchscreen after the latest file is successfully saved, wherein the dialog box prompts a user whether to view the latest file;
   detecting a fourth operation performed by the user on the dialog box; and
   displaying, in response to the fourth operation, the latest file on the first user interface of the first application program.

2. The method of claim 1, wherein each of the subfolder controls indicates one subfolder corresponding to the first application program, and wherein each subfolder control indicates a different subfolder.

3. The method of claim 2, wherein:
   the subfolder controls are further arranged based on a time sequence of latest storage of a file in subfolders respectively indicated by the subfolder controls;
   the subfolder controls are further arranged based on a sequence of initial letters of names of subfolders indicated by the subfolder controls; or
   the subfolder controls are further arranged based on a sequence of creating subfolders in an installation process of the first application program.

4. The method of claim 1, further comprising displaying, in response to the fourth operation, the file control on the first user interface on the touchscreen.

5. The method of claim 1, wherein the first file is downloaded, transferred, or created by the user while using the first application program.

6. The method of claim 1, further comprising:
   detect a fifth operation on the touchscreen; and
   refresh, in response to the fifth operation, the first user interface based on a name of the first application program and a save path of the file.

7. An electronic device comprising:
   a touchscreen; and
   a processor coupled to the touchscreen and configured to:
   display a home screen on the touchscreen, wherein the home screen comprises an icon of a first application program;
   detect a touch and hold operation on the icon;
   display, on the touchscreen in response to the touch and hold operation, a shortcut menu corresponding to the first application program, wherein the shortcut menu comprises a first control;
   detect a first operation on the first control;
   display, in response to the first operation, a first user interface on the touchscreen, wherein the first user interface is an interface of the first application program and comprises a folder control indicating a folder of the first application program, and a file control indicating a latest file saved by a user, wherein the folder control comprises a plurality of subfolder controls corresponding to the first application program, and wherein the subfolder controls are arranged in descending order of frequencies of storing files in subfolders respectively indicated by the subfolder controls;
   detect a second operation on the folder control;
   display, in response to the second operation, a second user interface on the touchscreen, wherein the second user interface is a content details interface of the folder corresponding to the first application program and comprises the latest file;
   detect a third operation on the latest file;
   save, in response to the third operation, the latest file;

display a dialog box on the touchscreen after the latest file is successfully saved, wherein the dialog box prompts a user whether to view the latest file;

detect a fourth operation performed by the user on the dialog box; and display, in response to the fourth operation, the latest file on the first user interface of the first application program.

8. The electronic device of claim 7, wherein the processor is further configured to: detect a fifth operation on the touchscreen; and refresh, in response to the fifth operation, the first user interface based on a name of the first application program and a save path of the file.

9. The electronic device of claim 7, wherein each of the subfolder controls indicates one subfolder corresponding to the first application program, and wherein each subfolder control indicates a different subfolder.

10. The electronic device of claim 9, wherein the subfolder controls are further arranged based on a time sequence of latest storage of a file in subfolders respectively indicated by the subfolder controls.

11. The electronic device of claim 9, wherein the subfolder controls are further arranged based on a sequence of initial letters of names of subfolders indicated by the subfolder controls.

12. The electronic device of claim 9, wherein the subfolder controls are further arranged based on a sequence of creating subfolders in an installation process of the first application program.

13. The electronic device of claim 7, wherein the processor is further configured to display, in response to the fourth operation, the file control on the first user interface on the touchscreen.

14. A computer program product comprising computer-executable instructions stored on a non-transitory computer-readable storage medium that, when executed by a processor, cause an electronic device to:

display a home screen on a touchscreen of the electronic device, wherein the home screen comprises an icon of a first application program;

detect a touch and hold operation on the icon;

display, on the touchscreen in response to the touch and hold operation, a shortcut menu corresponding to the first application program, wherein the shortcut menu comprises a first control;

detect a first operation on the first control;

display, in response to the first operation, a first user interface on the touchscreen, wherein the first user interface is an interface of the first application program and comprises a folder control indicating a folder of the first application program, and a file control indicating a latest file saved by a user, wherein the folder control comprises a plurality of subfolder controls corresponding to the first application program, and wherein the subfolder controls are arranged in descending order of frequencies of storing files in subfolders respectively indicated by the subfolder controls;

detect a second operation on the folder control;

display, in response to the second operation, a second user interface on the touchscreen, wherein the second user interface is a content details interface of the folder corresponding to the first application program and comprises the latest file;

detect a third operation on the latest file;

save, in response to the third operation, the latest file;

display a dialog box on the touchscreen after the latest file is successfully saved, wherein the dialog box prompts a user whether to view the latest file;

detect a fourth operation performed by the user on the dialog box; and display, in response to the fourth operation, the latest file on the first user interface of the first application program.

15. The computer program product of claim 14, wherein the computer-executable instructions further cause the electronic device to:

detect a fifth operation on the touchscreen; and refresh, in response to the fifth operation, the first user interface based on a name of the first application program and a save path of the file.

16. The computer program product of claim 14, wherein each of the subfolder controls indicates one subfolder corresponding to the first application program, and wherein each subfolder control indicates a different subfolder.

17. The computer program product of claim 14, wherein the computer-executable instructions further cause the electronic device to display, in response to the fourth operation, the file control on the first user interface on the touchscreen.

18. The computer program product of claim 14, wherein the first file is downloaded by the user while using the first application program.

19. The computer program product of claim 14, wherein the first file is transferred by the user while using the first application program.

20. The computer program product of claim 14, wherein the first file is created by the user while using the first application program.

* * * * *